United States Patent
Fife

(10) Patent No.: US 12,057,703 B2
(45) Date of Patent: *Aug. 6, 2024

(54) SYSTEMS AND APPARATUSES TO AGGREGATE DISTRIBUTED ENERGY RESOURCES

(71) Applicant: Enel X S.R.L., Rome (IT)

(72) Inventor: John Michael Fife, Bend, OR (US)

(73) Assignee: Enel X S.R.L., Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,586

(22) Filed: Jul. 28, 2023

(65) Prior Publication Data

US 2023/0369867 A1 Nov. 16, 2023

Related U.S. Application Data

(63) Continuation of application No. 17/114,201, filed on Dec. 7, 2020, now Pat. No. 11,764,580.

(Continued)

(51) Int. Cl.
*H02J 3/38* (2006.01)
*G05B 19/042* (2006.01)
(Continued)

(52) U.S. Cl.
CPC ............ *H02J 3/381* (2013.01); *G05B 19/042* (2013.01); *H02J 13/00006* (2020.01);
(Continued)

(58) Field of Classification Search
CPC ........ H02J 3/381; H02J 13/00006; H02J 3/32; H02J 2300/24; H02J 2300/28;
(Continued)

(56) References Cited

U.S. PATENT DOCUMENTS

2004/0024494 A1 2/2004 Bayoumi et al.
2010/0114387 A1 5/2010 Chassin
(Continued)

FOREIGN PATENT DOCUMENTS

| CN | 1692317 A | 11/2005 |
|---|---|---|
| JP | 2016-081074 A | 5/2016 |
| JP | 2018-207745 A | 12/2018 |

OTHER PUBLICATIONS

International Search Report and Written Opinion on international application PCT/US2020/063614 dated Apr. 6, 2021 (8 pages).

*Primary Examiner* — Charles Cai
(74) *Attorney, Agent, or Firm* — Foley & Lardner LLP

(57) ABSTRACT

Apparatuses, systems, and methods of apportioning an aggregate maneuver is disclosed. An aggregation engine receives aggregation opportunity information requesting an aggregate change in power of one or more sites. The aggregation engine transmits participation opportunity information to a plurality of site controllers. The participation opportunity information indicates a site benefit for providing a site change in power. The aggregation engine also receives commitment information from the plurality of site controllers, the commitment information indicating levels of commitment of the plurality of site controllers to contribute site change in power to a target change in power of the aggregation opportunity. The aggregation engine, as appropriate, further transmits updated participation opportunity information including an adjusted proposed site benefit, an adjusted proposed site change in power, or both to the plurality of site controllers, until an aggregate change in power of the one or more sites is within a threshold level of the target change in power.

23 Claims, 22 Drawing Sheets

Related U.S. Application Data

(60) Provisional application No. 62/944,893, filed on Dec. 6, 2019.

(51) Int. Cl.
*H02J 13/00* (2006.01)
*H02J 3/32* (2006.01)

(52) U.S. Cl.
CPC ......... *G05B 2219/2639* (2013.01); *H02J 3/32* (2013.01); *H02J 2300/24* (2020.01); *H02J 2300/28* (2020.01); *H02J 2310/12* (2020.01)

(58) Field of Classification Search
CPC ............... H02J 2310/12; G05B 19/042; G05B 2219/2639; Y02E 10/56
See application file for complete search history.

(56) References Cited

U.S. PATENT DOCUMENTS

| | | |
|---|---|---|
| 2013/0046895 A1 | 2/2013 | Metcalfe et al. |
| 2014/0062195 A1* | 3/2014 | Bruschi ................... B60L 53/63 307/38 |
| 2015/0019037 A1* | 1/2015 | Koch ...................... G06Q 50/06 700/295 |
| 2016/0062380 A1 | 3/2016 | Schwarz et al. |
| 2017/0005515 A1 | 1/2017 | Sanders et al. |
| 2018/0083483 A1 | 3/2018 | Hong et al. |
| 2018/0217568 A1 | 8/2018 | Parvania |

* cited by examiner

SYSTEMS AND APPARATUSES TO AGGREGATE DISTRIBUTED ENERGY RESOURCES

RELATED APPLICATIONS

This application is a continuation of U.S. patent application Ser. No. 17/114,201 titled SYSTEMS AND APPARATUSES TO AGGREGATE DISTRIBUTED ENERGY RESOURCES, filed Dec. 7, 2020, which claims benefit of priority under 35 U.S.C. § 119 to U.S. Provisional Patent Application No. 62/944,893 titled SYSTEMS AND APPARATUSES TO AGGREGATE DISTRIBUTED ENERGY RESOURCES, filed Dec. 6, 2019, each of which are hereby incorporated herein by reference in their entirety.

BACKGROUND

Electricity supply and delivery costs continue to rise, especially in remote or congested areas. Moreover, load centers (e.g., population centers where electricity is consumed) increasingly demand more electricity. Historically in the U.S., energy infrastructure has been organized so that power is mostly produced by resources inland, and consumption of power is increasing at load centers along the coasts. Transmission and distribution (T&D) systems have been used to move the power from where it is generated to where it is consumed at the load centers. As the load centers demand more electricity, additional T&D systems are needed, particularly to satisfy peak demand. However, T&D systems are expensive and construction of additional T&D systems may be unwise and/or undesirable because full utilization of this additional infrastructure is really only necessary during relatively few peak demand periods, and would otherwise be unutilized or underutilized. Justifying the significant costs of constructing additional T&D resources may make little sense when actual utilization may be relatively infrequent.

Distributed energy resources (DERs) are increasingly viewed as a viable means for minimizing costs of constructing additional T&D by storing, generating, or refraining from consuming electricity at or closer to the load centers for use during the peak demand times. A DER may refer to one or more of a variety of modular electricity-generating, storage, or consuming technologies, individually or in combination, that is positioned at or close to a load served by or including the DER. Many DER applications are interconnected with a local electric utility distribution system (the "grid").

Examples of DERs include energy storage system (ESS) and generation systems. An individual DER (e.g., a behind-the-meter DER) can provide a consumer of energy significant ability to control costs. However, this ability to control costs through behind-the-meter DERs eludes the electricity provider (e.g., utility) on the grid side of electrical distribution. An electricity provider can offer incentives and other encouragement to consumers to use DERs, but remains at the mercy of consumers to deploy a DER and to use the DER in a manner to provide desired behavior. For example, during a "demand peak," the grid may remain unimpacted by a plurality of DERs that are not put into a state for the consumer to use electricity from the DER rather than from the electricity provider. Electricity providers simply cannot rely upon independent DERs to deliver power in a coordinated manner on short notice to maintain grid stability.

Attempts to leverage the cost savings enabled by DERs for the benefit of an electricity provider have included efforts to aggregate DERs in a coordinated manner to provide a response to a demand on the grid (e.g. a coordinated or aggregate demand response). A plurality of DERs can be linked together by an electronic communication network and remotely controlled at a centralized system to operate as a virtual power plant (VPP), to reduce customer energy demand at peak hours, and provide reliable energy generation for electricity providers to offset some of the needs for more conventional sources of electricity to meet consumer demands. Electricity providers in the U.S. and Europe are increasingly experimenting with VPPs to help manage and harness the value of DERs scattered across the grid.

While the concept of VPPs is enticing in theory, implementation to effectively aggregate DERs is challenging. Leveraging DERs in a manner to provide a utility-requested power level response without adversely affecting an electricity consumer service, including an electricity consumer's DER resource(s) is extremely difficult. For example, a VPP would not take into consideration activities planned at the sites where the DERs are located, DER size, and expected operating costs on a particular day. For example, a site in a VPP group may have already committed a DER to another service and may therefore have a high cost of participation. As another example, a site in a VPP group may have a larger DER and therefore may have more capacity available than the other sites and can therefore participate at a lower cost. Traditional VPPs do not take into consideration these specific factors of the individual DERs and sites.

An aggregation engine (e.g., a centralized controller) that functions as a centralized optimization engine to economically optimize aggregation of DERs may be beneficial and may be desirable to enable intelligent actions to be taken in order to more effectively utilize DERs such as by minimizing the total electricity-related cost of the group, without the aforementioned drawbacks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 20 is a diagram of a dynamic manager, according to one embodiment of the present disclosure.

DETAILED DESCRIPTION

Figure 1:
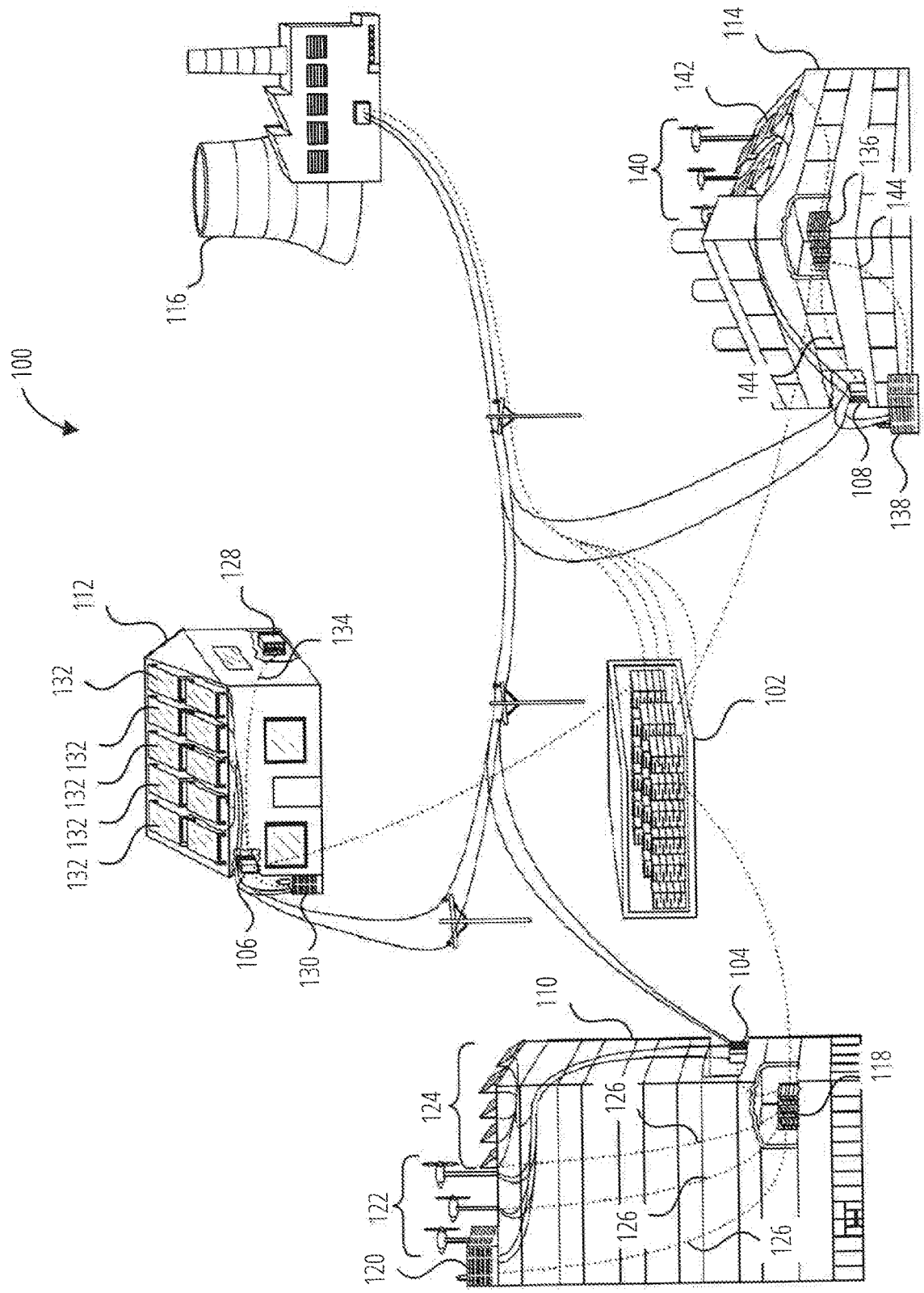
FIG. 1 is a diagrammatic representation of a system to aggregate distributed energy resources (DERs), according to one embodiment of the present disclosure.

As electricity supply and delivery costs increase, especially in remote or congested areas, distributed energy resources (DERs) are increasingly seen as a viable means for reducing those costs. DERs are fast becoming more prevalent as more and more consumers are installing local generation and/or energy storage systems (e.g., behind the meter).

The reasons for the proliferation of DERs are numerous, but primarily because of programs and products that enable an energy storage system (ESS) to provide consumers an ability to control net consumption and delivery of electrical energy, which can provide value in multiple ways.

A site may include an ESS that can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high. The ESS of a site can be used or otherwise made available as a DER.

The approach of charging the ESS (e.g., of a DER) when rates are low and discharging when rates are high can provide value by reducing time-of-use (ToU) supply charges, reducing demand charges, improving utilization of local generation, and leveraging incentive maneuvers.

ToU supply charges are typically pre-defined in a utility's tariff document by one or more supply rates and associated time windows. ToU supply charges may be calculated as the supply rate multiplied by the total energy consumed during the time window. An ESS can be discharged to reduce ToU supply charges.

Demand charges are electric utility charges that are based on the rate of electrical energy consumption (also called "demand") during particular time windows (which we will call "demand windows"). An ESS can be discharged to lower peak demand and thereby reduce demand charges.

Improved utilization of local generation can be achieved with an ESS by: (a) aiding to maximize self-consumption of renewable energy, and (b) reducing fluctuations of a renewable generator such as during cloud passage on solar PV arrays.

An ESS can also be charged and discharged in a manner to leverage programs that offer benefits (e.g., a statement credit) or other incentives for consumers to cooperate with the local utility(ies) by taking actions (e.g., reducing consumption or discharging power onto the grid) that may enhance grid stability, reduce peak loads, or the like.

A site may also include a generation system that can be activated to produce energy for consumption by the load center, for storage by the ESS for later consumption, and/or for providing power back to the grid. For example, any of a PV system, a wind farm, or a fuel powered generator may generate electrical energy to be supplied to the load, stored by the ESS, or provided back to the grid. The generation system of a site can be used or otherwise made available as a DER.

A site may include an energy consuming technology, such as a load, that may be deactivated during peak demand periods to alleviate the demand on the grid. For example, an air conditioning system may be deactivated during a particular demand period to alleviate the net consumption of electrical power from the grid at a site. In this example, an element of energy storage could also be leveraged. Specifically, prior to the demand period it may be possible to run the air conditioning system to cool a space to below a target temperature, which would reduce a peak temperature that the space would rise to during the peak demand period when the air conditioning system is deactivated. From this example, it will be apparent that anything that consumes electrical power could be used or otherwise made available as a DER, but not all of these things would involve an energy storage element as discussed with reference to the air conditioning system.

An individual DER can provide a consumer of energy significant ability to control costs. However, this ability to control costs eludes the electricity provider or distributor (e.g., utility) on the grid side of electrical distribution. An electricity provider or distributor can offer incentives and other encouragement to consumers to use DERs, but remains at the mercy of consumers to deploy a DER and to use or otherwise made available the DER in a manner to provide behavior that supports cost reduction for the electricity provider or distributor. For example, during a "demand peak," the grid may remain unimpacted by a plurality of DERs that are not put into a state for the consumer to provide electricity to or reduce consumption of electricity from the grid. Electricity providers simply cannot rely upon independent DERs to deliver power in a coordinated manner on short notice to maintain grid stability.

Attempts to leverage the cost savings enabled by DERs for the benefit of an electricity provider have included efforts to aggregate DERs in a coordinated manner to provide a response to a demand on the grid. A plurality of DERs can be linked or otherwise coordinated together by an electronic network and remotely controlled at a centralized system to operate as a virtual power plant (VPP), to reduce customer energy demand at peak hours, and provide reliable energy generation for electricity providers to offset some of the needs for more conventional sources of electricity to meet consumer demands. Electricity providers in the U.S. and Europe are increasingly experimenting with VPPs to help manage and harness the value of DERs scattered across the grid.

To illustrate, an individual site may have a DER that is controlled by an optimal controller. For this site, on any given day, the optimal controller has scheduled the DER to optimize the total energy-related costs for a particular building or site. Now, consider a group of such sites, all using optimal controllers to manage electricity-related costs using DERs at each site. If this group of sites is part of a VPP group, a VPP orchestrator may request a specific energy delivery profile from each site in the VPP group to achieve an aggregate goal. For example, if the goal is 1 MWh of energy delivery between 6 pm and 7 pm of a given day, and the group includes five sites, each site may be requested to deliver 2 kWh from 6:00 p.m. to 7:00 p.m. This would achieve the VPP goal. This approach, however, does not consider each site's planned activities, DER size, and expected operating costs on that particular day. For example, a site in a VPP group may have already committed a DER to another service or maneuver and may therefore have a high cost of participation in the additional service or maneuver of the VPP group. In addition, a site in a VPP group may have a relatively large DER and therefore may have a relatively large capacity available, as compared to the other sites, and can therefore participate at a lower cost than the other sites.

A better approach than that of a VPP would be to achieve an aggregate goal at minimum total electricity-related cost. Such an approach is disclosed herein.

The present embodiments provide aggregation systems, controllers, and methods that can function to economically optimize aggregation of DERs by enabling intelligent actions to be taken in order to more effectively utilize DERs. The present disclosure includes systems and methods directed to aggregating distributed energy resources, and more particularly to systems and methods for intelligent and/or automated aggregation of automatically controlled self-optimizing distributed energy resources.

FIG. 1 is a diagrammatic representation of a system 100 to aggregate DERs, including an aggregation engine 102 (or other similar system or aggregation controller) to coordinate an aggregate response with a plurality of site controllers 104, 106, 108 each configured to control operation of a plurality of DERs at a plurality of sites 110, 112, 114, according to one embodiment of the present disclosure. The system 100 may operate as, or similar to, a VPP to provide an aggregate response providing a power level for a period of time of an aggregation opportunity, or to otherwise participate in an aggregate response event. In FIG. 1, the centralized aggregation engine 102 may be networked with (and therefore in communication with) the plurality of site controllers 104, 106, 108, each of which controls one or more DERs at one of the sites 110, 112, 114, respectively. The sites 110, 112, 114 include a plurality of disparate locations. For example, the site 110 may include a high-rise building, the site 112 may include a single-family residence, and the site 114 may include a factory or other industrial location or operation. Each of these sites 110, 112, 114 includes one or more DERs, which in turn include power storage, power generation, and/or load resources. As can be appreciated, any variation of DER and quantity or combination of DERs can be controlled by a site controller 104, 106, 108 that is in communication with the aggregation engine 102 to participate in one or more maneuvers (e.g., an aggregate response, a demand response maneuver) to provide an aggregate change in power (e.g., provide power generation, provide stored power, reduce power consumption by throttling or deactivating a load, etc.). The aggregation engine 102 may further be in communication with a local electric utility 116 to receive requests for maneuvers (e.g., requests to change a power of one or more sites) and to communicate the response and/or the ability to respond to such requests. The aggregation engine 102 may, in response to a utility request to change power, coordinate the plurality of site controllers 104, 106, 108 to control the DERs at the sites 110, 112, 114 to provide an aggregate change in power (e.g., reduce consumption of power, generate power that can be provided to the grid of the local electric utility 116) aligned with a target change in power of the utility request.

The aggregation engine 102 may include circuitry, one or more processors, and/or other computing devices to perform operations for aggregating what may be optimized control of the DERs at the plurality of sites 110, 112, 114. The aggregation engine 102 may further include one or more communication interfaces to facilitate communications with the site controllers 104, 106, 108 and with the local electric utility 116. The aggregation engine 102 may receive a request to change power or other aggregation opportunity, inviting participation in an aggregate maneuver or other response maneuver or response event. In some embodiments, the request may be received from the local electric utility 116. In other embodiment, the request may be at or be received at the local electric utility 116. The request may specify a requested change in power (of one or more sites) over a period of time. The request may specify a benefit (e.g., an upshot) for providing the requested change in power during the period of time. As used herein the term "aggregate change in power" refers to a collective or total change of power (e.g., net power) consumed at the sites 110, 112, 114, and may include electrical power production or provision (e.g., by generators and/or ESSs), reduction or cessation in electrical power consumption (e.g., by loads), or combinations thereof. The term "target change in power" may be used herein to refer to the requested change in power, or may be a target change in power to achieve the requested change in power. The benefit or upshot specified by the request may be an aggregate benefit (e.g., a monetary or other economic incentive) to be received for providing the requested change in power within or over the period of time of the aggregate response and/or a penalty (e.g., a monetary or other economic penalty) to be imposed or received for failing to provide the requested change in power over the period of time.

The aggregation engine 102 may, based on the aggregation opportunity, transmit participation opportunity information to site controllers the site controllers 104, 106, 108 at the one or more sites 110, 112, 114. The participation opportunity information may indicate one or more parameters for a site change in power to contribute to bringing the aggregate change in power of the one or more sites 110, 112, 114 toward a target change in power. The parameters describing a request to change power may comprise one or more of a start date and time, an end date and time, and a request period.

The participation opportunity information may also indicate an associated benefit for the site change in power. In order to incentivize greater (or lesser) participation of the one or more sites 110, 112, 114, the associated benefit may be adjusted upward (or downward). If the participation of the one or more sites 110, 112, 114 does not result in an aggregate change in power that is within a threshold of a target change in power (to accomplish an aggregate maneuver or otherwise response to a request to change power), the aggregation engine 102 may modify the participation opportunity information, such as by increasing the associated benefit. By contrast, if the participation of the one or more sites 110, 112, 114 results in excessive aggregate change in power that is beyond a threshold of a target change in power, the aggregation engine 102 may seek to optimize (e.g., minimize or otherwise reduce the aggregate benefit provided to the one or more sites 110, 112, 114) by modify the participation opportunity information, such as by decreasing the associated benefit.

By communicating a benefit for participation in a response maneuver, and adjusting the benefit to tune the response maneuver, the aggregation engine 102 can effectively aggregate the one or more sites 110, 112, 114 into an aggregated response. Communicating the benefit, and adjusting the benefit according to the resulting participation creates somewhat of a virtual market for demand response capability (e.g., ability to contribute a site change in power) of the one or more sites 110, 112, 114. In this manner of creating a virtual market for participation in an aggregate response, the aggregation engine 102 can determine whether and how to aggregate the change in power from the DERs at one or more of the sites 110, 112, 114 or otherwise perform a maneuver to fulfill an aggregation request or other aggregation opportunity in order to receive the specified benefit and/or avert any specified penalty.

In this embodiment, the aggregation engine 102 is providing participation opportunity information and the one or more of the sites 110, 112, 114 readily react, determining a level of site change in power to contribute toward a target change in power as indicated in the request. The aggregation engine 102 is iterating through an aggregation response. Stated otherwise, the aggregation engine 102 repeatedly sends participation opportunity information (potentially adjusted) to the one or more of the sites 110, 112, 114 throughout an a period of an aggregation opportunity and tuning the aggregate response based on the implemented site change in power reported back by the corresponding site controllers 104, 106, 108.

To optimize participation (and thereby the collective response) by the one or more of the sites 110, 112, 114, the aggregation engine 102 is configured to leverage optimizing capabilities of the site controllers 104, 106, 108 to balance costs and benefits to the sites 110, 112, 114 associated with taking on some of the burden and some of the upshot of the maneuver. For example, the site controllers 104, 106, 108 may be configured to economically optimize operation of electrical systems corresponding to the sites 110, 112, 114. In performing this economic optimization, the site controllers 104, 106, 108 may take into consideration offered benefits (e.g., offered by the aggregation engine 102) to be awarded for providing a site change in power. As used herein the term "site change in power" refers to: a provision, by a site, of electrical power (e.g., from a generator and/or an ESS); a reduction or cessation, by the site, of consumption of electrical power from the grid (e.g., by one or more loads); or combinations thereof.

In another embodiment, the aggregation engine 102 may, based on the aggregation opportunity, function in a more active, central role in determining whether and how to aggregate the specified net change in power from the DERs at one or more of the sites 110, 112, 114 or whether to otherwise perform a maneuver to fulfill the aggregation opportunity in order to receive the specified benefit and/or avert any specified penalty. The aggregation engine 102 may determine (e.g., in advance of implementation) the response that is economically optimized for the sites 110, 112, 114. As part of determining whether and how to perform a maneuver to fulfill an aggregation opportunity, the aggregation engine 102 may determine how to apportion the burden of the maneuver among the sites 110, 112, 114 in an economically efficient way. To do so, the aggregation engine 102 again is configured to leverage capabilities of the site controllers 104, 106, 108 to balance costs and benefits to the sites 110, 112, 114 associated with taking on some of the burden and some of the upshot of the maneuver. For example, the site controllers 104, 106, 108 may be configured to economically optimize operation of electrical systems corresponding to the sites 110, 112, 114. In performing this economic optimization, the site controllers 104, 106, 108 may take into consideration offered benefits (e.g., offered by the aggregation engine 102) to be awarded for providing a proposed site change in power (e.g., proposed by the aggregation engine 102).

The aggregation engine 102 may provide, to the site controllers 104, 106, 108 via the communication interface, participation opportunity information in a form of apportionment information indicating a site benefit (e.g., a portion of the aggregate benefit) to be provided in exchange for the site controllers 104, 106, 108 providing a site change in power toward compliance with a target change in power of the aggregation opportunity. In some embodiments, the target change in power may be a minimum net change in power needed to comply or otherwise respond to a request. The participation opportunity information may assume the form of apportionment information when the site benefit is indicated as an apportionment of the aggregate benefit. The aggregation engine 102 may determine the site change in power and the corresponding site benefit based on the target (e.g., minimum net) change in power to comply with the aggregate maneuver and the aggregate benefit associated therewith. Stated another way, the apportionment information indicates to the site controllers 104, 106, 108 how much site benefit will be awarded per unit of the site change in power to which the site controllers 104, 106, 108 commit. As can be understood, the apportionment information may include separate values for the site change in power and the site benefit, or the apportionment information may merely include a single value indicating a ratio between the site change in power and the site benefit.

In some embodiments in which the aggregation engine 102 determines the apportionment information, the aggregation engine 102 is providing participation opportunity information including apportionment information and the one or more of the sites 110, 112, 114 readily react, determining a level of site change in power according to the apportionment information. The aggregation engine 102 is iterating through an aggregation response, repeatedly sending apportionment to the one or more of the sites 110, 112, 114 throughout a period of an aggregation opportunity and tuning the apportionment information (and thereby the aggregate response) based on the implemented site change in power reported back by the corresponding site controllers 104, 106, 108.

In other embodiments in which the aggregation engine 102 determines the apportionment information, the aggregation engine 102 may preliminarily poll the plurality of site controllers 104, 106, 108 by providing proposed apportionment information, receiving commitment information from the plurality of site controllers 104, 106, 108, and then adjusting the proposed apportionment information based on the commitment information. Once a successful proposed apportionment information elicits a successful (e.g., optimized) proposed aggregate maneuver, the aggregation engine 102 may provide actual apportionment information to the plurality of site controllers 104, 106, 108 for implementing the aggregate maneuver.

The site controllers 104, 106, 108 may determine, based on their capabilities to economically optimize operation of their corresponding electrical systems at their sites 110, 112, 114, an economically optimal level of commitment to contribute to the target net change in power. By way of non-limiting example, one of the site controllers 104, 106, 108 may determine that it is economically most efficient to provide or commit to providing a site change in power that is half the target change in power to receive a relatively large benefit or a relatively large portion of the aggregate benefit. In other words, the one of the site controllers 104, 106, 108 may determine that the cost of providing half the target change in power is less than the relatively large portion of the aggregate benefit). Another of the site controllers 104, 106, 108 may determine that it is economically most efficient to not commit at all to the proposed site change in power. In other words, the another of the site controllers 104, 106, 108 may determine that the cost of committing to any level of provision of the target change in power at its site is greater than a local benefit. The site controllers 104, 106, 108 may transmit site commitment information indicating the levels of commitment of the site controllers 104, 106, 108 to contribute to the target change in power.

In some embodiments the commitment information may indicate how much site change in power the site controller 104, 106, 108 is committed to contribute during the time period of the aggregate maneuver. By way of non-limiting example, the commitment information may include a site change in power value (e.g., in kWh), which may be a discrete amount of power the site is providing or otherwise committed to provide during a time period (e.g., during a portion of the time period or the entirety of the time period) of an aggregate maneuver. Also by way of non-limiting example, the commitment information may include an energy production value (e.g., 100 kWh). As a further non-limiting example, the commitment information may include a value or time-varying profile indicating a site change in power provided as a power or energy per unit time that the site is providing or otherwise committed to provide. In other non-limiting examples, the commitment information may also be communicated as a ratio or multiplication factor and production pair (e.g., 0.3, 600 kWh), where the production value is a proposed site change in power of the apportionment information, and the ratio or multiplication factor is a portion or factor of the production value the given site is committed to provide. As can be appreciated, other combinations of the foregoing elements of the commitment value may be utilized (e.g., an apportionment set including a ratio, a change rate, and a duration).

The aggregation engine 102 may receive from each of the site controllers 104, 106, 108 the commitment information.

The aggregation engine 102 may use the commitment information to determine an aggregate change in power or an aggregate level of commitment (e.g., a sum of the levels of commitment) of the site controllers 104, 106, 108, and compare this aggregate change in power or aggregate level of commitment to the target change in power or to the minimum net change in power (e.g., to a predetermined range around the minimum net change in power) to comply with a request. In some embodiments, a minimum value of the predetermined range from the net change in power may include an excess of the minimum net change in power to compensate for a failure of one or more of the site controllers 104, 106, 108 to deliver on their levels of commitment. The aggregation engine 102 may then, if needed, adjust an associated benefit (e.g., a site benefit) and/or the site change in power proposed to the site controllers 104, 106, 108 in the apportionment information based on the comparison between the aggregate level of commitment and the target change in power or the minimum net change in power.

In some embodiments, the aggregation engine 102 may adjust the site benefit if the aggregate change in power or the aggregate level of commitment compared to the target change in power or minimum net change in power is outside a predetermined range of the minimum net change in power.

For example, if the aggregate change in power is not sufficient to comply with the request to change power, the aggregation engine 102 may increase the site benefit and transmit the increased site benefit to the site controllers 104, 106, 108 (e.g., in updated apportionment information). Also, if the aggregate change in power is greater than the target change in power (e.g., more than needed to comply with the request to change power), the aggregation engine 102 may decrease the site benefit and transmit the decreased site benefit to the site controllers 104, 106, 108. As the aggregation engine 102 transmits adjustments of the site benefit to the site controllers 104, 106, 108, the site controllers 104, 106, 108 respond with updated commitment information, which the aggregation engine 102 compares to the target change in power. If the aggregate level of commitment is at a desired level (e.g., within the predetermined range or within a threshold of the target change in power), the aggregation engine 102 may keep the site benefit unaltered, and allow the site controllers 104, 106, 108 to proceed with performing their committed portions of the aggregate maneuver. In some embodiments the aggregation engine 102 may transmit a message to the site controllers 104, 106, 108 instructing the site controllers 104, 106, 108 to proceed with performing their committed portions of the aggregate maneuver.

As another example, if the aggregate level of commitment is not sufficient to complete the aggregate maneuver (e.g., is less than the predetermined range), the aggregation engine 102 may increase the site benefit (e.g., keeping the corresponding site change in power the same as that of the apportionment information), and transmit the increased site benefit to the site controllers 104, 106, 108 (e.g., in updated apportionment information). Also, if the aggregate level of commitment is greater than necessary (e.g., is greater than the predetermined range), the aggregation engine 102 may decrease the site benefit (e.g., keeping the corresponding site change in power the same as that of the apportionment information), and transmit the decreased site benefit to the site controllers 104, 106, 108 (e.g., in updated apportionment information). As the aggregation engine 102 transmits adjustments of the site benefit to the site controllers 104, 106, 108, the site controllers 104, 106, 108 respond with updated commitment information, which the aggregation engine 102 compares to the predetermined range, as discussed above. If the aggregate level of commitment is at a desired level (e.g., within the predetermined range), the aggregation engine 102 may keep the site benefit unaltered, and allow the site controllers 104, 106, 108 to proceed with performing their committed portions of the aggregate maneuver. In some embodiments the aggregation engine 102 may transmit a message to the site controllers 104, 106, 108 instructing the site controllers 104, 106, 108 to proceed with performing their committed portions of the aggregate maneuver.

In some embodiments, the aggregation engine 102 may adjust the proposed site change in power if the aggregate level of commitment to the minimum net change in power is outside a predetermined range of the minimum net change in power. For example, if the aggregate level of commitment is not sufficient to complete the aggregate maneuver (e.g., is less than the predetermined range), the aggregation engine 102 may decrease the proposed site change in power (e.g., keeping the corresponding site benefit the same as that of the apportionment information), and transmit the decreased site change in power to the site controllers 104, 106, 108 (e.g., in updated apportionment information). Also, if the aggregate level of commitment is greater than necessary (e.g., is greater than the predetermined range), the aggregation engine 102 may increase the site change in power (e.g., keeping the corresponding site benefit the same as that of the apportionment information), and transmit the increased site change in power to the site controllers 104, 106, 108 (e.g., in updated apportionment information). As the aggregation engine 102 transmits adjustments of the site change in power to the site controllers 104, 106, 108, the site controllers 104, 106, 108 respond with updated commitment information, which the aggregation engine 102 compares to the predetermined range, as discussed above. If the aggregate level of commitment is at a desired level (e.g., within the predetermined range), the aggregation engine 102 may keep the site change in power unaltered, and allow the site controllers 104, 106, 108 to proceed with performing their committed portions of the aggregate maneuver. In some embodiments the aggregation engine 102 may transmit a message to the site controllers 104, 106, 108 instructing the site controllers 104, 106, 108 to proceed with performing their committed portions of the aggregate maneuver.

In some situations an appropriate aggregate level of commitment may not be obtained without increasing the site benefit to a level that would, in the aggregate, exceed the aggregate benefit of the aggregate maneuver (which may include an upshot for complying and/or a penalty for failure to comply). In these situations the aggregation engine 102 may determine to not participate in the aggregate maneuver because the aggregate cost of participation exceeds the aggregate benefit. In these situations the aggregation engine 102 may generate and transmit, to the local electric utility 116, compliance information confirming that the aggregate maneuver will not be complied with. In other words, in these situations the aggregation engine 102 may generate and transmit, to the local electric utility 116, compliance information indicating that the aggregation controller 102 and corresponding plurality of site controllers 104, 106, 108 will not participate in the maneuver or response event.

In other situations the appropriate aggregate level of commitment may be obtained before increasing the site benefit to a level that would, in the aggregate, reach the aggregate benefit of the aggregate maneuver, resulting in a surplus of funds after dispersing the appropriate site benefits for performing the committed contributions to the net change in power. In these situations the surplus may be divided among the sites 110, 112, 114 (e.g., equally, proportionally to commitment levels of the sites 110, 112, 114, other distribution formulations, etc.). Also, the aggregation engine 102 may generate and transmit, to the local electric utility 116, compliance information confirming that the aggregate maneuver will be complied with.

The cost to any given one of the site controllers 104, 106, 108 to commit to a given portion of the minimum net change in power of the aggregate maneuver may be different from that of the other site controllers 104, 106, 108. Since the aggregation engine 102 can rely on each of the site controllers 104, 106, 108 to accurately optimize the economics of operating their electrical systems in committing to their respective portions of the minimum net change in power of the aggregate maneuver, the burden of the aggregate maneuver is optimally apportioned to the site controllers 104, 106, 108 that can most affordably contribute to the minimum net change in power. The point at which the aggregation engine 102 sets the price of the local benefit such that the demand, by the site controllers 104, 106, 108, for units of the predefined site change in power is equal to the minimum net change in power of the aggregate maneuver may be the optimal site benefit. Although a predetermined range around the minimum net change in power may cause slight deviation from the exact optimal point, the predetermined range may reduce the risk of noncompliance due to errors and/or minor deviations from planned performance.

In some instances, a situation may arise in which one of the site controllers 104, 106, 108 would suffer great economic loss if it was obligated to shoulder some of the burden of the minimum net change in power of the aggregate maneuver because the cost of doing so would be great. As a specific, non-limiting example, a production facility may face devastating contractually-imposed sanctions if a production deadline is not met, and may not be capable of meeting its production deadline if it employs its resources to participate in the aggregate maneuver. In this example, the cost of shouldering the burden of the aggregate maneuver may be much less to others of the sites 110, 112, 114. Accordingly, the site controllers 104, 106, 108 of the other sites 110, 112, 114 may commit to providing the minimum net change in power of the aggregate maneuver before the production facility commits, resulting in those other site controllers 104, 106, 108 receiving the apportionment and the corresponding benefits.

The aggregation engine 102 of FIG. 1 is a centralized and/or dedicated entity, according to one embodiment. In other embodiments, the aggregation engine 102 may be a virtual machine (e.g., on a cloud computing system), operative on a plurality of distributed resources, and/or integrated with or otherwise included on one or more site controllers of the sites 110, 112, 114.

The site controllers 104, 106, 108 of FIG. 1 are local controllers located at the sites 110, 112, 114, respectively, according to one embodiment. In other embodiments, one or more of the site controllers 104, 106, 108 may be remotely located from their corresponding sites and communicate with electrical components of their corresponding sites 110, 112, 114 through one or more communication networks (e.g., the Internet). In some embodiments, a single site controller may be configured to operate as the site controller for more than one site, each site having one or more DERs that can be leveraged to provide a portion of a net change of power (e.g., store, generate, or refrain from consuming electrical power) to participate in an aggregation opportunity.

The high-rise building 110 may be an office building, an apartment building, or another multiple-unit facility. The type of the building may be unimportant. The high-rise building 110 may include a local electrical system that includes the site controller 104 and DERs including an ESS 118, and one or more electricity production devices (e.g., generators), such as a combustion engine generator 120, wind turbines 122, and photovoltaic (PV) cells 124 (e.g., solar panels). The high-rise building 110 may also include communication lines 126 to interconnect the site controller 104 with other components (e.g., the ESS 118, the combustion engine generator 120, the wind turbines 122, and the PV cells 124). The electrical system of the high-rise building 110 naturally includes one or more electrical loads. Stated differently, the electrical system of the high-rise building 110 may include loads, generators, and/or ESSs, in varying numbers and combinations of these components. For example, an electrical system may have loads and an ESS, but no local generators (e.g., photovoltaic, wind). The electrical system may or may not be connected to an electric utility distribution system (or "grid"). If not connected to an electric utility distribution system, it may be termed "off-grid."

The ESS 118 of the electrical system of the high-rise building 110 may include one or more energy storage devices and any number of power conversion devices. The power conversion devices are able to transfer energy between an energy storage device and the main electrical power connections that in turn connect to the electrical system loads and, in some embodiments, to the grid. The energy storage devices may be different in various implementations of the ESS 118. A battery is a familiar example of a chemical energy storage device. For example, in one embodiment of the present disclosure, one or more electric vehicles with batteries may be connected to the electrical system (e.g., in a parking garage) and may be used to store energy for later use by the electrical system. A flywheel is an example of a mechanical energy storage device.

The electrical system of the high-rise building 120 may provide to the site controller 104, over the communication lines 126, inputs in the form of information or feedback, as to a status of the building electrical system and/or one or more components (e.g., loads, generators, ESSs) therein. The site controller 104 may determine from the inputs one or more outputs (e.g., control variables) to send to one or more components of the electrical system to accomplish one or more site objectives (e.g., minimize demand (kW) over a prescribed time interval; minimize demand charges ($) over a prescribed time interval; minimize total electricity charges ($) from the grid; reduce demand (kW) from the grid by a prescribed amount during a prescribed time window; maximize the life of the energy storage device(s)). The site controller 104 may also receive as inputs a configuration of the electrical system (e.g., a set of configuration elements), which may specify one or more constraints of the electrical system. The site controller 104 may also receive external inputs (e.g., weather reports, changing tariffs, fuel costs, event data), which may inform the determination of the values of the control variables. A set of external inputs may be received by the site controller 104. The set of external inputs may provide indication of one or more conditions that are external to the site controller 104, the high-rise building 120, and/or the electrical system.

The site controller 104 may receive from the aggregation engine 102 apportionment information for an aggregation opportunity, which may be processed as inputs and/or external inputs. The site controller 104 may determine outputs for efficient operation of the electrical system, taking into consideration the apportionment information by considering the costs of providing site change in power and the proposed site benefit associated therewith. The site controller 104 may then provide to the aggregation engine 102 commitment information indicating a level of commitment of the site controller 104 to provide site change in power towards the minimum net change in power of the aggregation opportunity.

The single-family residence 112 may be analogous to the high-rise building 110, with a similar or different mix of components as part of the electrical system of the residence 112. The residence 112 may include a local electrical system that includes a site controller 106, an ESS 128, and one or more electricity production devices (e.g., generators), such as a combustion engine generator 130, and PV cells 132 (e.g., solar panels). The residence 112 may also include communication lines 134 to interconnect the site controller 106 with other components (e.g., the ESS 128, the combustion engine generator 130, and the PV cells 132).

The electrical system of the residence 112 may provide to the site controller 106, over the communication lines 134, inputs in the form of information, or feedback, as to a status of the electrical system and/or one or more components (e.g., loads, generators, ESSs) thereof. The site controller 106 may determine from the inputs one or more outputs (e.g., control variables) to send to one or more components of the electrical system to accomplish one or more objectives, similar to the site controller 104 of the high-rise building 110. The site controller 106 may also receive as inputs a configuration of the electrical system (e.g., a set of configuration elements), which may specify one or more constraints of the electrical system. The site controller 106 may also receive external inputs (e.g., weather reports, changing tariffs, fuel costs, event data), which may inform the determination of the values of the control variables. A set of external inputs may be received by the site controller 106. The set of external inputs may provide indication of one or more conditions that are external to the site controller 106 and the electrical system of the residence 112.

The site controller 106 may receive from the aggregation engine 102 apportionment information for an aggregation opportunity, which may be processed as inputs and/or external inputs. The site controller 106 may determine outputs for efficient operation of the electrical system, taking into consideration the apportionment information by considering the costs of providing site change in power and the proposed site benefit associated therewith. The site controller 106 may then provide to the aggregation engine 102 commitment information indicating a level of commitment of the site controller 106 to provide site change in power towards the minimum net change in power of the aggregation opportunity.

The factory 114 may be analogous to the high-rise building 110 and/or the residence 112, with a similar or different mix of components as part of the electrical system. The factory 114 may include a local electrical system that includes a site controller 108, an ESS 136, and one or more electricity production devices (e.g., generators), such as a combustion engine generator 138, wind turbines 140, and/or PV cells 142 (e.g., solar panels). The factory 114 may also include communication lines 144 to interconnect the site controller 108 with other components (e.g., the ESS 136, the combustion engine generator 138, the wind turbines 140, and the PV cells 142).

The electrical system of the factory 114 may provide to the site controller 108, over the communication lines 144, inputs in the form of information, or feedback, as to a status of the electrical system and/or one or more components (e.g., DERs including loads, generators, ESSs) thereof. The site controller 108 may determine from the inputs one or more outputs (e.g., control variables) to send to one or more components of the electrical system to accomplish one or more objectives. The site controller 108 may also receive as inputs a configuration of the electrical system (e.g., a set of configuration elements), which may specify one or more constraints of the electrical system. The site controller 108 may also receive external inputs (e.g., weather reports, changing tariffs, fuel costs, event data), which may inform the determination of the values of the control variables. A set of external inputs may be received by the site controller 108. The set of external inputs may provide indication of one or more conditions that are external to the site controller 108 and the electrical system of the factory 114.

The site controller 108 may receive, from the aggregation engine 102, apportionment information for an aggregation opportunity, which may be processed as inputs and/or external inputs. The site controller 108 may determine outputs for efficient operation of the electrical system, taking into consideration the apportionment information by considering the costs of providing site change in power and the proposed site benefit associated therewith. The site controller 108 may then provide to the aggregation engine 102 commitment information indicating a level of commitment of the site controller 108 to provide site change in power towards the minimum net change in power of the aggregation opportunity.

Figure 2:
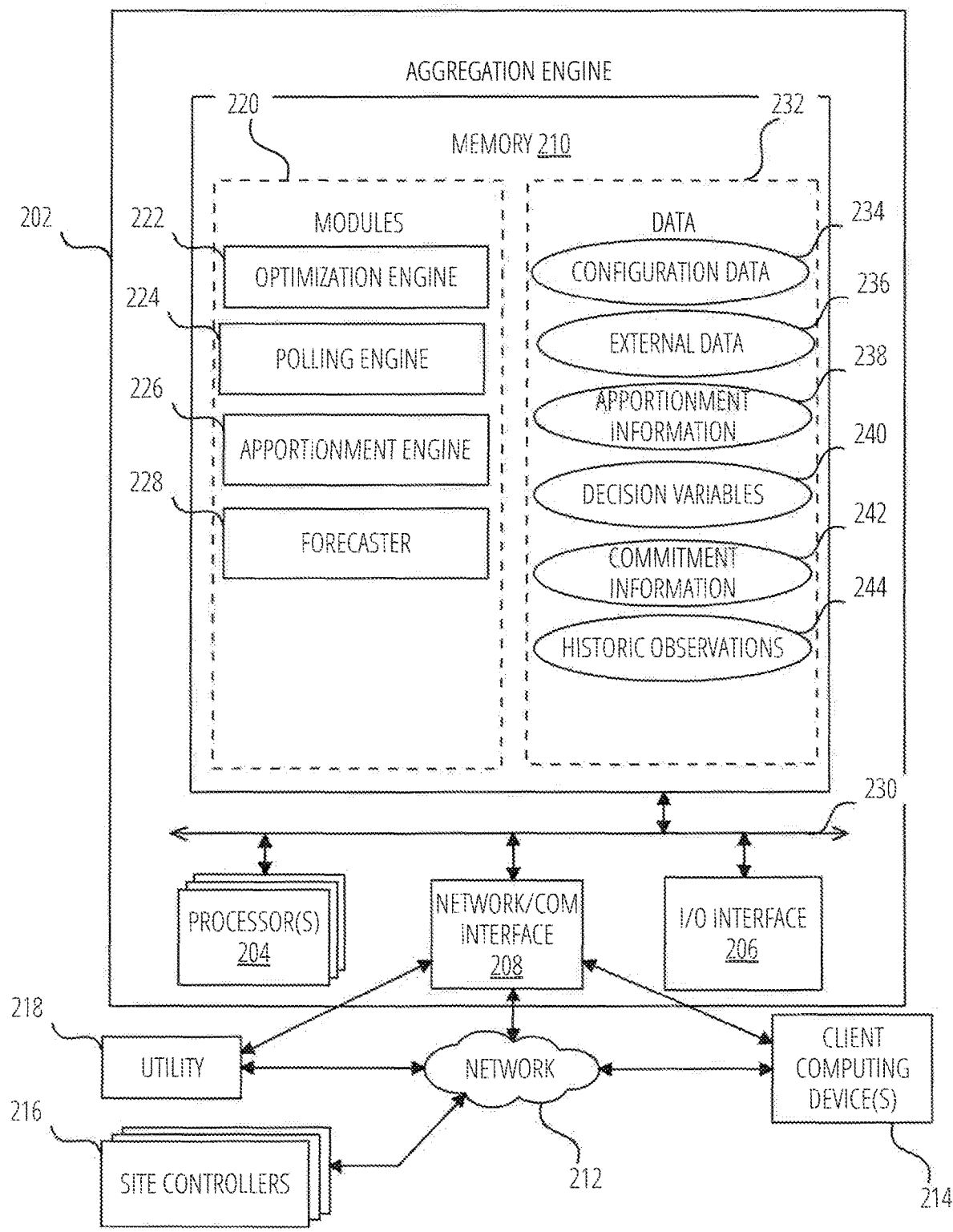
FIG. 2 is a block diagram of an aggregation engine (e.g., a centralized optimization engine, an aggregation controller), according to one embodiment of the present disclosure.

FIG. 2 is a block diagram of an aggregation engine 202 (e.g., a centralized optimization engine), according to one embodiment of the present disclosure. The aggregation engine 202 may be the same or similar to the aggregation engine 102 of FIG. 1 and perform similar operations and/or provide similar functionality. For example, the aggregation engine 202 may perform operations for coordinating a plurality of site controllers 216 (e.g., the site controllers 104 106, 108 of FIG. 1) to generate an aggregate change in power, such as to provide demand response. The aggregation engine 202 may receive (e.g., from a utility 218) aggregation opportunity information for an aggregation opportunity to participate in a response event. In one embodiment, the aggregation opportunity may comprise parameters describing a request to change power of one or more sites, including a target change in power to comply with the request.

The aggregation engine 202 may determine participation opportunity information based on the aggregation opportunity information and commitment information received from the plurality of site controllers 216. The participation opportunity information indicates one or more parameters for a site change in power to contribute to bringing an aggregate change in power toward the target change in power. The participation opportunity information also indicates an associated benefit for the site change in power. The aggregation engine 202 may iteratively, until the aggregate change in power is within a threshold of the target change in power: transmit the participation information to a plurality of site controllers, receive commitment information from the plurality of site controllers, and modify the participating opportunity information, as appropriate toward achieving the target change in power with a minimum sum of benefits to the sites to comply with the request, based on the commitment information. The commitment information from each of the plurality of site controllers may indicate a level of site change in power contributing to bringing the aggregate change in power toward the target change in power.

In one embodiment, the aggregation engine 202 may transmit participation opportunity information that includes apportionment information to the plurality of site controllers. The apportionment information may indicate a site benefit for providing the apportioned site change in power toward compliance with the target change in power (e.g., a minimum net change in power) of the aggregate maneuver. The aggregation engine 202 may, based on the aggregation opportunity information and commitment information received from the plurality of site controllers 216, determine whether to aggregate site changes in power from the plurality of site controllers 216 or otherwise perform a response maneuver (e.g., apportion all of the net change in power to fulfill the aggregation opportunity to one of the sites) to fulfill the aggregation opportunity, in order to receive a benefit and/or avert any specified penalty (e.g., as indicated in the aggregation opportunity information). The aggregation engine 202 may, with the assistance of the plurality of site controllers 216, determine the response (e.g., maneuver) that is economically optimized for the plurality of site controllers 216 and communicate commands, instructions, and/or other data to the plurality of site controllers 216 over a communication network 212.

The aggregation engine 202 of FIG. 2 includes one or more processors 204, an input/output (I/O) interface 206, a network or other communication (COM) interface 208, memory 210 and/or other computer readable storage medium, and a system bus 230.

The one or more processors 204 may include one or more general purpose devices, such as an Intel®, AMD®, or other standard microprocessor. The one or more processors 204 may include a special purpose processing device, such as an Application Specific Integrated Circuit (ASIC), a System on Chip, a System in Package (SiP), a Field Programmable Gate Array (FPGA), a Programmable Array Logic (PAL), a Programmable Logic Array (PLA), a Field Programmable Logic Array (FPLA), a Programmable Logic Device (PLD), or other customized or programmable device. The one or more processors 204 perform distributed (e.g., parallel) processing to execute or otherwise implement functionalities of the present embodiments. The one or more processors 204 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The I/O interface 206 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 208 may facilitate communication with other computing devices 214 and/or networks 212, such as the Internet and/or other computing and/or communications networks. The network/COM interface 208 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 208 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 230 may facilitate communication and/or interaction between the other components of the system, including the one or more processors 204, the memory 210, the I/O interface 206, and the network/COM interface 208.

The memory 210 may include, but is not limited to, static Read Only Memory (RAM), dynamic RAM, flash memory, one or more flip-flops, Read Only Memory (ROM), Electrically Programmable ROM (EPROM), CD-ROM, DVD, disk, tape, or magnetic, optical, or other computer storage medium. The memory 210 may include a plurality of program modules 220 and program data 232.

The program modules 220 may include all or portions of other elements of the aggregation engine 202. The program modules 220 may run multiple operations concurrently or in parallel by or on the one or more processors 204. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 210 may also include data 232. Data generated by the aggregation engine 202, such as by the program modules 220 or other modules, may be stored on the system memory 210, for example, as stored program data 232. The stored program data 232 may be organized as one or more databases.

The modules 220 may include an optimization engine 222, a polling engine 224, an apportionment engine 226, and a forecaster 228.

In one embodiment, the optimization engine 222 may determine participation opportunity information to coordinate (or even optimize) an aggregate response to an aggregate opportunity. The optimization engine 222 may determine the participation information based on the aggregation opportunity information and commitment information received from the plurality of site controllers 216. The participation opportunity information indicates one or more parameters for a site change in power to contribute to bringing an aggregate change in power toward the target change in power. The participation opportunity information also indicates an associated benefit for the site change in power. The optimization engine 222 may iteratively determine participation information and then adjust the participation information based on feedback of the plurality of sites controllers 216 in the commitment information. The optimization engine 222 may iteratively refine participation opportunity information, until the aggregate change in power is within a threshold of the target change in power.

In another embodiment, the optimization engine 222 may determine, in collaboration with the plurality of site controllers 216, if and how to participate in an aggregation opportunity. The aggregation opportunity may be an opportunity to participate in a demand response event. Stated otherwise, the aggregation engine 202 may determine, based on commitment information provided by the plurality of site controllers 216, whether to perform a maneuver to aggregate the plurality of site controllers 216 to provide a requested net change in power or energy (e.g., a requested power or energy level production or reduction in consumption) according to the aggregation opportunity. In one embodiment, the requested net change in power may be an amount relative to a baseline (e.g., non-participation) level. In another embodiment, the requested net change in power may be an amount relative to an expected level. To determine if and how to participate in the aggregation opportunity, the optimization engine 222 may determine apportionment information and in essence test the economics of the apportionment information with the plurality of site controllers 216 to learn how to adjust the apportionment information based on commitment information received from the plurality of site controllers 216 toward either an optimal implementation of the aggregation opportunity or nonparticipation. The apportionment information defines to the plurality of site controllers 216 a proposed site benefit to be awarded for provision of a proposed site change in power toward fulfillment of the aggregation opportunity. The apportionment information may have one or more numerical values associated therewith. For a first example, the apportionment information may specify a proposed site change in power value indicating a certain amount of site change in power to be provided during a specified time period and a corresponding site benefit value indicating a benefit (e.g., a dollar amount) for providing the proposed site change in power. Or, as another example, the apportionment information may specify a ratio value indicating a site benefit per unit of site change in power (e.g., dollars/kW) or site change in power per unit benefit (e.g., kW/dollar) over a specified time period. The apportionment information may also specify multiple time periods and corresponding apportionment information for each time period (e.g., time-varying apportionment information).

Determining the apportionment information may include determining initial apportionment information. In some embodiments determining the initial apportionment information includes producing random initial values for a proposed site benefit and a corresponding proposed site change in power, or a random initial value for a proposed ratio between site benefit and site change in power. The optimization engine 222 may then use a steepest descent algorithm to converge on optimal apportionment information. In some embodiments, the initial apportionment information may be determined to be historically averaged optimal apportionment information, or in other words an average of historically observed optimal apportionment information. The optimization engine 222 may update the historically averaged optimal apportionment information by computing a weighted average between previous historically observed optimal apportionment information and current optimal apportionment information (e.g., the previous historically observed optimal apportionment information may be weighed more heavily than the current optimal apportionment information to prevent non-recurring artifacts of the current optimal apportionment information from imposing undue influence on the updated historically averaged optimal apportionment information). In some embodiments the optimization engine 222 may use a random variable (e.g. based on historic observations of the optimal apportionment information) to model a probability distribution of the optimal apportionment information, and determine the initial optimal apportionment to be an expected value of the optimal apportionment information. The determination of the optimization engine 222 may be made based, in part, on external conditions (e.g., external data 236). The optimization engine 222 may also consider previously determined and proposed apportionment information (e.g., apportionment information 238) and/or values of decision variables (e.g., decision variables 240). The optimization engine 222 may consider historical data (e.g., historic observations 244), so as to consider a totality of circumstances and the apportionment information sets that were previously determined to be effective toward optimization.

The optimization engine 222 may determine how close to optimal the initial apportionment information is by polling the site controllers 216 with the initial apportionment information. The optimization engine 222 may employ the polling engine 224 to provide or otherwise perform the polling function. According to an optimization algorithm, the optimization engine 222 may repeatedly poll the site controllers 216 to find an optimized value or set of values. During repeated polling, proposed apportionment information may be provided to the site controllers 216 repeatedly until a desired level of commitment is achieved. A similar result to that of repeated polling may be obtained by providing multiple sets of apportionment information to the site controllers 216 and receiving multiple commitment values corresponding to the multiple sets of apportionment information back from the site controllers 216. The optimization engine 222 may utilize the polling engine 224 to repeatedly poll each given site controller for commitment information (e.g., a committed site change in power) and adjust the apportionment information based on the commitment information until the aggregate commitment of the plurality of site controllers 216 is within a predetermined range around a minimum net change in power of the aggregation opportunity. If the aggregate commitment of the plurality of site controllers 216, as indicated by the commitment information, is less than the predetermined range around the minimum net change in power, the optimization engine 222 increases the ratio between the proposed site benefit and the proposed site change in power. If, however, the aggregate commitment of the plurality of site controllers 216 is greater than the predetermined range around the minimum net change in power, the optimization engine 222 decreases the ratio between the proposed site benefit and the proposed site change in power. In embodiments where the apportionment information includes values for the proposed site benefit and the proposed site change in power, increasing or decreasing the ratio between the proposed site benefit and the proposed site change in power may be accomplished by adjusting the proposed site benefit, the proposed site change in power, or both. In embodiments where the apportionment information includes a value of the ratio itself, increasing or decreasing the ratio between the proposed site benefit and the proposed site change in power may be accomplished by adjusting the value of the ratio itself. In this way, the optimization engine 222 may employ control theory (e.g., model predictive control) to control the aggregate commitment of the plurality of site controllers 216 to stay within the predetermined range around the minimum net change in power of the aggregation opportunity.

In some embodiments the aggregation opportunity may offer multiple different levels of participation. By way of non-limiting example, an aggregation opportunity may include a two-level aggregation opportunity In the two-level example the aggregation engine 202 may receive aggregation opportunity information from the utility 218, and the aggregation opportunity information may indicate a first level minimum net change in power and a corresponding first level aggregate benefit for compliance with the first level minimum net change in power and/or a first level penalty for non-compliance with the first level minimum net change in power. The aggregation opportunity information may also indicate a second level minimum net change in power and a corresponding second level aggregate benefit for compliance with the second level minimum net change in power and/or a second level penalty for non-compliance with the second level minimum net change in power. One way the optimization engine 222 could handle the apportionment information in this two-level example is to include multiple levels of aggregation information (e.g., first level aggregation information targeting the first level of compliance and second level aggregation information targeting the second level of compliance). Each of the plurality of site controllers 216 may then respond with two-level commitment information (e.g., a first level commitment corresponding to the first level apportionment information and a second level commitment corresponding to the second level apportionment information.) The optimization engine 222 may utilize the polling engine 224 to poll the plurality of site controllers 216 with multiple different variations of the two-level apportionment information to converge on optimal values for the apportionment information of both the first and second levels. The optimization engine 222 may compare the overall economics of compliance with the first and second levels of the aggregation opportunity to select the more beneficial level of compliance (e.g., the level that results in a larger excess of the corresponding aggregate benefit after the site benefits have been distributed to the plurality of site controllers 216 based on their commitments to provide proposed site change in power and the corresponding proposed site benefit. It should be understood that this two-level example could be extended to any number of levels including three-level, four-level, ten-level, and N-level aggregation opportunities (where N is any positive integer).

The commitment information returned by each of the plurality of site controllers 216 may be determined by each of the plurality of site controllers 216 considering any incentives, award payments, or other incentives applicable to the given site controller apart from the site benefit of the aggregation opportunity. Accordingly, the aggregation opportunity may compete with other opportunities offered to the plurality of site controllers 216.

Tables 1-3 below illustrate values of apportionment information, commitment information, aggregate commitment, and aggregate cost for repeated polling or provision of multiple sets of apportionment information for three example embodiments of the disclosure. The examples of Tables 1-3 illustrate different ways the apportionment information may be varied to obtain optimal apportionment information. Although the apportionment is varied in different ways in Tables 103, it will be seen that the optimization illustrated by each of Tables 1-3 is equivalent to that of the others of the tables. Each row in Tables 1-3 represents a separate proposal, by the aggregation engine 202, for the apportionment information and the corresponding commitment information received from the plurality of site controllers 216 (e.g., for site A, site B, and site C) in response. Each row in Tables 1-3 also indicates an aggregate commitment for site A, site B, and site C (a sum of the commitment information for each of sites A, B, and C), and an aggregate cost of providing the proposed site benefit to the sites A, B, and C based on the commitment information.

Tables 1-3 illustrate examples of optimization of an aggregation opportunity having a minimum net change in power of 6 MW and a corresponding aggregate benefit of $30,000. In each of these examples the apportionment information is varied until an aggregate commitment of the plurality of site controllers 216 is within a predetermined range around the minimum net change in power. In the examples of Tables 1-3, the predetermined range around the minimum net change in power is selected to be 6.50 MW to 6.75 MW (leaving at least a 0.5 MW buffer between the lowest value of the predetermined range and the minimum net change in power of the aggregation maneuver to compensate for any slight underperformance in providing committed site change in power).

gation engine 202 indicating that site A is committed to providing 1 MW of site change in power, site B is committed to providing 2 MW of site change in power, and site C is committed to providing no site change in power for the initial proposed apportionment information. The corresponding aggregate commitment is 3 MW (corresponding to a $3,000 aggregate cost), which is less than the predetermined range around the minimum net change in power (6,500 MW to 6,750 MW). As a result, the aggregation engine 202 increases the proposed site benefit to $4,000 for 1 MW of site change in power (row 2 of Table 1). In response, site A commits to 3 MW, site B commits to 5 MW, and site C commits to 2 MW. The corresponding aggregate commitment is 10 MW (corresponding to an aggregate cost of $40,000), which is greater than the predetermined range. As a result, the aggregation engine 202 decreases the proposed site benefit to $2,500 for 1 MW of site change in power (row 3 of Table 1). In response, site A commits to 2 MW, site B commits to 3 MW, and site C commits to 1 MW. The corresponding aggregate commitment is 6 MW (corresponding to an aggregate cost of $15,000).

Although this aggregate commitment is equal to the minimum net change in power of the aggregation opportunity (and therefore corresponding to the true optimal apportionment information), the aggregation engine 202 increases the proposed site benefit because the aggregate commitment is less than the predetermined range (allowing a buffer for underperformance of the sites on their commitments). The aggregation engine 202 increases the proposed site benefit to $3,000 for 1 MW of site change in power (row 4 of Table 1). In response, site A commits to 2.3 MW, site B commits to 3.5 MW, and site C commits to 1.2 MW. The corresponding aggregate commitment is 7 MW (corresponding to an aggregate cost of $21,000), which is greater than the predetermined range. As a result, the aggregation engine 202 decreases the proposed site aggregate benefit to $2,750 for 1 MW of site change in power (row 5 of Table 1). In response, site A commits to 2.15 MW, site B commits to 3.25

TABLE 1

| Apportionment Information | | Commitment Information | | | | |
|---|---|---|---|---|---|---|
| | | Site A | Site B | Site C | | |
| Site Benefit | Site Change in Power | Committed Site Change in Power | Committed Site Change in Power | Committed Site Change in Power | Aggregate Commitment | Aggregate Cost |
| $1,000 | 1 MW | 1 MW | 2 MW | 0 MW | 3 MW | $3,000 |
| $4,000 | 1 MW | 3 MW | 5 MW | 2 MW | 10 MW | $40,000 |
| $2,500 | 1 MW | 2 MW | 3 MW | 1 MW | 10 MW | $15,000 |
| $3,000 | 1 MW | 2.3 MW | 3.5 MW | 1.2 MW | 7 MW | $21,000 |
| $2,750 | 1 MW | 2.15 MW | 3.25 MW | 1.1 MW | 6.5 MW | $17,875 |

In Table 1 the apportionment information includes a proposed site change in power and a proposed site benefit for providing the proposed site change in power. In this example the proposed site benefit is varied while the proposed site change in power is kept constant (e.g., from row to row) to find optimal apportionment information. As illustrated in Table 1, the aggregation engine 202 may generate initial apportionment information including an initial proposed site benefit value of $1,000 and a corresponding initial proposed site change in power of 1 MW. In response, the plurality of site controllers 216 (e.g., site controllers for site A, site B, and site C) provide commitment information to the aggre- MW, and site C commits to 1.1 MW. The corresponding aggregate commitment is 6.5 MW (corresponding to an aggregate cost of $17,875), which is within the predetermined range. Since the aggregate commitment is within the predetermined range, the aggregation engine 202 determines whether the corresponding aggregate cost is less than the aggregate benefit of the aggregation opportunity (in this case $30,000). Since the aggregate cost of $17,875 is less than the aggregate benefit of $30,000, the aggregation opportunity will be complied with and produce an estimated excess of about $12,125. This excess may be distributed among the sites.

TABLE 2

| Apportionment Information | | Commitment Information | | | |
| --- | --- | --- | --- | --- | --- |
| | | Site A | Site B | Site C | | |
| Site Benefit | Site Change in Power | Committed Site Change in Power | Committed Site Change in Power | Committed Site Change in Power | Aggregate Commitment | Aggregate Cost |
| $1,000 | 1.00 MW | 1 MW | 2 MW | 0 MW | 3 MW | $3,000 |
| $1,000 | 0.25 MW | 3 MW | 5 MW | 2 MW | 10 MW | $40,000 |
| $1,000 | 0.40 MW | 2 MW | 3 MW | 1 MW | 6 MW | $15,000 |
| $1,000 | 0.33 MW | 2.3 MW | 3.5 MW | 1.2 MW | 7 MW | $21,000 |
| $1,000 | 0.36 MW | 2.15 MW | 3.25 MW | 1.1 MW | 6.5 MW | $17,875 |

Table 2 is similar to Table 1 except that the site change in power is varied and the site benefit is kept constant to find optimal apportionment information.

TABLE 3

| Apportionment Information Ratio (MW/$1,000) | Commitment Information | | | | |
| --- | --- | --- | --- | --- | --- |
| | Site A Committed Site Change in Power | Site B Committed Site Change in Power | Site C Committed Site Change in Power | Aggregate Commitment | Aggregate Cost |
| 1 | 1 MW | 2 MW | 0 MW | 3 MW | $3,000 |
| 1/4 | 3 MW | 5 MW | 2 MW | 10 MW | $40,000 |
| 2/5 | 2 MW | 3 MW | 1 MW | 6 MW | $15,000 |
| 1/3 | 2.3 MW | 3.5 MW | 1.2 MW | 7 MW | $21,000 |
| 4/11 | 2.15 MW | 3.25 MW | 1.1 MW | 6.5 MW | $17,875 |

Table 3 is similar to Tables 1 and 2 except that the apportionment information includes a proposed ratio between the site benefit and the site change in power.

It is apparent from Tables 1-3 that regardless of how the apportionment information is varied, a similar or the same solution may be achieved for optimizing the apportionment information whether the proposed site benefit is varied, the proposed site change in power is varied, a proposed ratio between the site benefit and the site change in power, or combinations thereof. Changing the apportionment information, regardless of how, adjusts the proposed site benefit for a certain amount of site change in power, which the plurality of site controllers 216 use to gauge the economics of committing to providing site change in power towards contributing to the minimum net change in power of the aggregation opportunity.

The optimization engine 222 may determine whether to participate in the aggregation opportunity by comparing the aggregate benefit specified in the aggregation opportunity (e.g., specified in aggregation opportunity information) to an aggregate cost of providing the proposed site benefit for the total committed site change in power of the one or more of the site controllers, as indicated in the commitment information. The aggregate cost may include a sum of the committed site changes in power of the plurality of site controllers 216 multiplied by a ratio of the proposed site benefit to the proposed site change in power. The aggregate benefit for complying with the aggregation opportunity may include one or both of a benefit (e.g., an economic benefit) for participating in the aggregation opportunity and/or a penalty (e.g., an economic penalty) for not participating in the aggregation opportunity. For example, the aggregate benefit may be a rate reduction, a statement credit, or even a payment or other tangible benefit. The aggregate benefit may also be a function of power level production (e.g., actual power level production) above one of a baseline (e.g., participation) level and/or an expected level. The aggregate benefit can be a function of the requested power level production (e.g., as requested by the aggregation opportunity). The aggregate benefit may also consider any incentives, award payments, or other incentives applicable to individual sites beyond an incentive specified by the aggregation opportunity.

The plurality of site controllers 216 may self-determine which of the plurality of site controllers 216 will contribute toward an aggregate maneuver in response to an aggregation opportunity. Participation of a site in a maneuver to comply with an aggregation opportunity may include providing at least a portion of requested minimum net change in power for at least a portion of the period of time of the aggregation opportunity. Producing or otherwise providing a portion of the requested net change in power can comprise a reduction in consumed power (e.g., through control of loads, generators, batteries). Alternatively or in addition, producing or otherwise providing a portion of the requested change in power can comprise original generation of electricity (e.g., via generator, photovoltaic panel, etc.).

In some embodiments, upon determining whether to participate in the aggregation opportunity, the optimization engine 222 may provide instructions to the plurality of site controllers 216 to proceed with the committed site change in power. For example, the optimization engine 222 may transmit, via the network/COM interface 208, a command to the plurality of site controllers 216 to schedule participation in the aggregation opportunity. As another example, the optimization engine 222 may merely allow the plurality of site controllers 216 to control operation of their DERs during the period of an aggregation opportunity without providing a command to do so.

As can be appreciated, in other embodiments, some or all of the functionality of the optimization engine 222 may be provided by additional modules 220 or sub-modules of the aggregation engine 202. The optimization engine 222 may orchestrate other modules 220 to perform operations for aggregating power of from a plurality of site controllers 216.

The polling engine 224 may poll, via the network/COM interface 208, each of the plurality of site controllers 216 to inquire a level of commitment of the given site controller 216 participating in the aggregation opportunity based on the apportionment information. In some embodiments, polling each site controller 216 may include providing apportionment information and then receiving commitment information from the site controller 216 that is derived based on an optimization of expected operation of the site controller 216 during the time period of the aggregate maneuver. For example, polling each site controller 216 may include providing proposed apportionment information, and then receiving commitment information (e.g., a committed power level value) from the site controller 216. The optimization performed by the corresponding site controller 216 may also consider any incentives, award payments, or other incentives applicable to individual site controllers 216 beyond a site benefit specified by the apportionment information.

The polling engine 224 may poll the plurality of site controllers 216 by polling corresponding site controllers 216 for a plurality of sites. Each site may include a site controller 216 that may perform optimization of operation of one or more DERs of the corresponding site. Accordingly, the site controller 216 of a given site can generate and provide commitment information back to the polling engine 224 in response to apportionment information. The polling engine 224 polls a site controller 216 to inquire a commitment level of the site controller 216 to contribute to the minimum net change in power of the aggregation opportunity. A site controller 216 for a site may be onsite (e.g., located proximate to the site), or may be located remote from the site, such as in a cloud-based computing environment or other remote server for servicing or otherwise controlling the DERs of the site.

The apportionment engine 226 may determine rules, parameters, control variables, or the like for preparing the apportionment information to indicate to a site controller 216 a proposed site benefit for providing a proposed site change in power and a period of time for the site controller 216 to participate in the aggregation opportunity. The period may be all or a portion of a time period of an aggregation opportunity. In other words, the period indicated in the apportionment information may be a fractional portion of the total period for an aggregation opportunity. The apportionment engine 226 may determine that a given site controller 216 is needed for only a portion of the entire period of the aggregation opportunity, because other site controllers 216 of the plurality of site controllers 216 can handle power production or reduction during other portions of the period of the aggregation opportunity.

The apportionment information includes an indication of a proposed site benefit to be provided for a proposed quantity of site change in power. This may include separate quantities for a proposed dollar amount of a proposed site benefit and a proposed energy or power value for a proposed site change in power. In some embodiments the aggregation information includes a ratio indication of an amount of power production in terms of a participation benefit, such as a unit value per unit power (e.g., value in dollars ($) per unit power—$/kW). Stated otherwise, the engagement rule set may indicate an amount of power production in terms of offering a participation benefit (e.g., "I will pay you $40 for every kW generated, produced, saved, or otherwise provided back to the grid during the period of the aggregation opportunity").

In some embodiments, the polling engine 224 can transmit apportionment information to one or more of the plurality of site controllers 216 that is different from that transmitted to others of the plurality of site controllers 216. This may be useful in cases where an aggregator has different compensation contracts with each site. For example, one site may receive a proposal of $0.50 per kWh for participation, and another may receive a proposal of $0.30 per kWh for participation.

The apportionment engine 226 may receive commitment information from the plurality of site controllers 216. The commitment information may include an indication of a committed site change in power from the plurality of site controllers 216 (e.g., an amount of power production or reduction) that each of the plurality of site controllers 216 is committed to provide, which may be specified in units of power (e.g., kW) or units of energy (e.g., kWh).

The apportionment engine 226 may determine committed site change in power values for each given site controller 216. The determination of the apportionment engine 226 may be made based on the commitment information 242 received from the plurality of site controllers 216.

The data 232 stored on the memory 210 may include configuration data 234, external data 236, apportionment information 238, decision variables 240, commitment information 242, and/or historic observations 244.

The configuration data 234 may be received from each of the plurality of site controllers 216 to communicate constraints and characteristics of the plurality of site controllers 216. For example, the data 232 may communicate a size or other capacity information of one or more batteries of an energy storage system of the site controller 216. The configuration data 234 may include tariff information for a given site controller 216, which may provide time of use rate and/or demand rate for any given day and/or time. In some embodiments the configuration data 234 may include market data (e.g., data associated with changes in the benefit for participation). In some embodiments the configuration data 234 includes information indicating a historic distribution system load to help the optimizer determine when an aggregation opportunity event may be called in advance of the call. The modules 220 may, in turn, include a forecaster 228 configured to forecast and begin planning an aggregation opportunity before it is even called.

The external data 244 may include information such as weather forecasts, changing tariffs, fuel costs, event data, and market value of resources (e.g., costs of site components such as a battery), which may inform or otherwise impact determination of a proposed set of apportionment information and/or values for the decision variables.

The apportionment information 238, decision variables 240, commitment information 242, may be a record of previously proposed and/or final values as determined by the optimization engine 222, the polling engine 224, and/or the apportionment engine 226 and recorded in the memory 210.

The commitment information 242 may be values returned to the aggregation engine 202 by plurality of site controllers 216. The commitment information 242 may include information indicating a level of commitment of a site controller 216 to contribute a site change in power toward the minimum net change in power of the aggregation opportunity. For example, the commitment information 242 may include one or more power or energy values (e.g., for one or more periods of time during the aggregation opportunity), or the like. The commitment information 242 may be referenced or otherwise utilized by one or more of the optimization engine 222, the polling engine 224, and/or the apportionment engine 226.

The historic observations 244 may be continuously recorded and stored in memory 210 to inform future optimizations and/or determinations of aggregation information and values for decision variables 240.

As can be appreciated, the aggregation engine 202 may store other types of data 232 in memory 210. The other types of data 232 may be generated by and/or utilized by the optimization engine 222, the polling engine 224, and the apportionment engine 226.

The aggregation engine 202, or the components of the aggregation engine 202 in combination, can receive an aggregation opportunity (e.g., a demand response call to participate in an aggregation opportunity), for example, from the utility 218. The aggregation opportunity may specify a minimum net change of power to be provided over a period of time (in the future). The aggregation opportunity may also specify an aggregate benefit for providing the requested net change in power for the period of time. The aggregation engine 202 can poll each of a plurality of site controllers 216 to indicate a proposed site benefit for providing a proposed site change in power towards providing the minimum net change in power. The aggregation engine 202 receives, via the network/COM interface 208, commitment information from the plurality of site controllers 216. After one or more pollings the aggregation engine 202 can determine, based on the commitment information, the apportionment information, the minimum net change in power, and the aggregate benefit, whether to participate in the aggregation opportunity.

The aggregation engine 202 may also determine, based on the commitment information, the apportionment information, the minimum net change in power, and the aggregate benefit, whether and how the aggregate benefit to be received for participation in the aggregation opportunity may be divided or otherwise distributed among the plurality of site controllers 216 in exchange for the participation of the plurality of site controllers 216. The aggregation engine 202 may, according to one embodiment, allocate the aggregate benefit according to a proportion of power to be produced by the site relative to the total power requested.

Figure 3:
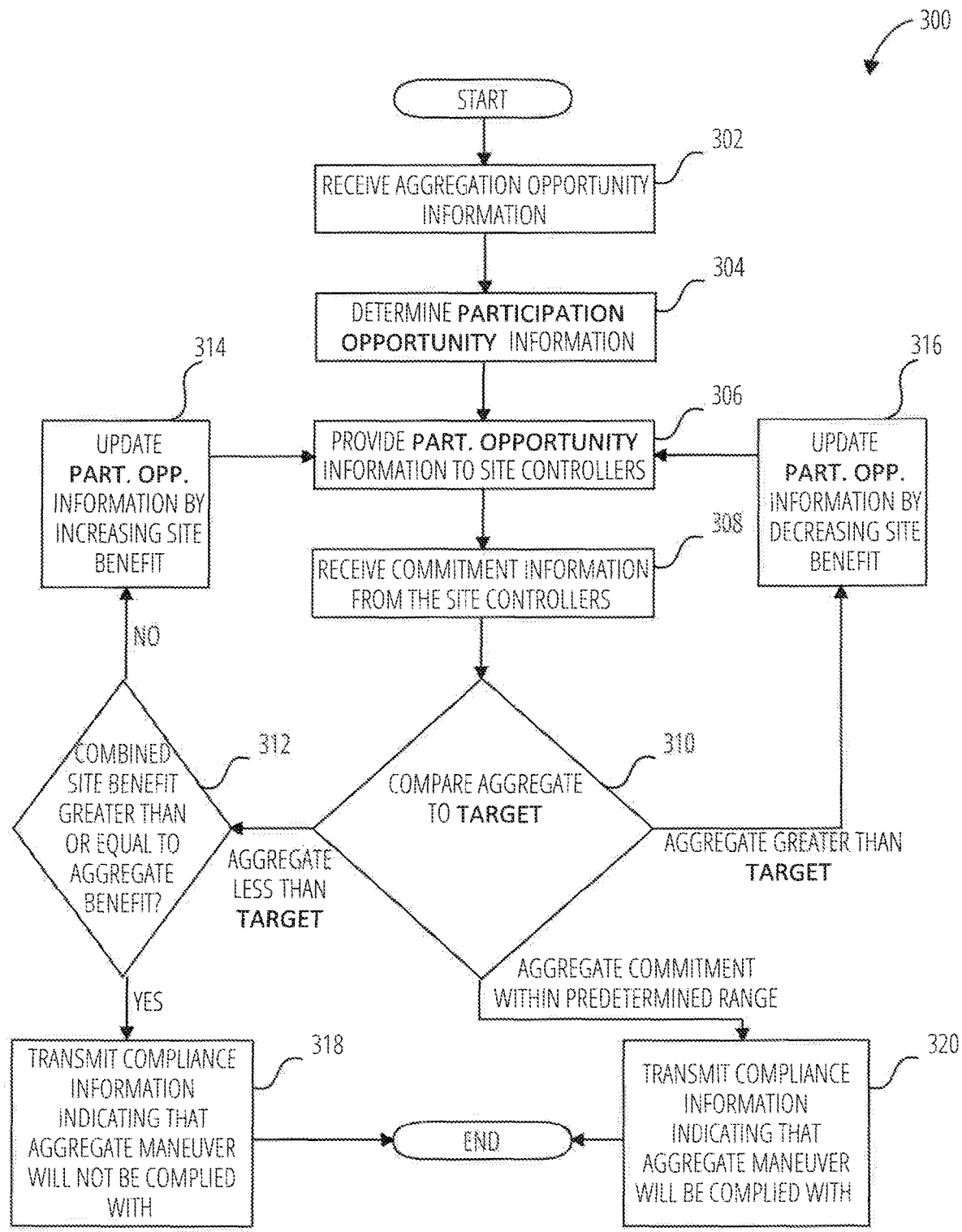
FIG. 3 is a flowchart illustrating a method of aggregating contributions of DERs at a plurality of different sites towards compliance with an aggregate maneuver, according to some embodiments.

FIG. 3 is a flowchart illustrating a method 300 of aggregating contributions of DERs at a plurality of different sites towards compliance with an aggregate maneuver, according to some embodiments. The method 300 includes receiving 302, by an aggregation engine (e.g., from a utility), aggregation opportunity information indicating a target net change in power and an aggregate benefit for providing the minimum net change in power for a time period of the aggregate maneuver. The method 300 also includes determining 304 participation opportunity information indicating a site benefit for providing a site change in power. The method 300 further includes providing 306 the participation opportunity information to site controllers of the plurality of different sites. The site controllers weigh the costs and benefits (e.g., the proposed site benefit) of providing a level or quantity of the site change in power toward contributing to the target change in power, and determine site changes in power that the site controllers are committed to provide. The site controllers transmit the site changes in power in commitment information to the aggregation engine.

The method 300 includes receiving 308, at the aggregation engine, the commitment information from the site controllers, and comparing 310 an aggregate change in power to a target change in power of the aggregation opportunity. If the aggregate commitment is less than the predetermined range the method 300 includes determining 312 whether a combined site benefit, based on the proposed site benefit of the participation opportunity information and the commitment information, is greater than or equal to the aggregate benefit of the aggregation opportunity information. If the combined site benefit is greater than or equal to the aggregate benefit the method 300 includes transmitting 318 compliance information (e.g., to the utility) indicating that the aggregate maneuver will not be complied with. This non-compliance results from the cost of compliance exceeding the aggregate benefit of the aggregation maneuver.

If determining 312 whether the combined site benefit is greater than or equal to the aggregate benefit reveals that the combined site benefit is less than the aggregate benefit, the method 300 includes updating 314 the participation opportunity information by increasing the site benefit, providing 306 the updated participation opportunity information to the site controllers, receiving 308 commitment information from the site controllers based on the updated participation opportunity information, and comparing 310 the aggregate commitment to the predetermined range around the minimum net change in power of the aggregation opportunity.

If the aggregate commitment is greater than the predetermined range the method 300 includes updating 316 the participation opportunity information by decreasing the site benefit, providing 306 the updated participation opportunity information to the site controllers, receiving 308 commitment information from the site controllers based on the updated participation opportunity information, and comparing 310 the aggregate commitment to the predetermined range around the minimum net change in power of the aggregation opportunity.

If the aggregate commitment is within the predetermined range the method 300 includes transmitting 320 compliance information (e.g., to the utility) indicating that the aggregate maneuver will be complied with.

Figure 4:
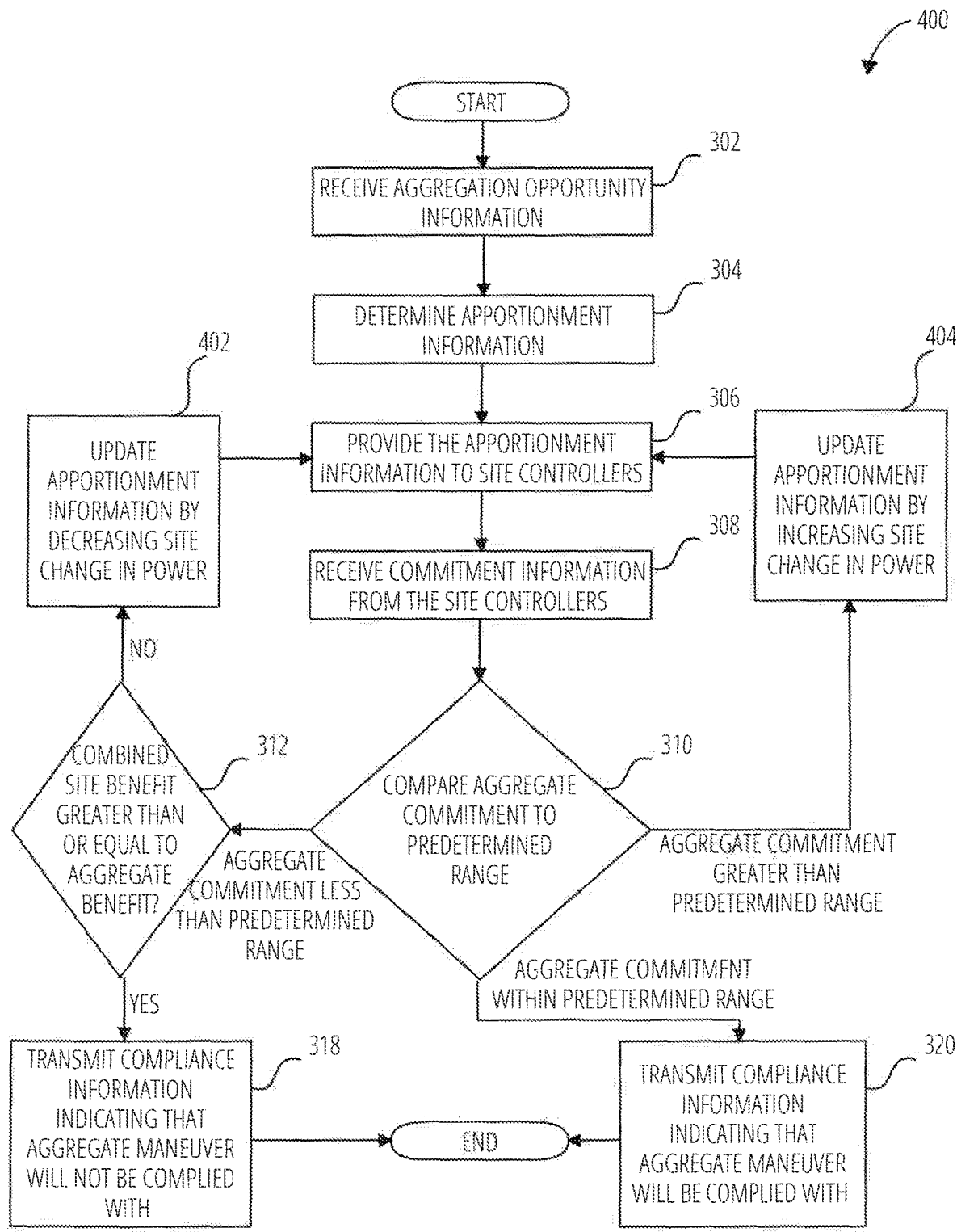
FIG. 4 is a flowchart illustrating a method of aggregating contributions of DERs at a plurality of different sites towards compliance with an aggregate maneuver, according to some embodiments.

FIG. 4 is a flowchart illustrating a method 400 of aggregating contributions of DERs at a plurality of different sites towards compliance with an aggregate maneuver, according to some embodiments. The method 400 is similar to method 300 of FIG. 3 except that the method 400 involves participation opportunity information that is apportionment information and rather than updating 314, 316 the participation opportunity information by increasing or decreasing, respectively, the site benefit as discussed with reference to FIG. 3, the method 400 includes updating 402, 404 the apportionment information by decreasing or increasing, respectively, the site change in power. As discussed above with reference to Tables 1-3 above, the way that the apportionment information is updated, whether by changing the site benefit, the proposed site change in power, both the site benefit and the proposed site change in power, or some ration between the site benefit and the proposed site change in power, does not change the optimization. In other words, the same optimization would be achieved by using the method 300 of FIG. 3, the method 400 of FIG. 4, or some other method that updates the apportionment information in some other way.

Distributed Energy Resources and Local Control Thereof

Figure 5:
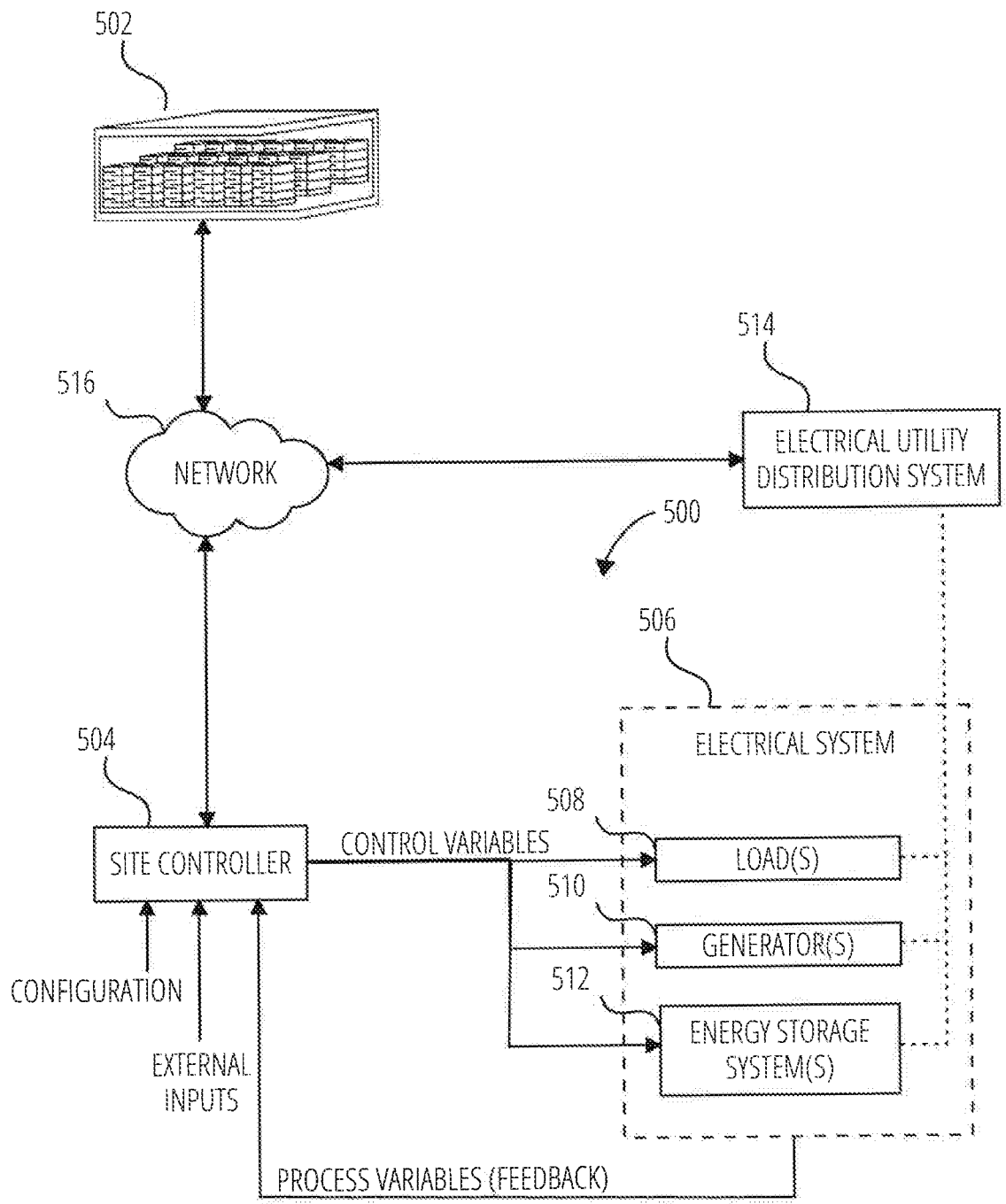
FIG. 5 is a block diagram illustrating a system architecture of a site, according to one embodiment of the present disclosure.

FIG. 5 is a block diagram illustrating a system architecture of a site 500, according to one embodiment of the present disclosure. FIG. 5 also provides a control diagram of site 500, according to one embodiment of the present disclosure. Stated otherwise, FIG. 5 is a representative diagram of a system architecture of a site 500 including a site controller 504, according to one embodiment. The site 500 comprises an electrical system 506 that is controlled by the site controller 504. The electrical system 506 includes DERs including one or more loads 508, one or more generators 510, and one or more energy storage systems (ESSs) 512. The electrical system 506 is coupled to an electric utility distribution system 514, and therefore may be considered on-grid. Similar electrical systems exist for other applications, such as a photovoltaic generator plant, an off-grid building, etc.

In the diagram of FIG. 5, the site controller 504 is shown on the left-hand side and the electrical system 506, sometimes called the "plant," is shown on the right-hand side. An aggregation engine 502 interconnects with the site controller 504 of the site 500 and the electric utility distribution system 514, such that the aggregation engine 502 can receive aggregation opportunities from the electric utility distribution system 514 and can communicate with the site controller 504 of the site 500 to coordinate a maneuver of an aggregation opportunity. The aggregation engine 502 may interconnect with site controllers of a plurality of sites.

The site controller 504 may be a site controller of the site 500 and can include electronic hardware and software in one embodiment. In one example arrangement, the site controller 504 includes one or more processors and suitable storage media, which stores programming in the form of executable instructions which are executed by the processors to implement the control processes. The site controller 504 is in communication over a network 516 with the aggregation engine 502, which may be similar to the aggregation engine 502 of FIG. 1 or the aggregation engine 202 of FIG. 2.

The electrical system 506 includes a combination of all the one or more loads 508, the one or more generators 510, and the one or more ESSs 512 of the site 500. The electrical system 506 may provide local energy distribution or connectivity from the electric utility distribution system 514 to or between the one or more loads 508, the one or more generators 510, and/or the one or more ESSs 512 of the site 500.

Loads are consumers of electrical energy within an electrical system. Examples of loads are air conditioning systems, motors, electric heaters, etc. The sum of the loads' electricity consumption rates can be measured in units of power (e.g. kW) and simply called "load" (e.g., a building load).

Generators may be devices, apparatuses, or other means for generating electrical energy within an electrical system. Examples are solar photovoltaic systems, wind generators, combined heat and power (CHP) systems, and diesel generators or "gen-sets." The sum of electric energy generation rates of the one or more generators 510 can be measured in units of power (e.g., kW) and simply referred to as "generation."

As can be appreciated, loads may also generate at certain times. An example may be an elevator system that is capable of regenerative operation when the carriage travels down. Accordingly, this load may, at times, serve as a DER similar to a generator. Distributed Energy Resource (DER) in this context is any device that can produce or consume energy and are often controllable in some way. In one embodiment, electrically connected DERs (simplified to DERs here) can generate or consume electrical energy. Almost all DERs are controllable to some extent. PV generators, wind turbines, and diesel gensets are DERs, as are energy storage systems (ESSs). Even loads are DERs, and most of them (such as lights) can be controlled in limited ways by turning them off or using other means such as changing the setting on a thermostat. The net load of a DER or collection of DERs is the load (power consumption) minus generation (power generation). Net load may be positive or negative.

Unadjusted net power or unadjusted net load may refer herein to net load in the absence of active control by the site controller 504. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation, and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is electricity demand as defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 5, the electrical system 506 may provide information to the site controller 504, such as by providing process variables. The process variables may provide information, or feedback, as to a status of the electrical system 506 and/or one or more components (e.g., loads, generators, ESSs) therein. For example, the process variables may provide one or more measurements of a state of the electrical system 506. The site controller 504 receives the process variables for determining values for control variables to be communicated to the electrical system 506 to effectuate a change to the electrical system 506 toward meeting a controller objective for the electrical system 506. For example, the site controller 504 may provide a control variable to adjust one of the one or more loads 508, to increase or decrease generation by the one or more generators 510, and to utilize (e.g., charge or discharge) the one or more ESSs 512.

The site controller 504 may receive a configuration (e.g., a set of configuration elements), which may specify one or more constraints of the electrical system 506. The configuration may inform the determination of the values of the control variables.

The site controller 504 may also receive external inputs (e.g., weather reports, changing tariffs, fuel costs, event data), which may inform the determination of the values of the control variables. A set of external inputs may be received by the site controller 504. The set of external inputs may provide indication of one or more conditions that are external to the site controller 504 and the electrical system 506.

The site controller 504 may receive (e.g., from the aggregation engine 502) participation opportunity information (e.g., apportionment information), which may provide to the site 500 a proposed site benefit for providing a proposed site change in power and a period of time for the site 500 to participate in an aggregation opportunity. For example, the participation opportunity information may provide one or more proposed site benefit values, one or more proposed site change in power values, one or more ratios between site benefit and site change in power, constraints, rules, instructions, and/or commands from the aggregation engine 502 for participating in an aggregate maneuver for an aggregation opportunity. The site controller 504 may utilize the aggregation information to inform determination of the values of the control variables.

Participation opportunity information may be utilized to evaluate a scenario (e.g., potentially a hypothetical scenario), such that the site controller 504 can determine an optimal level of commitment to provide site change in power to contribute to the minimum net change in power of the aggregate maneuver. In some embodiments, aggregation information provides proposed values. In some embodiments, aggregation information provides committed values such that the site controller 504 delivers on the committed site change in power without receiving further instructions from the aggregation engine 502. In some embodiments, the site controller 504 receives a command from the aggregation engine 502 to provide the committed site change in power.

As can be appreciated, a proposed site benefit for providing a proposed site change in power may be provided to a site controller 504 of a site 500 in aggregation information, a configuration, external inputs, or any suitable input and/or communication.

As noted, the site controller 504 may attempt to meet certain objectives by changing a value associated with one or more control variables, if necessary. The objectives may be predefined, and may also be dependent on time, any external inputs, any participation opportunity information, any process variables that are obtained from the electrical system 506, and/or the control variables themselves. Some examples of controller objectives for different applications are:
  Provide a level of power proportional to a received proposed site change in power over a prescribed period of time;
  Reduce consumption of power proportionally to a received proposed site change in power over a prescribed period of time;
  Minimize demand (kW) over a prescribed time interval;
  Minimize demand charges ($) over a prescribed time interval;
  Minimize total electricity charges ($) from the grid;
  Reduce demand (kW) from the grid by a prescribed amount during a prescribed time window; and
  Maximize the life of an energy storage device (e.g., the one or more ESSs 512).

Objectives can also be compound—i.e., a controller objective can comprise multiple individual objectives. One example of a compound objective is to minimize demand charges while maximizing the life of the energy storage device. Another example of a compound objective is providing a committed level of site change in power for at least a portion of a maneuver of an aggregation opportunity while minimizing demand charges. Other compound objectives including different combinations of the individual objectives are possible.

The inputs that the site controller 504 may use to determine (or otherwise inform a determination of) the control variables can include configuration, external inputs, participation opportunity information, and process variables.

Process variables may typically be measurements of the state of the electrical system 506 and are used by the site controller 504 to, among other things, determine how well its objectives are being met. These process variables may be read and used by the site controller 504 of the site 500 to generate new control variable values. The rate at which process variables are read and used by the site controller 504 depends upon the application, and may typically range from once per millisecond to once per hour. For battery energy storage system applications, the rate is often between 10 times per second and once per 15 minutes. Examples of process variables may include:
  Unadjusted net power
  Unadjusted demand
  Adjusted net power
  Demand
  Load (e.g., load energy consumption for the one or more loads 508)
  Generation for one or more loads
  Actual ESS charge or generation rate for one or more ESSs
  Frequency
  Energy storage device state of charge (SoC) (%) for one or more ESSs
  Energy storage device temperature (deg. C) for one or more ESSs
  Electrical meter outputs such as kilowatt-hours (kWh) or demand A configuration received by the site controller 504 (or input to the site controller 504) may include or be received as one or more configuration elements (e.g., a set of configuration elements). The configuration elements may specify one or more constraints associated with operation of the electrical system 506. The configuration elements may define one or more cost elements associated with operation of the electrical system 506. Each configuration element may set a status, state, constant or other aspect of the operation of the electrical system 506. The configuration elements may be values that are typically constant during the operation of the site controller 504 and the electrical system 506 of the site 500. The configuration elements may specify one or more constraints of the electrical system 506 and/or specify one or more cost elements associated with operation of the electrical system 506.

Examples of configuration elements may include:
  ESS type (for example if a battery: chemistry, manufacturer, and cell model)
  ESS configuration (for example, if a battery: number of cells in series and parallel) and constraints (such as maximum charge and discharge powers)
  ESS efficiency properties
  ESS degradation properties (as a function of SoC, discharge or charge rate, and time)
  Electricity supply tariff (including ToU supply rates and associated time windows)
  Electricity demand tariff (including demand rates and associated time windows)
  Electrical system constraints such as minimum power import
  ESS constraints such as SoC limits or power limits
  Historic data such as unadjusted net power or unadjusted demand, weather data, and occupancy
  Operational constraints such as a requirement for an ESS to have a specified minimum amount of energy at a specified time of day External inputs are variables that may be used by the site controller 504 and that may change during operation of the site controller 504. Examples are weather forecasts (e.g., irradiance for solar generation and wind speeds for wind generation) and event data (e.g., occupancy predictions). In some embodiments, tariffs (e.g., demand rates defined therein) may change during the operation of the site controller 504, and may therefore be treated as an external input. In some embodiments, the participation opportunity information (e.g., a proposed site benefit for providing a proposed site change in power) may be received by the site controller 504.

The outputs of the site controller 504 include the control variables that can affect behavior of the electrical system 506. Examples of control variables are:

ESS power command (kW or %). For example, an ESS power command of 50 kW would command the ESS to charge at a rate of 50 kW per unit time, and an ESS power command of −20 kW would command the ESS to discharge at a rate of 20 kW per unit time.

Building or subsystem net power increase or reduction (kW or %).

Renewable energy increase or curtailment (kW or %). For example, a photovoltaic (PV) system curtailment command of −100 kW would command a PV system to limit generation to no less than −100 kW. Again, the negative sign is indicative of the fact that the value is generative (non-consumptive).

In some embodiments, control variables that represent power levels may be signed, e.g., positive for consumptive or negative for generative.

The outputs of the site controller 504 may also include commitment information, which may indicate or otherwise represent a committed level of site change in power the site 500 is committed to provide to participate in an aggregation opportunity. In some embodiments, the commitment information may include one or more power or energy values corresponding to one or more time periods of the aggregate maneuver.

In one illustrative example, consider that an objective of the site controller 504 may be to reduce demand charges while preserving battery life. In this example, only the one or more ESSs 512 may be controlled. To accomplish this objective, the site controller 504 should have knowledge of a configuration of the electrical system 506, such as the demand rates and associated time windows, the battery capacity, the battery type and arrangement, etc. Other external inputs may also be used to help the site controller 504 meet its objectives, such as a forecast of upcoming load and/or forecast of upcoming weather (e.g., temperature, expected solar irradiance, wind). Process variables from the electrical system 506 that may be used may provide information concerning a net power, power or energy consumption, demand, a battery SoC, an unadjusted building load, and an actual battery charge or discharge power of the electrical system 506. In this one illustrative example, a control variable may be a charge or discharge power (e.g., a charge or discharge power for a battery of the one or more ESSs 512) of the one or more ESSs 512. In order to more effectively meet the objective, the site controller 504 may continuously track the peak net building demand (kW) over each applicable time window, and use the battery to charge or generate at appropriate times to limit the demand charges. In one specific example scenario, the one or more ESSs 512 may be utilized to attempt to achieve substantially flat (or constant) demand from the electric utility distribution system 514 (e.g., the grid) during an applicable time window when a demand charge applies.

The objective of the site controller 504 may be compounded by receiving participation opportunity information from the aggregation engine 502, which may include a proposed site benefit for providing a proposed site change in power for a period of time. The site controller 504 would then determine the control variable value(s) to optimize operation of the electrical system 506 in view of the aggregation information (e.g., to see if operation may be more optimal if the proposed site benefit is taken advantage of), and maintain the objectives of reducing demand charges while preserving battery life.

As will be described more fully below, the site controller 504 may utilize an optimization algorithm and may determine the control variables in advance of a time period of using those control variables. Advance determination of the control variables may enable repeated inquiry or polling of the site 500 by the aggregation engine 502 to test varying participation opportunity information to determine optimized commitment information, and thereby minimize a cost of participation in an aggregation opportunity.

Figure 6:
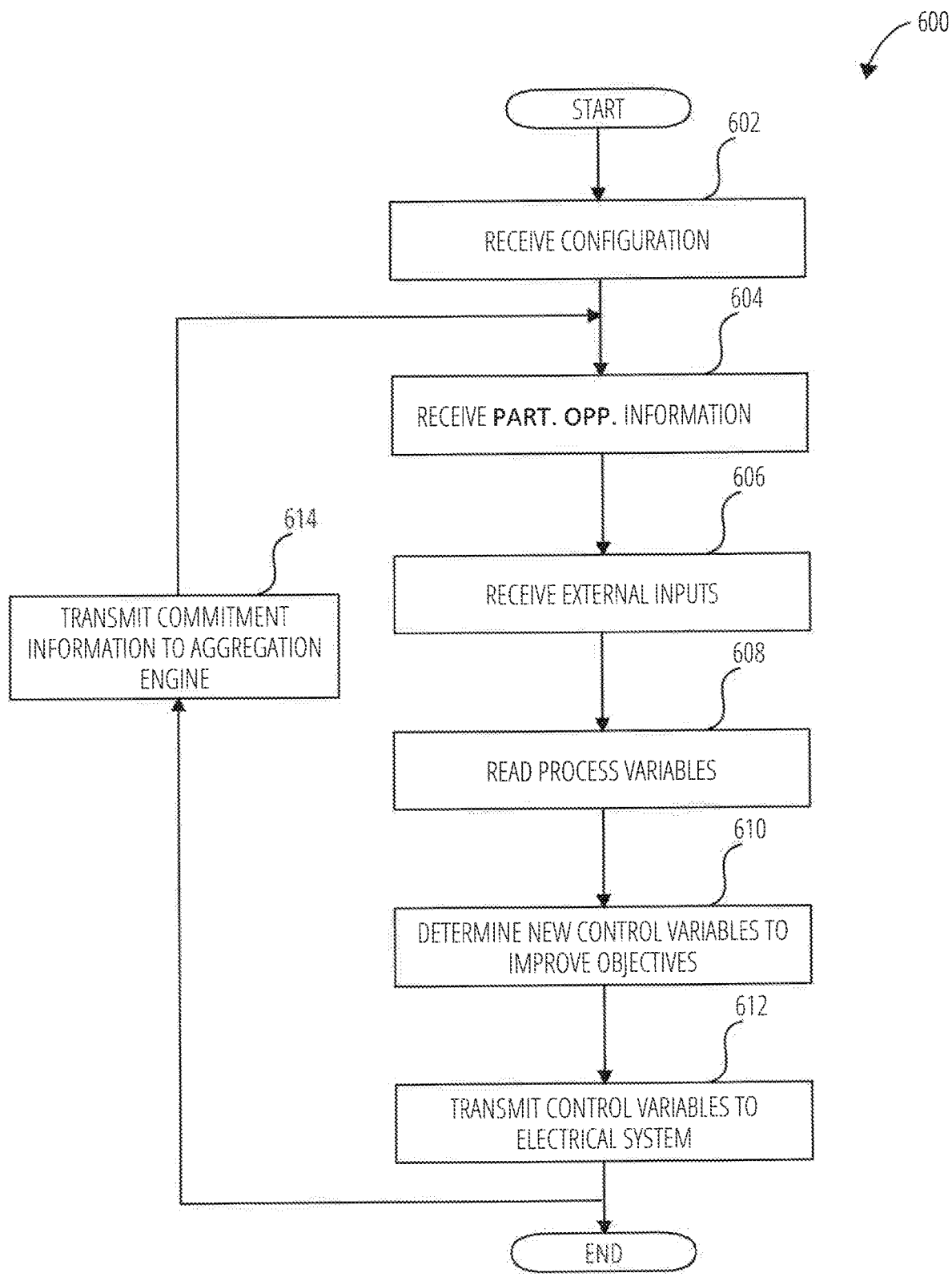
FIG. 6 is a flow diagram illustrating a method of controlling an electrical system of a site, according to one embodiment of the present disclosure.

FIG. 6 is a flow diagram illustrating a method 600 of controlling an electrical system of a site (e.g., the site 500 of FIG. 5), according to one embodiment of the present disclosure. The method 600 may be implemented by a site controller of an electrical system, such as the site controller 504 that is controlling the electrical system 506 of the site 500 of FIG. 5. The method 600 may include the site controller receiving 602 (e.g., reading or otherwise receiving) a configuration (e.g., a set of configuration elements) of the electrical system of the site. As previously described, the configuration elements may provide information as to the configuration of the electrical system.

The method 600 also includes the site controller receiving 604 (e.g., reading or otherwise receiving) participation opportunity information (e.g., a proposed site benefit for providing a proposed site change in power) from a remote aggregation engine (e.g., the aggregation engine 502 of FIG. 5). The participation opportunity information may be received in connection with an aggregation opportunity promulgated to the remote aggregation engine by a utility, or other entity desiring to obtain additional net change in power. For example, a utility or other entity may desire to obtain additional power resources and may seek power from an aggregation of power provided through use of DERs of a plurality of sites. The participation opportunity information may indicate one or more proposed site benefits for providing one or more proposed site changes in power towards complying with a minimum net change in power of an aggregation opportunity. Multiple sets of proposed site benefit and proposed site change in power may be included in the participation opportunity information in some situations, such as where the proposed site change in power and/or the proposed site benefit change during a time period. For example, the aggregation request may specify a total requested power level of 100 MW for 60 minutes of a 90-minute total time period and 75 MW for a remaining 30 minutes of the 90-minute total time period. Accordingly, the participation opportunity information may provide multiple sets of proposed site benefits and proposed site changes in power to accommodate the changes to the total requested power level (e.g., to incentivize greater provision of site change in power during periods of time when the aggregation request requires greater net change in power). Further, or alternatively, the participation opportunity information may include or otherwise be accompanied by an amount of time corresponding to a given set of values for the proposed site benefit and the proposed site change in power. Stated otherwise, each set of proposed site benefit and proposed site change in power may include timing information such as a timing value specifying a duration or period over which that set of proposed site benefit and proposed site change in power applies. When an aggregation opportunity is not available, participation opportunity information may not be received 602.

The method 600 may also include the site controller receiving 606 (e.g., reading or otherwise receiving) external inputs, such as weather reports (e.g., temperature, solar irradiance, wind speed), changing tariffs, event data (e.g., occupancy prediction, sizeable gathering of people at a location or venue), and the like.

The method 600 may further include the site controller reading 608 (e.g., reading or otherwise receiving) process variables, which may include measurements of a state of the electrical system and indicate, among other things, how well objectives of the site controller are being met. The process variables provide feedback to the site controller from the electrical system of the site as part of a feedback loop.

The method 600 includes the site controller determining 610 new control variables that can be used to improve achievement of objectives of the site controller, including meeting the aggregation opportunity. The determining 610 may be performed using the configuration, any available participation opportunity information, the external inputs, and/or the process variables. Stated differently, the site controller determines 610 new values for each control variable that would effectuate a change to the electrical system toward meeting one or more controller objectives for the electrical system, and the one or more controller objectives may include participation in a maneuver (providing a committed level of site change in power towards contributing to the minimum net change in power of an aggregation opportunity) to respond to the aggregation opportunity.

The method 600 also includes the site controller transmitting 614 commitment information to the aggregation engine. The commitment information may be transmitted 614 as a power or energy value, which may comprise, for example, a committed site change in power the site controller is committed to provide based on the received participation opportunity information. In some embodiments, the commitment information may include multiple committed site changes in power corresponding to different time periods specified by the participation opportunity information. The aggregation engine may then provide new or otherwise revised participation opportunity information to the site controller and other site controllers being aggregated by the aggregation engine.

An optimization algorithm of the aggregation engine may include repeated polling of the site controllers, such that the method 600 is executed repeatedly by a site controller as the aggregation engine seeks to optimize participation of a plurality of site controllers (including the instant site controller) in an aggregation opportunity.

Optimization

In some embodiments, a site controller of a site uses an algorithm (e.g., an optimization algorithm) to determine control variables, for example, to improve performance of the electrical system of the site. Optimization can be a process of finding a variable or variables at which a function $f(x)$ is minimized or maximized. An optimization may be made with reference to such global extrema (e.g., global maximums and/or minimums). Given that an algorithm that finds a minimum of a function can generally also find a maximum of the same function by negating it, the present disclosure may sometimes use the terms "minimization," "maximization," and "optimization," interchangeably.

An objective of optimization by a site controller of an electrical system of a DER may be economic optimization, or determining economically optimal control variables to effectuate one or more changes to the electrical system to achieve economic efficiency (e.g., to operate the electrical system at as low a cost as may be possible, given the circumstances). A more complex objective of optimization may be economic optimization while also providing a committed site change in power toward a minimum net change in power of an aggregation opportunity. In some embodiments, an participation opportunity information may be an input to and/or a consideration of the optimization, such that economic optimization is aspired to with the option to take advantage of benefits associated with contributing site change in power for an aggregation opportunity. As can be appreciated, other objectives may be possible as well (e.g., prolonging equipment life, system reliability, system availability, fuel consumption, etc.).

The present disclosure includes embodiments of site controllers of sites that optimize a single parameterized cost function (or objective function) for effectively utilizing controllable components of an electrical system of the site in an economically optimized manner. In certain embodiments and/or scenarios, the cost function may include or otherwise account for costs and benefits associated with the participation opportunity information of an aggregation opportunity. Various forms of optimization may be utilized to economically optimize an electrical system of a site.

Continuous Optimization

A site controller of one or more DERs, according to some embodiments of the present disclosure, may use continuous optimization to determine the control variables. More specifically, the site controller may utilize a continuous optimization algorithm, for example, to find economically optimal control variables to effectuate one or more changes to the electrical system of the site to achieve economic efficiency (e.g., to operate the electrical system at as low a cost as may be possible, given the circumstances). The controller, in one embodiment, may operate on a single objective: optimize overall system economics. Since this approach has only one objective, there can be no conflict between objectives. And by specifying system economics appropriately in a cost function (or objective function), all objectives and value streams can be considered simultaneously based on their relative impact on a single value metric. The cost function may include or otherwise account for participation opportunity information of an aggregation opportunity. The cost function may be continuous in its independent variables x, and optimization can be executed with a continuous optimization algorithm that is effective for continuous functions. Continuous optimization differs from discrete optimization, which involves finding the optimum value from a finite set of possible values or from a finite set of functions.

As can be appreciated, in another embodiment, the cost function may be discontinuous in x (e.g., discrete or finite) or piecewise continuous in x, and optimization can be executed with an optimization algorithm that is effective for discontinuous or piecewise continuous functions.

Constrained Optimization

In some embodiments, the site controller of an electrical system of a site utilizes a constrained optimization to determine the control variables. In certain embodiments, the controller may utilize a constrained continuous optimization to find a variable or set of variables $x_{opt}$ at which a continuous function $f(x)$ is minimized or maximized subject to constraints on the allowable x. Possible constraints may be an equation or inequality. A participation opportunity value may impose a possible constraint.

As an example, consider an equation:

$$f(x)=100(x_2-x_1^2)^2+(1-x_1)^2.$$

The set x includes the independent variables x1, x2. Constraints may be defined by the equation:

$$x_2^2+x_1^2 \leq 1.$$

A curve of ln $(1+f(x))$ vs. $x_1$ and $x_2$ would reflect the constraint within an outlined unit disk and a minimum at (0.7864, 0.6177).

Constrained continuous optimization algorithms are useful in many areas of science and engineering to find a "best" or "optimal" set of values that affect a governing of a process. They are particularly useful in cases where a single metric is to be optimized, but the relationship between that metric and the independent (x) variables is so complex that a "best" set of x values cannot easily be found symbolically in closed form. For example, consider a malignant tumor whose growth rate over time is dependent upon pH and on the concentration of a particular drug during various phases of growth. The equation describing growth rate as a function of the pH and drug concentration is known and can be written down but may be complex and nonlinear. It might be very difficult or impossible to solve the equation in closed form for the best pH and drug concentration at various stages of growth. It may also depend on external factors such as temperature. To solve this problem, pH and drug concentration at each stage of growth can be combined into an x vector with two elements. Since the drug concentration and pH may have practical limits, constraints on x can be defined. Then the function can be minimized using constrained continuous optimization. The resulting x, where the growth rate is minimized, contains the "best" pH and drug concentration to minimize growth rate. Notably, this approach can find an optimum pH and drug concentration (to machine precision; i.e. within a threshold) from a continuum of infinite possibilities of pH and drug concentration, not just from a predefined finite set of possibilities.

Generalized Optimization

A site controller according to some embodiments of the present disclosure may use generalized optimization to determine the control variables. More specifically, the controller may utilize a generalized optimization algorithm, for example, to find economically optimal control variables to effectuate one or more changes to the electrical system to achieve economic efficiency (e.g., to operate the electrical system at as low a cost as may be possible, given the circumstances).

An algorithm that can perform optimization for an arbitrary or general real function $f(x)$ of any form may be called a generalized optimization algorithm. An algorithm that can perform optimization for a general continuous real function $f(x)$ of a wide range of possible forms may be called a generalized continuous optimization algorithm. Some generalized optimization algorithms may be able to find optimums for functions that may not be continuous everywhere, or may not be differentiable everywhere. Some generalized optimization algorithm may also account for constraints, and therefore be a generalized constrained optimization algorithm.

Nonlinear Optimization

A controller according to some embodiments of the present disclosure may use nonlinear optimization to determine the control variables. More specifically, the controller may utilize a nonlinear optimization algorithm, for example, to find economically optimal control variables to effectuate one or more changes to the electrical system to achieve economic efficiency (e.g., to operate the electrical system at as low a cost as may be possible, given the circumstances).

Nonlinear continuous optimization or nonlinear programming is similar to generalized continuous optimization and describes methods for optimizing continuous functions that may be nonlinear, or where the constraints may be nonlinear.

Multi-Variable Optimization

A controller according to some embodiments of the present disclosure may use multi-variable optimization to determine the control variables. More specifically, the controller may utilize a multivariable optimization algorithm, for example, to find economically optimal control variables to effectuate one or more changes to the electrical system to achieve economic efficiency (e.g., to operate the electrical system at as low a cost as may be possible, given the circumstances, including a participation opportunity value to designate a portion of a net change in power requested by the aggregation opportunity).

Again, consider the equation $$f(x)=100(x_2-x_1^2)^2+(1-x_1)^2,$$

which is a multi-variable equation. In other words, x is a set comprised of more than one element. Therefore, the optimization algorithm is "multivariable." A subclass of optimization algorithms is the multivariable optimization algorithm that can find the minimum of $f(x)$ when x has more than one element. Thus, a generalized constrained continuous multi-variable optimization may be an approach, according to some embodiments.

Economically Optimizing Electrical System Controller

A site controller of an electrical system of a site, according to one embodiment of the present disclosure, is now described to provide an example of using optimization to control an electrical system of a site. An objective of using optimization may be to minimize the total electrical system operating cost during a period of time, taking into account the costs and benefits associated with providing a site change in power according to apportionment information indicating a proposed site benefit and a proposed site change in power of an aggregation opportunity.

For example, the approach of the site controller may be to minimize the operating cost during an upcoming time domain, or future time domain, which may extend from the present time by some number of hours (e.g., integer numbers of hours, fractions of hours, or combinations thereof). As another example, the upcoming time domain, or future time domain, may extend from a future time by some number of hours. Costs included in the total electrical system operating cost may include electricity supply charges, electricity demand charges, a battery degradation cost, equipment degradation cost, efficiency losses, etc. Benefits, such as incentive payments, which may reduce the electrical system operating cost, may be incorporated (e.g., as negative numbers or values) or otherwise considered. Other costs may be associated with a change in energy in the ESS such that adding energy between the beginning and the end of the future time domain is valued. Other costs may be related to reserve energy in an ESS such as for backup power purposes. Other costs may arise according to committing to provide a site change in power, which may be handled as imposing a constraint of providing a site change in power that is a portion of a total minimum net change in power requested by the aggregation opportunity. For example, costs or penalties related to not providing a net change in power may be incorporated. In some embodiments, some fraction of the aggregate benefit may be incorporated. All of the costs and benefits can be summed into a net cost function, which may be referred to as simply the "cost function."

In certain embodiments, a control parameter set X can be defined (in conjunction with a control law) that is to be applied to the electrical system, how they should behave, and at what times in the future time domain they should be applied. In some embodiments, the cost function can be evaluated by performing a simulation of electrical system operation with a provided set X of control parameters. The control laws specify how to use X and the process variables to determine the control variables. The cost function can then be prepared or otherwise developed to consider the control parameter set X.

For example, a cost $f_c(X)$ may consider the control parameter values in X and return the scalar net cost of operating the electrical system with those control parameter values. All or part of the control parameter set X can be treated as a variable set $X_x$ (e.g., x as described above) in an optimization problem. The remaining part of X, $X_{logic}$, may be determined by other means such as logic (for example, logic based on constraints, inputs, other control parameters, mathematical formulas, etc.). Any constraints involving $X_x$ can be defined, if so desired. Then, an optimization algorithm can be executed to solve for the optimal $X_x$. We can denote $X_{opt}$ as the combined $X_x$ and $X_{logic}$ values that minimize the cost function subject to the constraints, if any. Since $X_{opt}$ represents the control parameters, this example process fully specifies the control that will provide minimum cost (e.g., optimal) operation during the future time domain. Furthermore, to the limits of computing capability, this optimization can consider the continuous domain of possible $X_x$ values, not just a finite set of discrete possibilities. This example method continuously can "tune" possible control sets until an optimal set is found. We may refer to these certain example embodiments of a controller as an economically optimizing electrical system controller (EOESC).

Some of the many advantages of using an EOESC, according to certain embodiments, compared to other electrical system controllers are significant:

1) Any number of value streams may be represented in the cost function, giving the EOESC an ability to optimize on all possible value streams and costs simultaneously. As an example, generalized continuous optimization can be used to effectively determine the best control given both ToU supply charge reduction and demand charge reduction simultaneously, all while still considering battery degradation cost.
2) With a sufficiently robust optimization algorithm, only the cost function, control law, and control parameter definitions need be developed. Once these three components are developed, they can be relatively easily maintained and expanded upon.
3) An EOESC can yield a true economically optimum control solution to machine or processor precision limited only by the cost function, control laws, and control parameter definitions.
4) An EOESC may yield not only a control to be applied at the present time, but also the planned sequence of future controls. This means one execution of an EOESC can generate a lasting set of controls that can be used into the future rather than a single control to be applied at the present. This can be useful in case a) the optimization algorithm takes a significant amount of time to execute, or b) there is a communication interruption between the processor calculating the control parameter values and the processor interpreting the control parameters and sending control variables to the electrical system.

Figure 7:
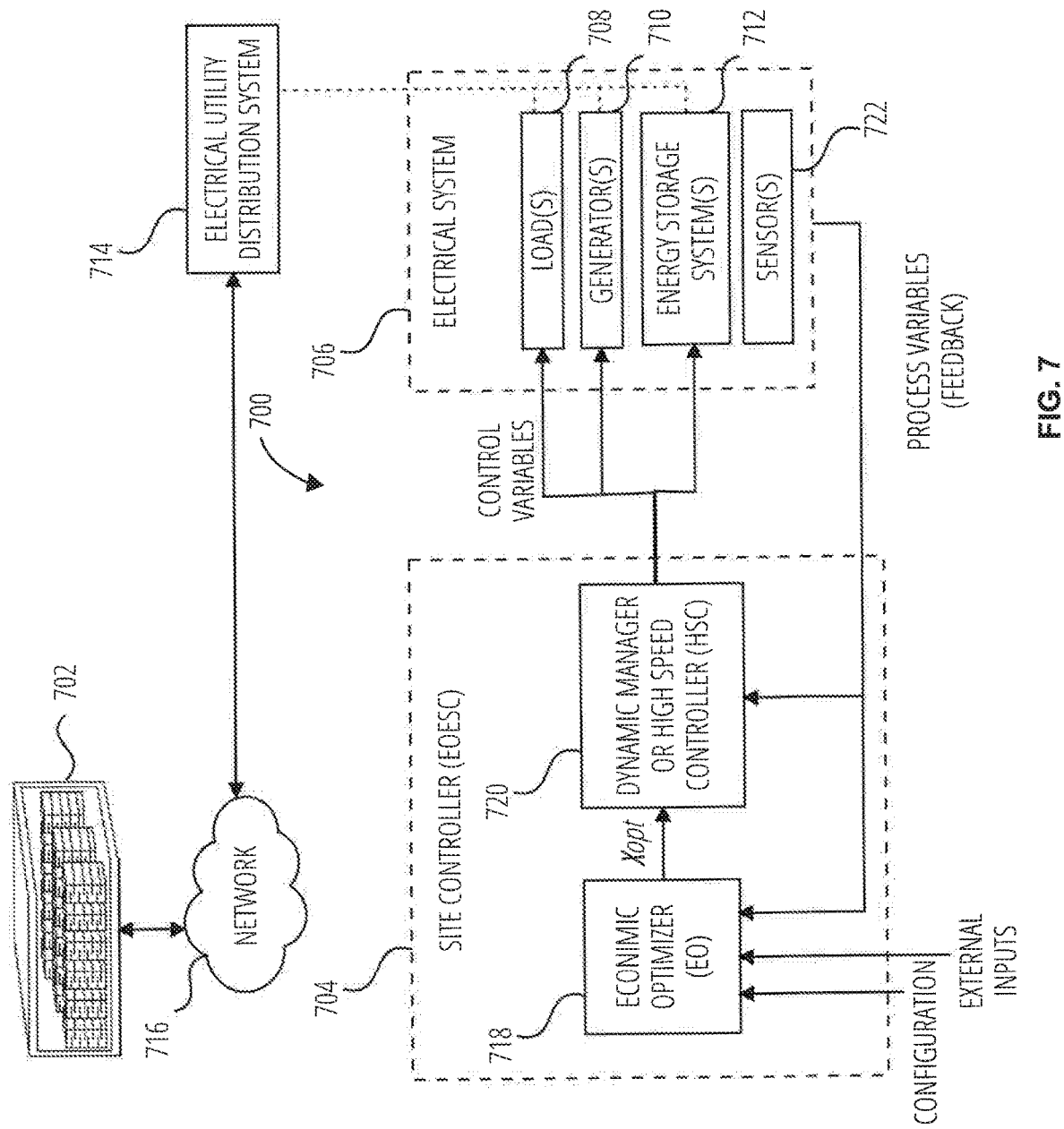
FIG. 7 is a control diagram illustrating a system architecture of a site, according to another embodiment of the present disclosure.

FIG. 7 is a control diagram illustrating a system architecture of a site 700, according to another embodiment of the present disclosure. The site 700 includes an EOESC 704. The site 700 comprises an electrical system 706 that is controlled by the EOESC 704. The EOESC 704 of the site 700 can include any of one or more loads 708, one or more generators 710, a one or more ESSs 712, and one or more sensors 722 (e.g., meters) to provide measurements or other indication(s) of a state of the electrical system 706 of the site 700. The electrical system 706 of the site 700 is coupled to an electric utility distribution system 714, and therefore may be considered on-grid. Similar diagrams can be drawn for other applications, such as a photovoltaic generator plant and an off-grid building.

An aggregation engine 702 interconnects with the EOESC 704 and the electric utility distribution system 714. Through this interconnection, the aggregation engine 702 can receive aggregation opportunities from the electric utility distribution system 714 and can communicate with the EOESC 704 of the site 700 to coordinate an aggregation maneuver (for responding to an aggregation opportunity). The aggregation engine 702 may provide participation opportunity information as inputs to the EOESC 704.

The EOESC 704 receives or otherwise obtains a configuration of the electrical system 706, external inputs, participation opportunity information, and/or process variables, and produces control variables to be sent to the electrical system 706 of the site 700. The control variables are sent to the electrical system 706 to effectuate a change to the electrical system 706 toward meeting a controller objective for economical optimization of the electrical system 706, for example during an upcoming time domain. The control variables may effectuate a change to the electrical system 706 to provide a committed site change in power that is determined by the EOESC 704 responsive to participation opportunity information received from the aggregation engine 702. The EOESC 704 may include electronic hardware and software to process the inputs to determine values for each of the control variables. The EOESC 704 may include one or more processors and suitable storage media which store programming in the form of executable instructions, which are executed by the processors to implement control processes.

In the embodiment of FIG. 7, the EOESC 704 includes an economic optimizer (EO) 718 and a dynamic manager 720 (or high speed controller (HSC)). The EO 718 according to some embodiments is presumed to have an ability to measure or obtain a current date and time. The EO 718 may determine a set of values for a control parameter set X and provide the set of values and/or the control parameter set X to the HSC 720. The EO 718 uses a generalized optimization algorithm to determine an optimal set of values for the control parameter set $X_{opt}$. The HSC 720 utilizes the set of values for the control parameter set X (e.g., an optimal control parameter set $X_{opt}$) to determine the control variables to communicate to the electrical system 706 of the site 700. The HSC 720 in some embodiments is also presumed to have an ability to measure or obtain a current date and time. The two-part approach of the EOESC 704—namely the EO 718 determining control parameters and then the HSC 720 determining the control variables—enables generation of a lasting set of controls, or a control solution (or plan) that can be used into the future, rather than a single control to be applied at the present. Preparing a lasting control solution can be useful if the optimization algorithm takes a significant amount of time to execute. Preparing a lasting control solution can also be useful if there is a communication interruption between calculating the control parameter values and the processor interpreting the control parameters and sending control variables to the electrical system 706 of the site 700. The two-part approach of the EOESC 704 also enables the EO 718 to be disposed or positioned at a different location from the HSC 720. In this way, intensive computing operations that optimization may require can be performed by resources with higher processing capability that may be located remote from the electrical system 706 of the site 700. These intensive computing operations may be performed, for example, at a data center or server center (e.g., in the cloud).

In some embodiments, a future time domain begins at the time the EO 718 executes and can extend any amount of time. In certain embodiments, analysis and experimentation suggest that a future time domain extent of 24 to 48 hours generates sufficiently optimal solutions in most cases.

As can be appreciated, the EOESC 704 of FIG. 7 may be arranged and configured differently from the example shown in FIG. 7, in other embodiments. For example, instead of the EO 718 passing the control parameter set $X_{opt}$ (the full set of control parameters found by a generalized optimization algorithm of the EO 718) to the HSC 720, the EO 718 can pass a subset of $X_{opt}$ to the HSC 720. Similarly, the EO 718 can pass $X_{opt}$ and additional control parameters to the HSC 720 that are not contained in $X_{opt}$. Likewise, the EO 718 can pass modified elements of $X_{opt}$ to the HSC 720. In one embodiment, the EO 718 finds a subset $X_x$ of the optimal X, but then determines additional control parameters $X_{logic}$, and passes $X_{logic}$ together with $X_x$ to the HSC 720. In other words, in this example, the $X_x$ values are to be determined through an optimization process of the EO 718, and the $X_{logic}$ values can be determined from logic. An objective of the EO 718 is to determine the values for each control parameter whether using optimization and/or logic.

For brevity in this disclosure, keeping in mind embodiments where X consists of independent ($X_x$) parameters and dependent ($X_{logic}$) parameters, when describing optimization of a cost function versus X, what is meant is variation of the independent variables $X_x$ until an optimum (e.g., minimum) cost function value is determined. In this case, the resulting $X_{opt}$ will include the combined optimum $X_x$ parameters and associated $X_{logic}$ parameters.

In one embodiment, the EOESC 704 and one or more of its components are executed as software or firmware (for example, stored on non-transitory media, such as appropriate memory) by one or more processors. For example, the EO 718 may comprise one or more processors to process the inputs and generate the set of values for the control parameter set X. Similarly, the HSC 720 may comprise one or more processors to process the control parameter set X and the process variables and generate the control variables. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Figure 8:
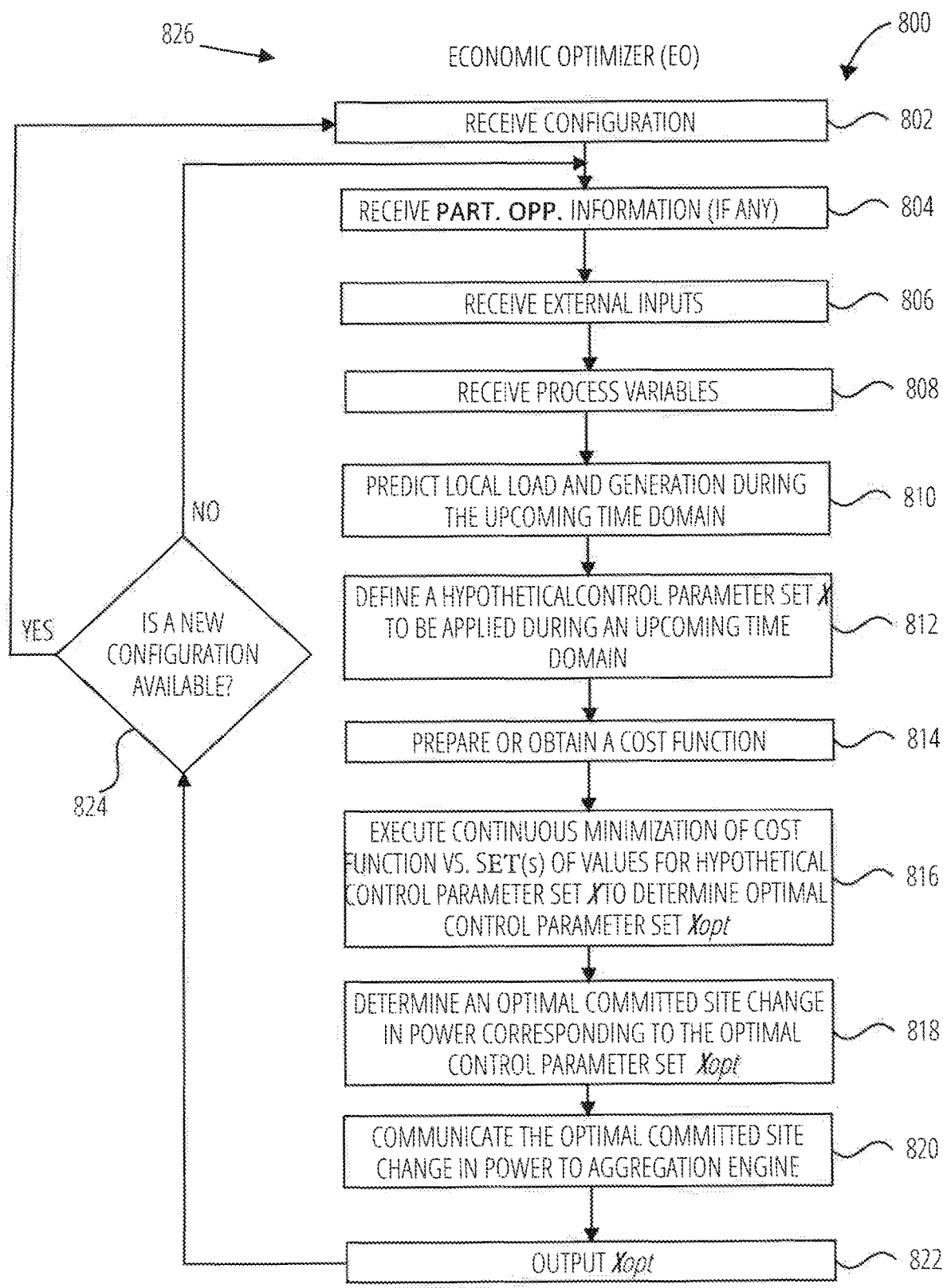
FIGS. 8 and 9 are flow diagrams illustrating a method of controlling an electrical system of a site, according to one embodiment of the present disclosure.
Figure 9:
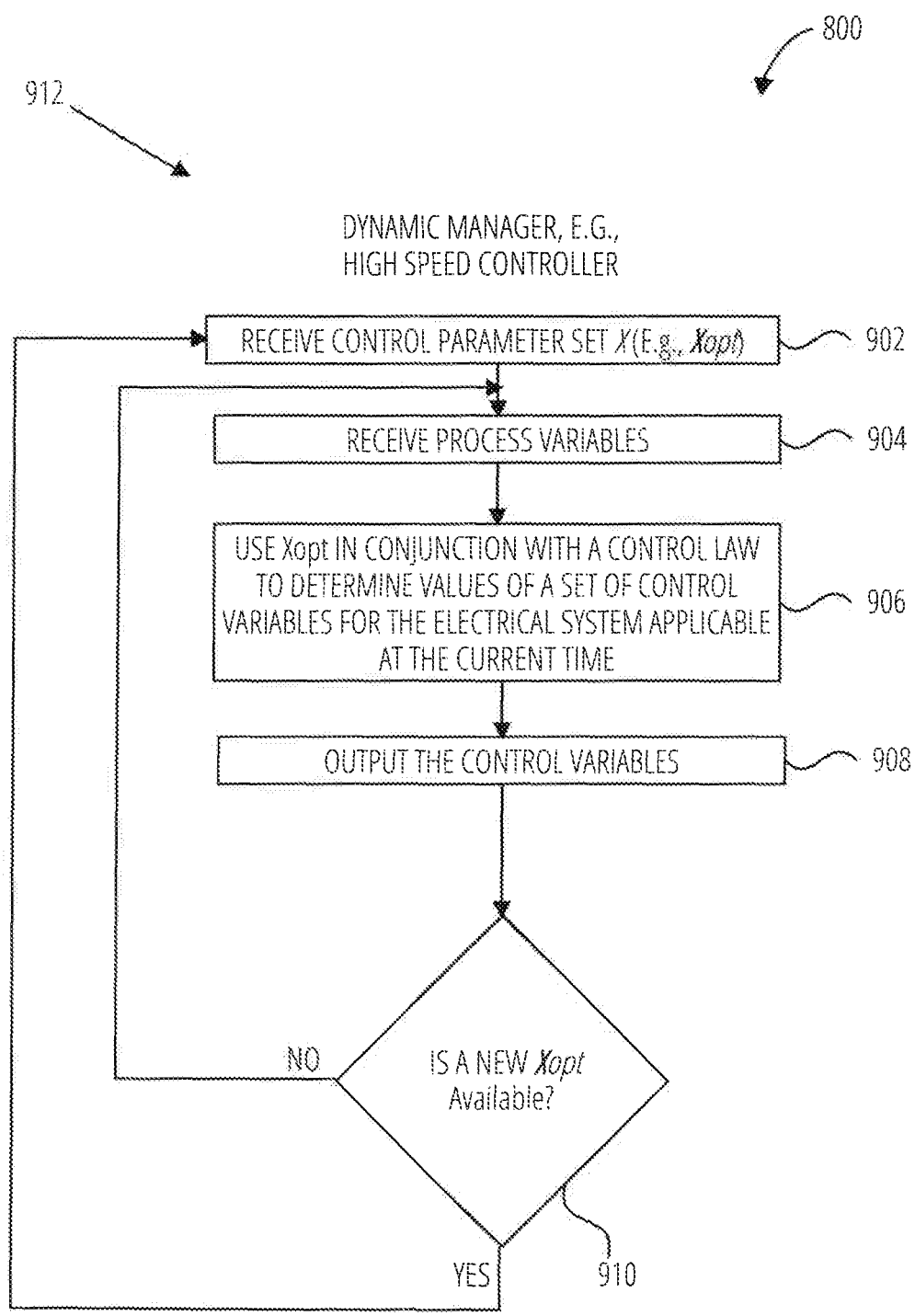

FIGS. 8 and 9 are flow diagrams illustrating a method 800 of controlling an electrical system of a site, according to one embodiment of the present disclosure. The method 800 may be implemented by a site controller of an electrical system, such as the EOESC 704 of FIG. 7 controlling the electrical system 706 of the site 700 of FIG. 7. The method 800 includes two separate processes, namely an economic optimizer (EO) process 826 and a high speed controller (HSC) process 912. The HSC process 912 of FIG. 9 may also be referred to herein as a dynamic manager process 912. The HSC process 912 may utilize a control parameter set X determined by the EO process 826. Nevertheless, the HSC process 912 may execute separate from, or even independent from, the EO process 826, based on a control parameter set X determined at an earlier time (e.g., by the EO process 826). Because the EO process 826 can run separate and distinctly from the HSC process 912, the execution of these processes 824, 912 may be co-located on a single system or isolated on remote systems.

Referring to FIG. 8, the EO process 826 may a be computer-implemented process executed by one or more computing devices, such as the EO 718 of FIG. 7. The EO process 826 is used to determine an optimal level of commitment to provide site change in power for an aggregation opportunity. Turning to the EO process 826 of FIG. 8, the EO process 826 includes receiving 802 a configuration, or a set of configuration elements, of the electrical system. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, an equipment degradation cost, a tariff definition (e.g., an electricity supply tariff providing ToU supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, costs or benefits associated with reducing electrical power consumption of one or more loads, and a value of comfort that may be a function of other process variables such as building temperature.

In certain embodiments, the set of configuration elements define the one or more cost elements by specifying how to calculate an amount for each of the one or more cost elements. For example, the definition of a cost element may include a formula for calculating the cost element.

In certain embodiments, the cost elements specified by the configuration elements may include one or more incentives associated with operation of the electrical system. An incentive may be considered as a negative cost. The one or more incentives may include one or more of an incentive revenue, a demand response revenue, a value of reserve energy or battery capacity (e.g., for backup power as a function of time), a contracted maneuver, revenue for demand response opportunities, revenue for ancillary services, and revenue associated with deviation from an operating plan (e.g., a prescribed operating plan, a contracted operating plan).

In other embodiments, the configuration elements may specify how to calculate an amount for one or more of the cost elements. For example, a formula may be provided that indicates how to calculate a given cost element.

The EO process 826 may also include the EO receiving 804 participation opportunity information (e.g., one or more sets each including a proposed site benefit for providing a proposed site change in power), such as from an aggregation engine (e.g., the aggregation engine 702 of FIG. 7). Apportionment information proposes a site benefit for providing a proposed site change in power in order to receive information regarding a level of commitment to provide site change in power. Based on the level of commitment, the aggregation engine may be enabled to determine whether to commit to an aggregation opportunity and/or enable the site controllers to commit to provide site changes in power toward meeting the minimum net change in power of the aggregation opportunity.

The participation opportunity information may be received 804 in connection with an aggregation opportunity promulgated to the remote aggregation engine by a utility or other entity desiring to obtain a net change in power (e.g., additional power or reduction in consumption of power). For example, a utility or other entity may desire to obtain additional power resources or reduction in power consumption and may seek power from an aggregation of power provided or reduced by a plurality of sites. When an aggregation opportunity is not available, participation opportunity information may not be available and/or received 804.

In certain embodiments, participation opportunity information may be received as part of the configuration. Stated otherwise, in certain embodiments, receiving 802 a configuration may include receiving 804 participation opportunity information, if any, for participating in a corresponding aggregation opportunity. The EO process 826 could, accordingly, consider the participation opportunity information in a similar manner as other configuration elements received 802 as a configuration.

The EO process 826 may also include receiving 806 external inputs. The external inputs may provide indication of one or more conditions that are external to the controller and/or the electrical system. For example, the external inputs may provide indication of the temperature, weather conditions (e.g., patterns, forecasts), and the like.

The EO process 826 may include receiving 808 process variables. The process variables provide one or more measurements of a current state of the electrical system. The set of process variables can be used to determine progress toward meeting an objective for economical optimization of the electrical system. The process variables may be feedback in a control loop for controlling the electrical system.

The EO process 826 may include predicting 810 a local load and/or generation during an upcoming time domain. The predicted local load and/or local generation may be stored for later consideration. For example, the predicted load and/or generation may be used in a later process of evaluating the cost function during a minimization of the cost function.

The EO process 826 may include defining 812 a hypothetical control parameter set X to be applied during an upcoming time domain. In defining 812 the control parameter set X, the meaning of each element of X is established. A first aspect in defining 812 the hypothetical control parameter set X may include selecting a control law. Then, for example, X may be defined 812 as a matrix of values such that each column of X represents a set of control parameters for the selected control law to be applied during a particular time segment of the future time domain. In this example, the rows of X represent individual control parameters to be used by the control law. Further to this example, the first row of X can represent the nominal ESS power during a specific time segment of the future time domain. Likewise, X may be further defined 812 such that the second row of X is the maximum demand limit (e.g., a maximum demand setpoint). A second aspect in defining 812 the control parameter set X may include splitting the upcoming time domain into sensible segments and selecting the meaning of the control parameters to use during each segment. The upcoming future time domain may be split into different numbers of segments depending on what events are coming up during the future time domain. For example, if there are no supply charges, and there is only one demand period, the upcoming time domain may be split into a few segments. But if there is a complicated scenario with many changing rates and constraints, the upcoming time domain may be split into many segments. (The participation opportunity information/commitment information may be adjusted, both in number of values and in the magnitude of the values, based on the splitting of the time domain into segments.) Lastly, in defining 812 the control parameters X, some control parameters $X_x$ may be marked for determination using optimization, and others $X_{logic}$ may be marked for determination using logic (for example logic based on constraints, inputs, other control parameters, mathematical formulas, etc.).

The EO process 826 may also include preparing 814 or obtaining a cost function. Preparing 814 the cost function may be optional and can increase execution efficiency by pre-calculating certain values that will be needed each time the cost function is evaluated. The cost function may be prepared 814 (or configured) to include or account for any constraints on the electrical system. In certain embodiments, the constraints may include the one or more committed site changes in power (if any) that may correspond to an aggregation opportunity.

With the hypothetical control parameter set X defined 812 and the cost function prepared 814, the EO process 826 can include executing 816 a minimization or optimization of the cost function resulting in the hypothetical optimal control parameter set $X_{opt}$. For example, a continuous optimization algorithm may be used to identify an optimal set of values for the hypothetical control parameter set $X_{opt}$ (e.g., to minimize the cost function) in accordance with the one or more constraints, the one or more cost elements, and any participation opportunity information (e.g., proposed site benefit for providing a proposed site change in power). The continuous optimization algorithm may be one of many types. For example, it may be a generalized continuous optimization algorithm. The continuous optimization algorithm may be a multivariable continuous optimization algorithm. The continuous optimization algorithm may be a constrained continuous optimization algorithm. The continuous optimization algorithm may be a Newton-type algorithm. It may be a stochastic-type algorithm such as Covariance Matrix Adaption Evolution Strategy (CMAES). Other algorithms that can be used are BOBYQA (Bound optimization by Quadratic Approximation) and COBYLA (Constrained optimization by Linear Approximation).

To execute the optimization of the cost function, the cost function may be evaluated many times. Each time, the evaluation may include performing a simulation of the electrical system operating during the future time domain with a provided control parameter set X, and then calculating the cost associated with that resulting simulated operation. The cost function may include or otherwise account for the one or more cost elements received 802 in the configuration. For example, the cost function may be a summation of the one or more cost elements (including any negative costs, such as incentives, revenues, and the like). In this example, the optimization operation 816 would find a hypothetical $X_{opt}$ that minimizes the cost function. The cost function may also include or otherwise account for the one or more constraints on the electrical system. The cost function may include or otherwise account for any values associated with the electrical system that may be received 802 in the configuration.

The cost function may also evaluate another economic metric such as payback period, internal rate of return (IRR), return on investment (ROI), net present value (NPV), or carbon emission. In these examples, the function to minimize or maximize would be more appropriately termed an "objective function." In case the objective function represents a value that should be maximized, such as IRR, ROI, or NPV, the optimizer should be set up to maximize the objective function when executing 816, or the objective function could be multiplied by −1 before minimization. Therefore, as can be appreciated, elsewhere in this disclosure, "minimizing" the "cost function" may also be more generally considered for other embodiments as "optimizing" an "objective function."

The continuous optimization algorithm may execute the cost function (e.g., simulate the upcoming time domain) a plurality of times with various hypothetical control parameter sets X to identify an optimal set of values for the hypothetical control parameter set $X_{opt}$ to minimize the cost function. The cost function may include a summation of the one or more cost elements, and evaluating the cost function may include returning a summation of the one or more cost elements incurred during the simulated operation of the control system over the upcoming time domain. For example, using the participation opportunity information received 804 from the aggregation engine, various site benefits for providing various different amounts of site change in power toward the minimum net change in power of an aggregation opportunity may be considered (e.g., as a negative cost in the cost function).

Since the hypothetical control parameter set $X_{opt}$ is optimal to minimize/optimize the cost function, an implementation of the proposed site benefit and the proposed site change in power is also minimized/optimized. Accordingly, the EO process 826 includes determining 818 an optimal committed site change in power to be provided toward the minimum net change in power of the aggregation opportunity based on the hypothetical control parameter set $X_{opt}$. The EO process 826 also includes communicating 820, to the aggregation engine, the optimal committed site change in power according to the control parameter set $X_{opt}$. The optimal committed site change in power is communicated 717 to the aggregation engine in commitment information such that the aggregation engine can determine a committed site change in power the site controller is committed to provide towards compliance with the aggregation maneuver of an aggregation opportunity.

The EO process 826 includes outputting 822 the optimal control parameter set $X_{opt}$. In some embodiments, the optimal control parameter set $X_{opt}$ may be stored locally, such as to memory, storage, circuitry, and/or a processor disposed local to the EO process 826. In some embodiments, the outputting 822 may include transmitting the optimal control parameter set $X_{opt}$ over a communication network to a remote computing device, such as the HSC 720 of FIG. 7. For example, the optimal control parameter set $X_{opt}$ may be transmitted to the HSC process 912.

The EO process 826 repeats for a next upcoming time domain (a new upcoming time domain). The EO process 826 includes determining 824 whether a new configuration is available. If yes, then the EO process 826 includes receiving 802 the new configuration. If no, then the EO process 826 may skip receiving 802 the configuration and simply receiving 806 the external inputs.

As can be appreciated, in other embodiments an EO process may be configured differently, to perform operations in a differing order, or to perform additional and/or different operations. In certain embodiments, an EO process may determine values for a set of control variables to provide to the electrical system to effectuate a change to the electrical system toward meeting the controller objective for economical optimization of the electrical system during an upcoming time domain, rather than determining values for a set of control parameters to be communicated to a HSC process. The EO process may provide the control variables directly to the electrical system, or to an HSC process for timely communication to the electrical system at, before, or during the upcoming time domain. Also, separate portions of a controller or the same portions of the controller may be used to implement the EO process 826.

Referring to FIG. 9, The HSC process 912 may be a computer-implemented process executed by one or more computing devices, such as the HSC 720 of FIG. 7. The HSC process 912 may include receiving 902 a control parameter set X, such as the optimal control parameter set $X_{opt}$ output 822 by the EO process 826. The HSC process 912 also includes receiving 904 process variables from the electrical system. The process variables include information, or feedback, about a current state or status of the electrical system and/or one or more components therein.

The HSC process 912 includes determining 906 values for a set of control variables for controlling one or more components of the electrical system at the current time. The HSC process 912 determines 906 the values for the control variables by using the optimal control parameter set $X_{opt}$ in conjunction with a control law. The control laws specify how to determine the control variables from X (or $X_{opt}$) and the process variables. Stated another way, the control law enforces the definition of X. For example, for a control parameter set X defined such that a particular element, $X_i$ is an upper bound on demand to be applied at the present time, the control law may compare process variables such as the unadjusted demand to $X_i$. If unadjusted building demand exceeds $X_i$, the control law may respond with a command (in the form of a control variable) to instruct the ESS to discharge at a rate that will make the adjusted demand equal to or less than X.

The HSC process 912 includes outputting 908 control variables (including any newly determined values) from the HSC process 912. The control variables are communicated to the electrical system and/or one or more components therein. Outputting 908 the control variables may include timely delivery of the control variables to the electrical system at, before, or during the upcoming time domain and/or applicable time segment thereof. The timely delivery of the control variables may include an objective to effectuate a desired change or adjustment to the electrical system during the upcoming time domain.

The HSC process 912 then includes determining 910 whether a new control parameter set X (and/or values thereof), such as a new optimal control parameter set $X_{opt}$, is available. If yes, then the HSC process 912 includes receiving 902 a new control parameter set X (or simply the values thereof) and HSC process 912 repeats. If no, then the HSC process 912 repeats without receiving 902 a new control parameter set X, such as a new optimal control parameter set $X_{opt}$.

As can be appreciated, in other embodiments an HSC process may be configured differently, to perform operations in a differing order, or to perform additional and/or different operations. For example, in certain embodiments, an HSC process may simply receive values for the set of control variables and coordinate timely delivery of appropriate control variables to effectuate a change to the electrical system at a corresponding time segment of the upcoming time domain.

The example embodiment of a site controller 504 in FIG. 5 and an embodiment of a control method 800 in FIGS. 8-9 illustrate a two-piece or staged controller, which splits a control problem into two pieces (e.g., a low speed optimizer and a high speed dynamic manager (or high speed controller (HSC)). The two stages or pieces of the site controller, namely an optimizer and a dynamic manager, are described more fully in the sections below. Nevertheless, as can be appreciated, in certain embodiments a single-stage approach to a control problem may be utilized to determine optimal control values to command an electrical system.

Economic Optimizer (EO)

Greater detail will now be provided about some elements of an EO, according to some embodiments of the present disclosure.

Predicting a Load/Generation of an Upcoming Time Domain

In many electrical system control applications, a load of the electrical system (e.g., a building load) changes over time. Load can be measured as power or as energy change over some specified time period, and is often measured in units of kW. As noted above with reference to FIG. 8, an EO process 826 may predict 810 a local load and/or generation during an upcoming time domain.

Figure 10:
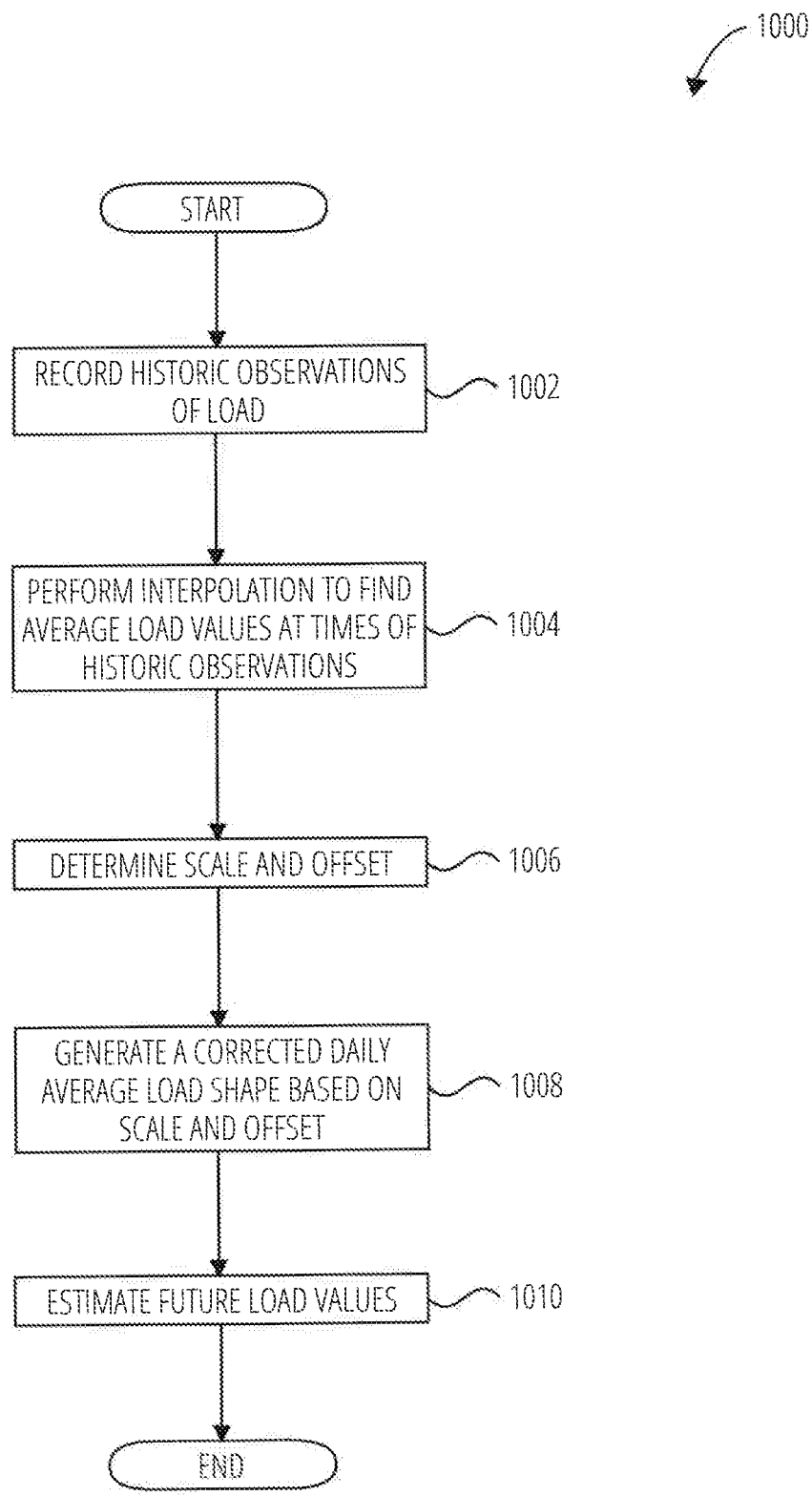
FIG. 10 is a flow diagram of a method of predicting load and/or generation of an electrical system during an upcoming time domain, according to one embodiment of the disclosure.

FIG. 10 is a flow diagram of a method 1000 of predicting load and/or generation of an electrical system during an upcoming time domain. A controller, according to some embodiments of the present disclosure, may have the ability to predict the changing load that may be realized during an upcoming time domain. These load and generation predictions may be used when the cost function is evaluated. To account for and reap a benefit from some types of value streams such as demand charge reduction, an accurate estimate of the upcoming load can be important. An accurate projection of a load during an upcoming time domain enables an EO to make better control decisions to capitalize on value streams such as demand charge reduction.

A method of predicting load, according to one embodiment of the present disclosure, may perform a load prediction considering historic periodic trends or shapes such as a daily trend or shape. The load prediction can execute every time an EO executes an EO process, or it can execute more or less frequently. The load prediction may be executed by performing a regression of a parameterized historic load shape against historic load data (typically less than or equal to 24 hours) in one embodiment. Regression algorithms such as least squares may be used. A compilation of historic trends may be recorded as a historic average (or typical) profile or an average load shape. The historic average profile or average load shape may be a daily (24-hour) historic average profile that represents a typical day. The compilation of historic observations and/or historic average profile may be received from another system, or may be gathered and compiled (or learned) as part of the method of predicting load, as will be explained below with reference to FIG. 10.

Referring to FIG. 10, the method 1000 includes recording 1002 historic observations of load. For example, the last h hours of historic observations of load may be continuously recorded and stored in memory, each measurement having a corresponding time of day at which time it was measured in an array pair historic_load_observed and historic_load_observed_time_of_day. The last h hours can be any amount of time, and in one embodiment, it is between 3 and 18 hours.

Assume for now a daily average load shape array or vector is in memory named avg_load_shape, each with a corresponding array avg_load_shape_time_of_day of the same length. The avg_load_shape and avg_load_shape_time_of_day represents a historic average profile and/or historic trends. The time domain of avg_load_shape_time_of_day is 24 hours, and the time interval of discretization of avg_load_shape_time_of_day could be any value. Between 5 and 120 minutes may be used, depending on the application, in some embodiments. As an example, if the interval of discretization is chosen to be 30 minutes, there will be 48 values comprising avg_load_shape and 48 values comprising avg_load_shape_time_of_day.

The method 1000 includes performing 1004 an interpolation to find the avg_load_shape values at each of the times in historic_load_observed_time_of_day. Call this new interpolated array avg_load_shape_interpolated. Consider mathematically avg_load_shape_interpolated with a scale and offset defined as: **average_load_shape_interpolated_p = avg_load_shape_interpolated * scale + offset**. In some embodiments, the interpolation is a linear interpolation. In other embodiments, the interpolation is a nonlinear interpolation.

The method 1000 includes determining 1006 a scale and offset. For example, the method 1000 may perform a least squares regression to determine 1006 scale and offset that minimize the sum of the squares of the error between average_load_shape_interpolated_p and historic_load_observed resulting in a scale value scale_fit and an offset value offset_fit. In some embodiments, the determining 1006 of scale and offset can utilize weighted least squares techniques that favor more recent observations.

The method 1000 includes generating 1008 a corrected daily average load shape based on the scale and/or offset. For example a corrected load shape may be generated 1008 for a full day as **avg_load_shape_fit = avg_load_shape * scale_fit + offset_fit**.

The method 1000 can then include estimating 1010 the future load values, such as by interpolating. A future load value at any time of day in the future time domain can now be estimated by interpolating 1004 to that time of day from the pair of arrays avg_load_shape_fit and avg_load_shape_time_of_day.

Define the Control Parameter Set X

Defining the Control Parameter Set X involves defining or otherwise specifying times at which each control parameter is to be applied during a future time domain, and the control law(s) that are to be applied at each time in the future time domain.

An EO, according to certain embodiments of the present disclosure, is configured to define the control parameter set X. While there are many ways to define a control parameter set X, three possible approaches are:
1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 4 below.

TABLE 4

| Parameter | Description | Example Value |
|---|---|---|
| $P_{nom}$ | Nominal ESS power (or discharge power if negative) to be applied in the absence of other constraints or rules (such as those related to UB, $UB_0$, or LB below). | −40 W |
| UB | Upper bound on adjusted demand (e.g., an upper setpoint). Not to be exceeded unless the ESS is incapable of discharging at sufficient power. | 100 kW |
| $UB_0$ | Upper bound on electrical system adjusted demand (e.g., an upper setpoint) not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import," or, if 0, "zero export." Adjusted net power will be kept above this value unless the ESS is incapable of charging at sufficient power and generators cannot be throttled sufficiently. | 0 kW |

Approaches 2 and 3 above utilize segmentation of the future time domain.

Figure 11:
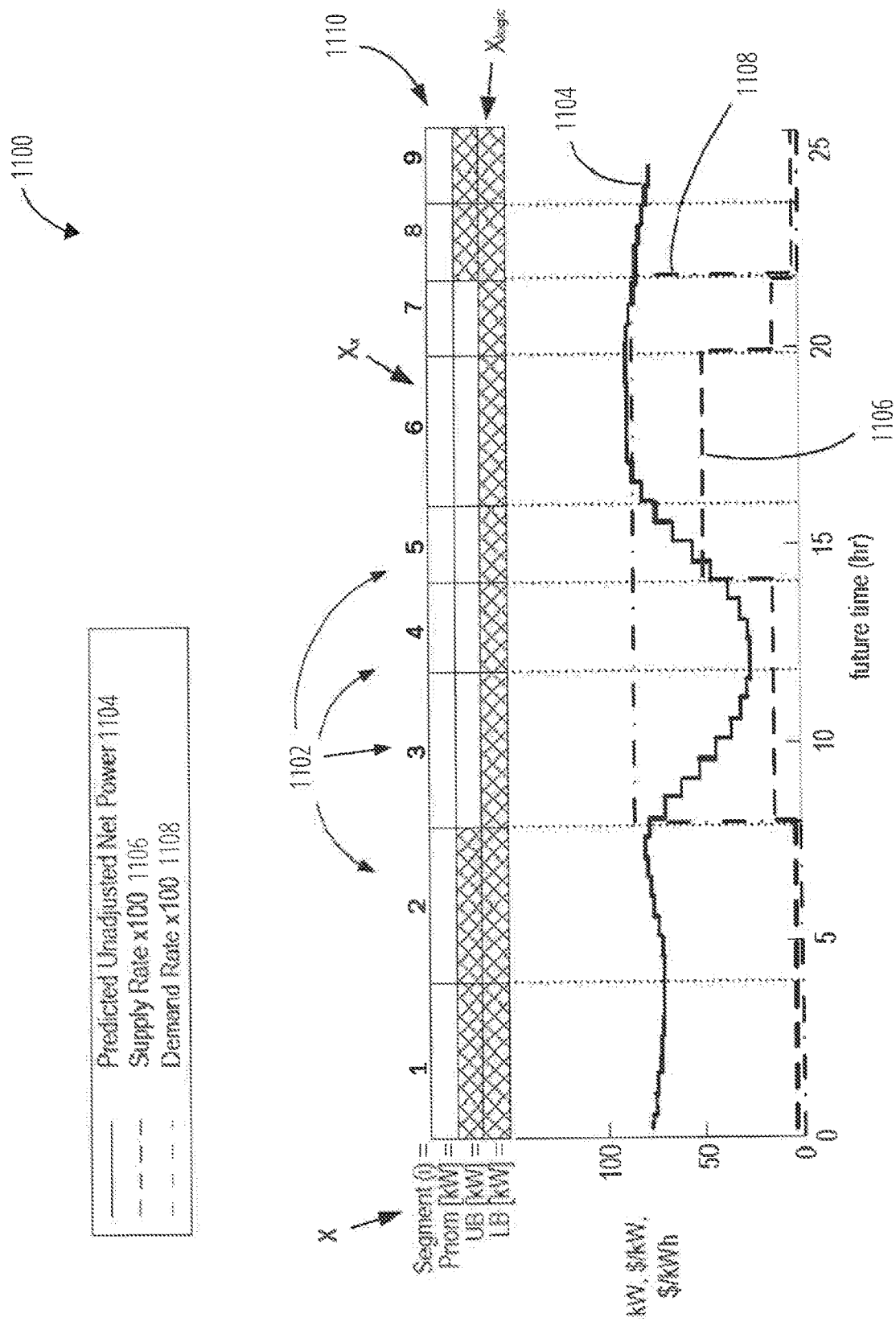
FIG. 11 is a graph illustrating one example of segmenting an upcoming time domain into a plurality of time segments, according to one embodiment of the disclosure.

FIG. 11 is a graph 1100 illustrating one example of segmenting an upcoming time domain into a plurality of time segments 1102, according to one embodiment of the disclosure. A plot 1104 of predicted unadjusted net power (kW) versus future time (e.g., of an upcoming time domain) is provided. A plot 1106 of energy supply rate ($/kWh) versus future time is also provided. A plot 1108 of a demand rate ($/kW) versus future time is also provided. A 25-hour future time domain is segmented into nine discrete sequential time segments 1102 (e.g., i=1, 2, 3, 4, 5, 6, 8, 8, 9). Each of the segments 1102 will be assigned a single set of one or more parameters from the control parameter set X to be applied during that time segment.

Segmentation of the future time domain can be done in many ways. In one embodiment, segmentation is performed such that:
i. the electric rates (both supply and demand) are constant within each time segment,
ii. the number of segments is minimized but large enough to provide a different segment for each region of the future time domain that is expected to have significantly different operating behavior or conditions, and
iii. the segment length does not exceed a prescribed maximum segment length.

In cases where rates are changing very frequently (every hour for example), some minimum time segment length can be specified (every four hours for example) to reduce the number of time segments 1102 while still maintaining acceptable computational fidelity. Likewise, a maximum segment length (for example six hours) may also be prescribed to increase computational fidelity.

Smaller numbers of segments are less burdensome on the EO processor computationally, while large numbers of segments provide higher fidelity in the final optimized solution. A desirable segment length of between 0.5 and 6 hours in some embodiments has been found to provide a good balance between these criteria.

The time segments 1102 of the upcoming time domain may be defined such that one or more of supply rate cost elements and delivery rate cost elements are constant during each time segment. The time segments 1102 of the upcoming time domain may be defined such that one or more of contracted maneuvers, demand response maneuvers, and ancillary service maneuvers are continuous during each time segment.

FIG. 11 also illustrates a representation 1110 of an example of control parameter set X that includes multiple sets of parameters. The control parameter set X is for a three-parameter control law, which may be defined similar to the set illustrated above in Table 4, but without $UB_0$. The values for the parameters are not initialized, but the cells of the table X in FIG. 11 represent a parameter for which a value may be associated. In this example, the un-shaded values ($X_x$) are to be determined through an optimization process of the EO and the shaded values ($X_{logic}$) can be determined from logic. An objective of the EO is to fill in the values for each control parameter that minimizes the cost of operating the electrical system of the site during the future time domain. As can be appreciated, different values for control parameters may result depending on whether the site is participating in providing a portion of a requested net change in power of an aggregation opportunity.

In some instances, it may make sense for an EO (or an EOESC) to operate with a single control parameter (e.g., a single set with a single element in X, such as $P_{nom}$) or with multiple control parameters (a single set of multiple elements in X, such as $P_{nom}$, UB, and LB) to be applied during the entire future time domain. In these two cases, the future time domain would be segmented into only one time segment 1102. Correspondingly, the EO would only consider control parameters that are constant over the whole future time domain in this example.

Prepare the Cost Function

An EO, according to certain embodiments of the present disclosure, prepares or otherwise obtains a cost function. As already mentioned, the cost function $f_c(X)$ is a function that considers particular control parameters (e.g., control parameter set X) and returns the scalar net cost of operating the electrical system with X during the future time domain. This scalar net cost of operating the electrical system can be provided to an aggregation engine for optimization of apportionment among multiple sites for generation of a requested net change in power of an aggregation opportunity.

Figure 12:
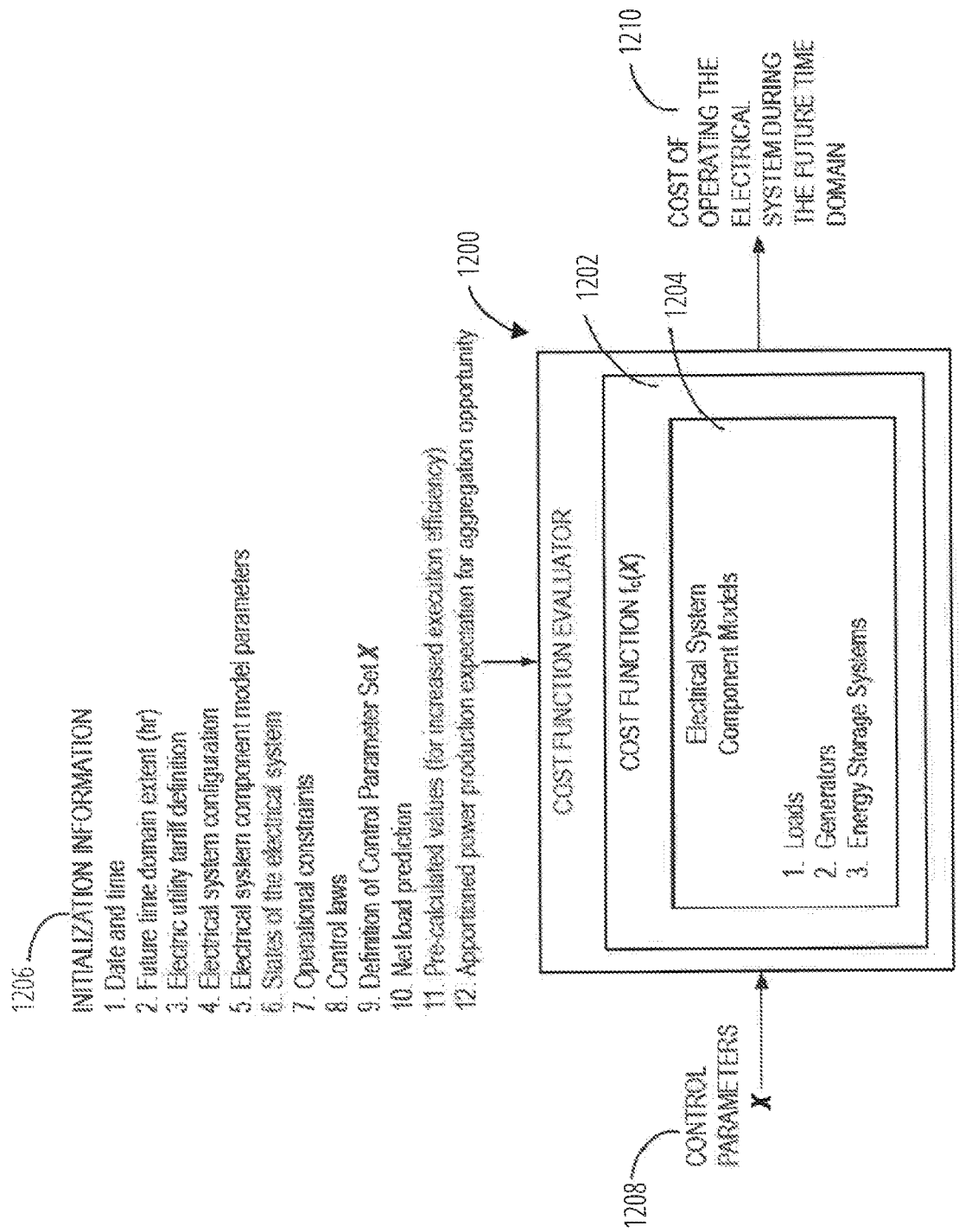
FIG. 12 is a diagrammatic representation of a cost function evaluation module, according to one embodiment of the disclosure.

FIG. 12 is a diagrammatic representation of a cost function evaluation module 1200 (or cost function evaluator) that implements a cost function 1202 ($f_c(X)$) that includes modules 1204 for one or more electrical system components (e.g., loads, generators, ESSs), according to one embodiment of the disclosure. The cost function evaluation module 1200 may be included in a site controller of an electrical system of a site. The cost function 1202 receives as inputs initialization information 1206 and control parameters 1208 (e.g., a control parameter set X). The cost function 1202 provides as an output a scalar value 1210 representing a cost of operating the electrical system during the future time domain.

The scalar value 1210 representing the cost, which is the output of the cost function 1202, can have a variety of different units in different examples. For example, it can have units of any currency. Alternately, the cost can have units of anything with an associated cost or value such as electrical energy or energy credits. The cost can also be an absolute cost, cost per future time domain, or a cost per unit time such as cost per day. In one embodiment, the units of cost are U.S. dollars per day.

Prior to using the cost function, several elements of it can be initialized. The initialization information that is provided, according to one embodiment, can include:

Date and time, which can be used for determining the applicable electric utility rates.

Future time domain extent, which can be used for defining the time extent of the cost calculation.

Electric utility tariff definition, which is a set of parameters that can define how the electric utility calculates charges.

Electrical system configuration, which includes configuration elements that specify configuration (e.g., size, capacity, tolerances, thresholds, etc.) of the components of the electrical system. An example for a battery energy storage system is the energy capacity of the energy storage device.

Electrical system component model parameters, which include model parameters that can work in conjunction with analytic or numerical models to describe the physical and electrical behavior and relationships governing the operation of electrical components in the electrical system. For battery energy storage systems, a "battery model" is a component, and these parameters specify the properties of the battery such as its Ohmic efficiency, Coulombic efficiency, and degradation rate as a function of its usage.

States of the electrical system, which includes information that specifies the state of components in the electrical system that are important to the economic optimization. For battery energy storage systems, one example state is the SoC of the energy storage device.

Operational constraints, which can specify any additional operational constraints on the electrical system such as minimum import power. In some embodiments, the operational constraints may also include a committed site change in power the site controller is committed to provide during a time period of an aggregation opportunity in response to an aggregation request.

Control law(s), which include the control law(s) associated with the definition of X.

Definition of control parameter set X, which can indicate the times at which each control parameter is to be applied during a future time domain. The definition of the control parameter set X may indicate which control law(s) are to be applied at each time in the future time domain.

Net load (or power) prediction, which can provide the predicted unadjusted net load (or predicted unadjusted net power) during the future time domain.

Pre-calculated values. While segments are defined, many values may be calculated that the cost function can use to increase execution efficiency (help it "evaluate" faster). Pre-calculation of these values may be a desirable aspect of preparing the cost function 1202 to enable the cost function to be evaluated more efficiently (e.g., faster, with fewer resources).

Apportioned power production expectation for an aggregation opportunity. The apportioned power production may include a committed site change in power value, or other indication of a portion of a total requested net change in power of an aggregation opportunity that the site is committed to provide in a maneuver of an aggregation opportunity. In some embodiments, the apportioned power production expectation may be determined according to apportionment information received from an aggregation engine.

Preparing the cost function 1202 can increase execution efficiency of the EO because values that would otherwise be re-calculated each time the cost function is evaluated (possibly thousands of times per EO iteration) are pre-calculated a single time.

Figure 13:
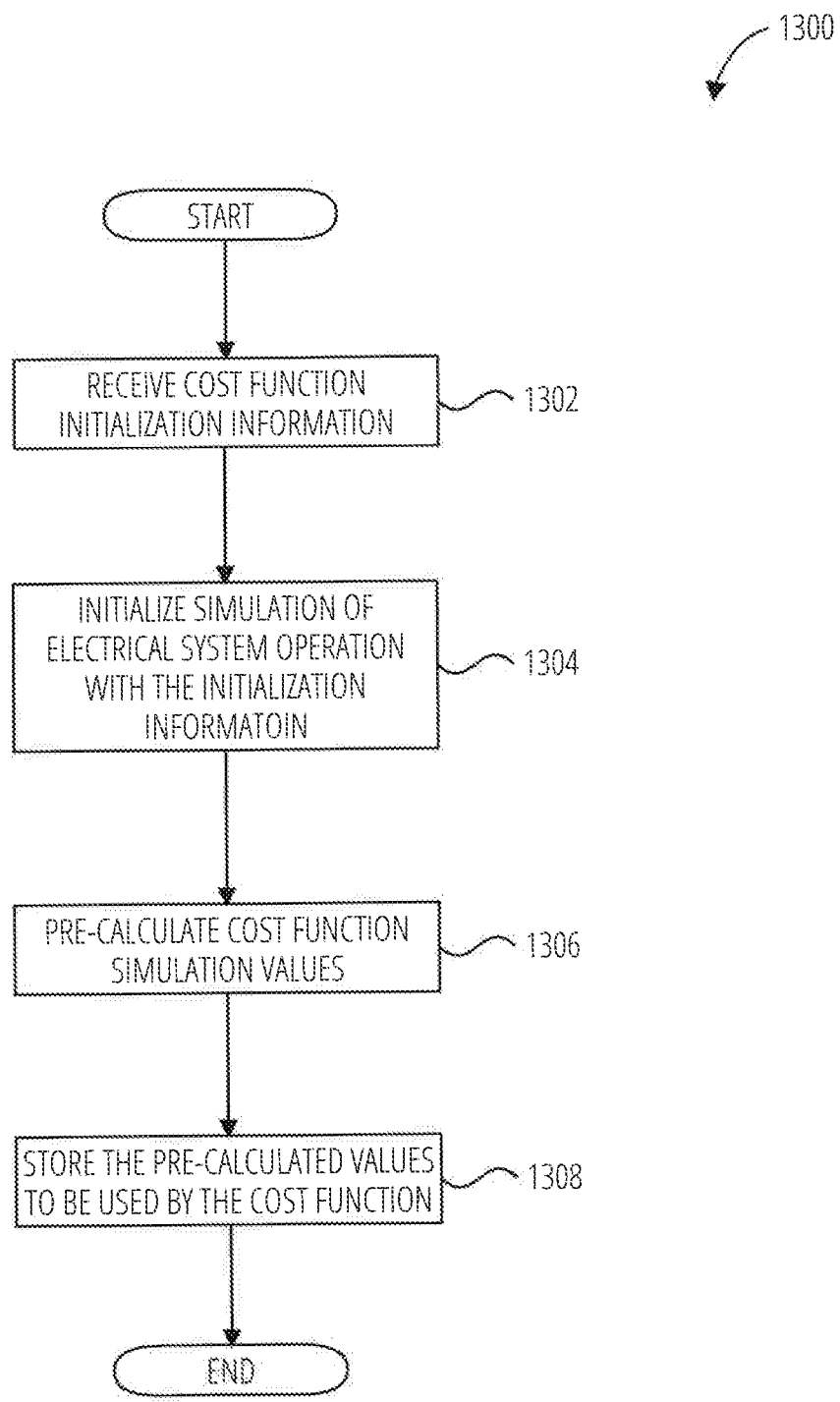
FIG. 13 is a flow diagram of a method of preparing a cost function, according to one embodiment of the present disclosure.

FIG. 13 is a flow diagram of a method 1300 of preparing a cost function $f_c(X)$, according to one embodiment of the present disclosure. The method 1300 includes receiving 1302 cost function initialization information. The method 1300 also includes initializing 1304 a simulation of electrical system operation with the received cost function initialization information. The method 1300 further includes pre-calculating 1306 cost function values, and storing 1308 the pre-calculated values for later use during evaluation of the cost function.

In certain embodiments, defining a control parameter set X and preparing a cost function $f_c(X)$ may be accomplished in parallel.

Evaluation of the Cost Function

During execution of an EO, according to some embodiments of the present disclosure, the cost function is evaluated. During evaluation of the cost function, operation of the electrical system with the control parameter set X is simulated. The simulation may be an aspect of evaluating the cost function. Stated otherwise, one part of evaluating the cost function for a given control parameter set X may be simulating operation of the electrical system with that given control parameter set X. In the simulation, the previously predicted load and generation are applied. The simulation takes place on the future time domain. As time advances through the future time domain in the simulation, costs and benefits (as negative costs) can be accumulated. What is finally returned by the simulation is a representation of how the electrical system state may evolve during the future time domain with control X, and what costs may be incurred during that time.

In some embodiments, the cost function, when evaluated, returns the cost of operating the electrical system with some specific control parameter set X. As can be appreciated, the cost of operating an electrical system may be very different, depending on X. So evaluation of the cost function includes a simulated operation of the electrical system with X first. The result of the simulation can be used to estimate the cost associated with that scenario (e.g., the control parameter set X).

As noted previously, some of the costs considered by the cost function in one embodiment are:

1. Electricity supply charges (both flat rates and ToU rates)
2. Electricity demand charges
3. Battery degradation cost
4. Reduction of energy stored in the energy storage system
5. Site benefits for committing to provide site change in power for an aggregate maneuver (as a negative number)

Electricity supply and demand charges have already been described. For monthly demand charges, the charge may be calculated as an equivalent daily charge by dividing the charge by approximately 30 days, or by dividing by some other number of days, depending on how many days are remaining in the billing cycle. Battery degradation cost is described in a later section. Reduction in energy stored in an ESS accounts for the difference in value of the storage energy at the beginning of the future time domain compared to the end. Site benefits for participation in an aggregate maneuver can be calculated as the benefit on a per day basis, but as a negative number. The site benefits, in some embodiments, may include a portion of an upshot of an aggregation opportunity, as apportioned in apportionment information received from an aggregation engine. The portion of the upshot may be a portion that is proportional to the site change in power provided by the site at the rate specified in the apportionment information.

During the cost function's electrical system simulation, several variables can be tracked and stored in memory. These include control variables, electrical power consumed by or supplied from various electrical systems, and the states of charge of any energy storage systems. Other variables can also be tracked and stored to memory. Any of the variables stored to memory can be output by the cost function.

Figure 14:
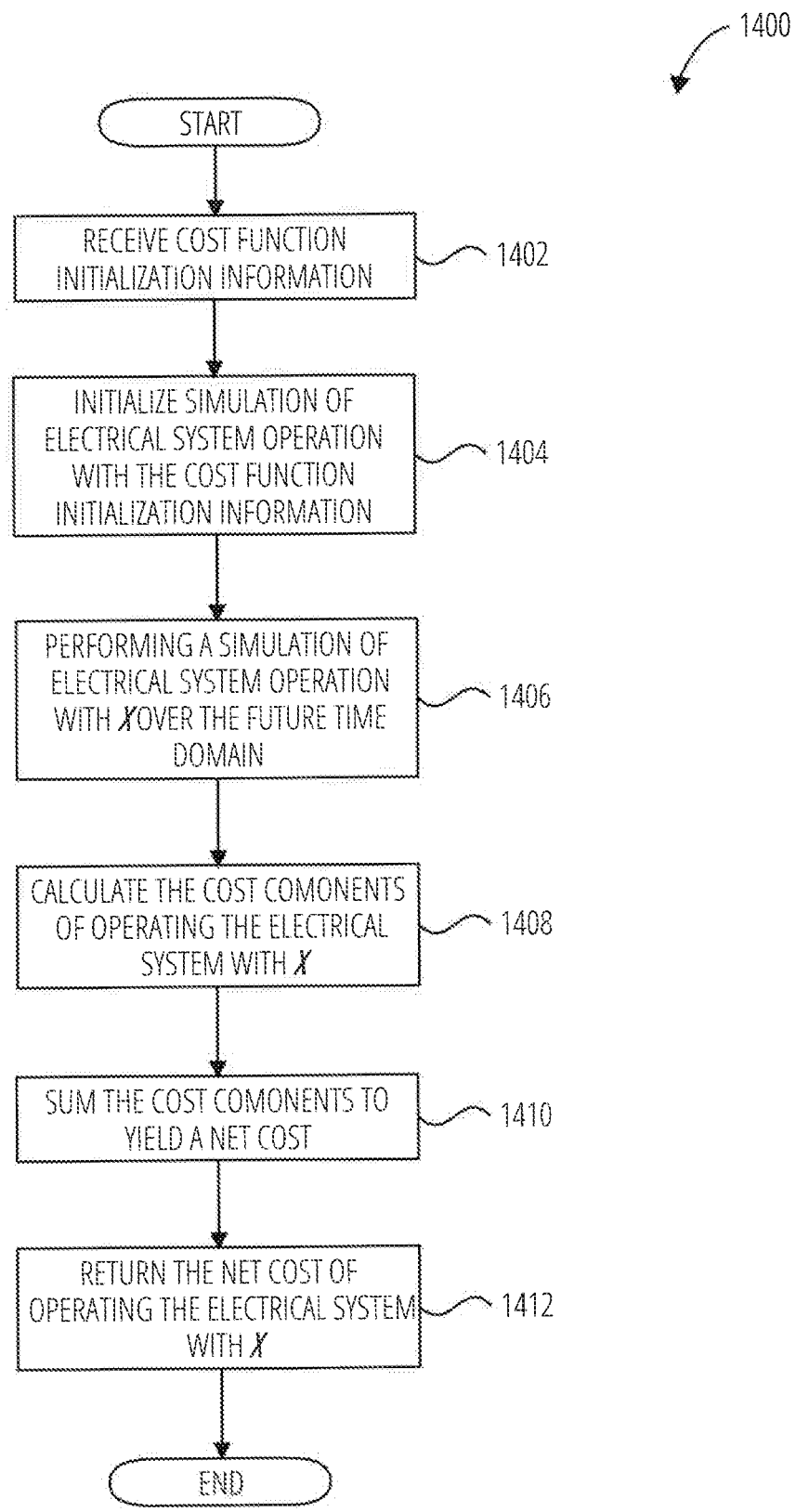
FIG. 14 is a flow diagram of a method of evaluating a cost function, according to one embodiment of the present disclosure.

FIG. 14 is a flow diagram of a method 1400 of evaluating a cost function that is received from an external source or otherwise unprepared, according to one embodiment of the present disclosure. The method 1400 may include receiving 1402 cost function initialization information, and initializing 1404 simulation of electrical system operation with the received cost function initialization information. The method 1400 also includes performing 1406 a simulation of the electrical system operation with X over the future time domain, and calculating 1408 the cost components of operating the electrical system with X. The method 1400 further includes summing 1410 the cost components to yield a net cost of operating the electrical system with X, and returning 1412 or otherwise outputting the net cost of operating the electrical system with X.

Figure 15:
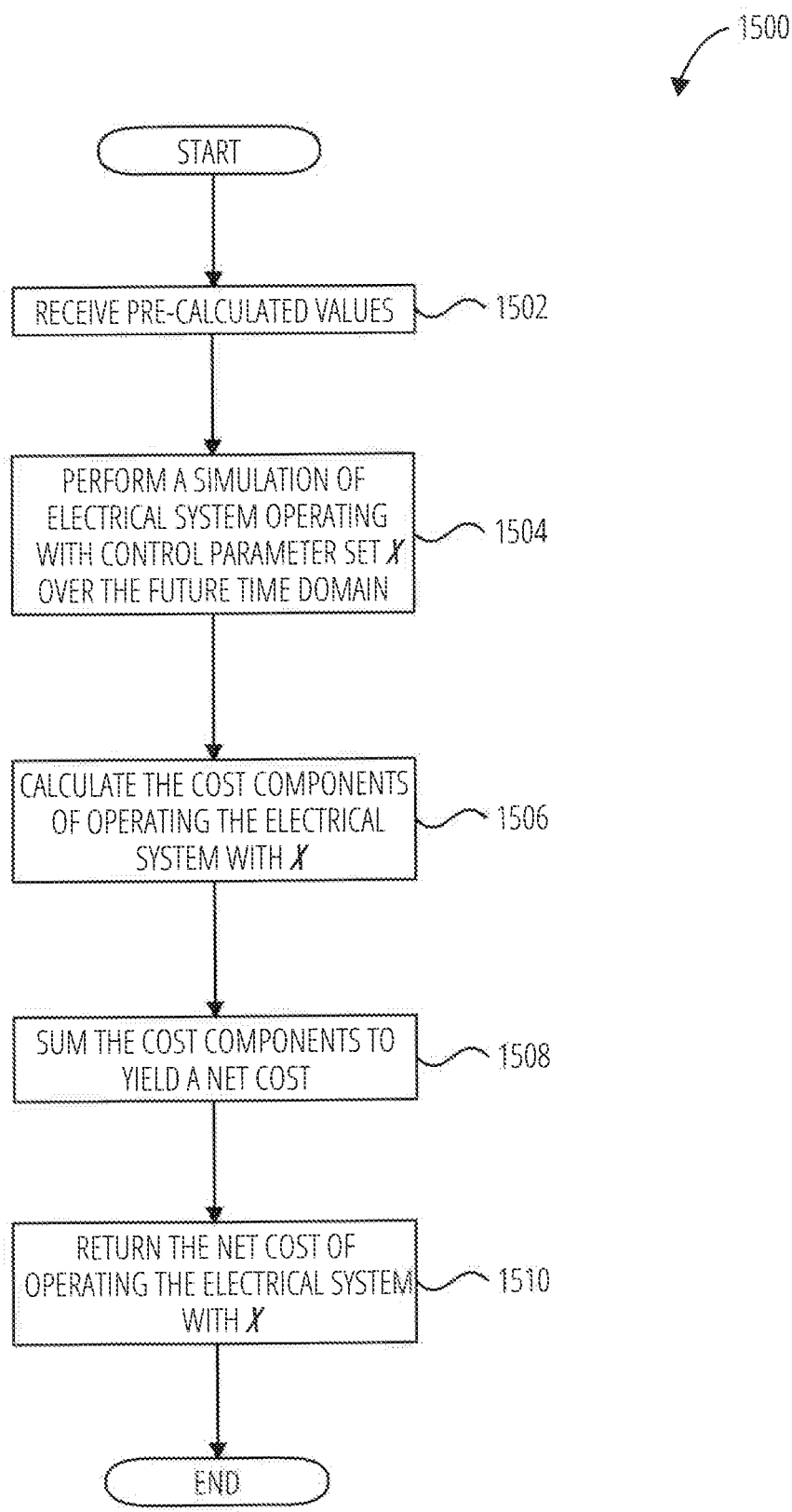
FIG. 15 is a flow diagram illustrating a method of evaluating a prepared cost function, according to one embodiment of the present disclosure.

FIG. 15 is a flow diagram illustrating a method 1500 of evaluating a prepared cost function, according to one embodiment of the present disclosure. The cost function may be prepared according to the method 1300 of FIG. 13. The method 1500 includes receiving 1502 pre-calculated values as inputs to the method 1500. The values may be pre-calculated during an operation to prepare the cost function, such as the method 1300 of FIG. 13. The method 1500 also includes performing 1504 a simulation of the electrical system operating with a control parameter set X over the future time domain. The method 1500 further includes calculating 1506 the cost components of operating the electrical system with X, and summing 1508 the cost components to yield a net cost of operating the electrical system with X. The method 1500 includes returning 1510 or otherwise outputting the net cost of operating the electrical system with X.

In some embodiments, rather than returning 1510 the net cost of operating the electrical system with X during the future time domain, what is returned is the net cost of operating the electrical system with X as a cost per unit time (such as an operating cost in dollars per day). Returning a per day cost can provide better normalization between the different cost elements that comprise the cost function. The cost per day for example can be determined by multiplying the cost of operating during the future time domain by 24 hours and dividing by the length (in hours) of the future time domain.

Execute Continuous Minimization of the Cost Function

With a prediction of load and generation made, the control parameter set X defined, and the cost function obtained and initialized and/or prepared, minimization of cost can be performed.

Minimization of the cost function may be performed by an optimization process and/or an optimization module that is based on an optimization algorithm. Minimization (or optimization) may include evaluating the cost function iteratively with different sets of values for the control parameter set X (e.g., trying different permutations from an initial value) until a minimum cost (e.g., a minimum value of the cost function) is determined. In other words, the algorithm may iteratively update or otherwise change values for the control parameter set X until the cost function value (e.g. result) converges at a minimum (e.g., within a prescribed tolerance, or satisfying termination criteria). The iterative updating or changing of the values may include perturbing or varying one or more values based on prior one or more values.

Termination criteria (e.g., a prescribed tolerance, a delta from a prior value, a prescribed number of iterations) may aid in determining when convergence at a minimum is achieved and stopping the iterations in a finite and reasonable amount of time. The number of iterations that may be performed to determine a minimum could vary from one optimization cycle to a next optimization cycle. The set of values of the control parameter set X that results in the cost function returning the lowest value may be determined to be the optimal control parameter set $X_{opt}$.

In one embodiment, a numerical or computational generalized constrained nonlinear continuous optimization (or minimization) algorithm is called (e.g., executed or invoked) by a computing device.

Figure 16:
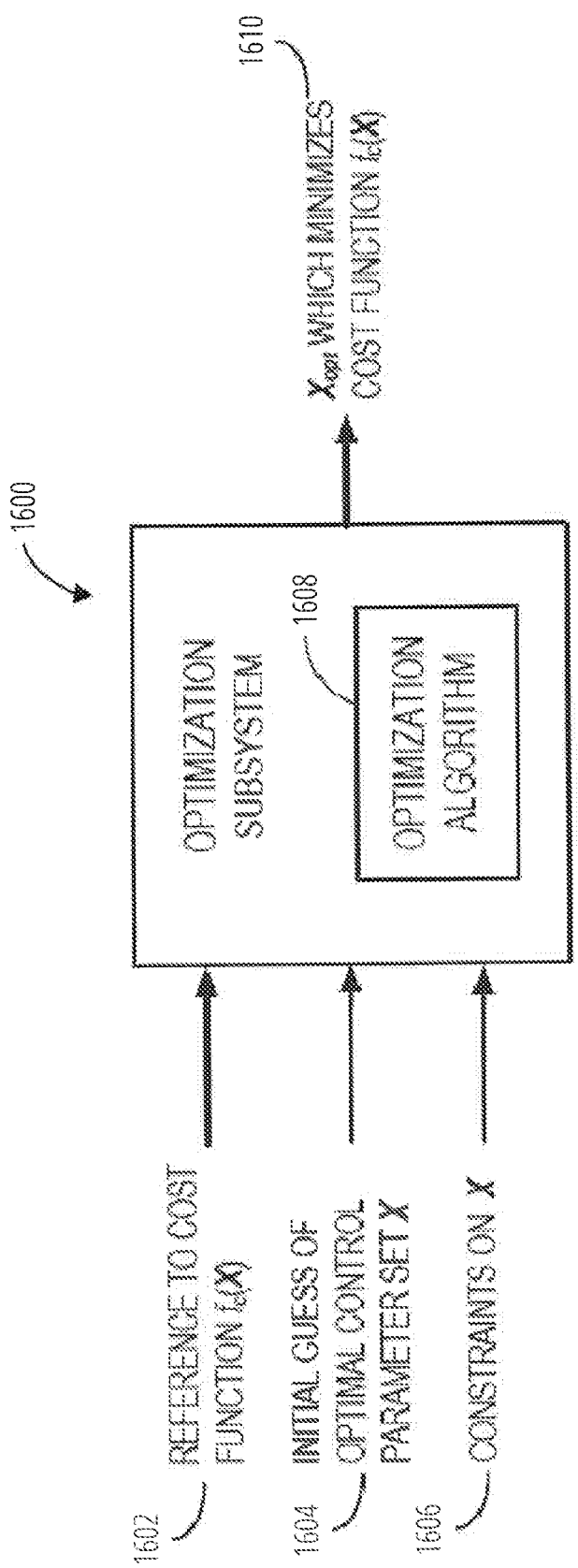
FIG. 16 is a diagrammatic representation of an optimization subsystem, according to one embodiment of the disclosure.

FIG. 16 is a diagrammatic representation of an optimization subsystem 1600 that utilizes or otherwise implements an optimization algorithm 1608 to determine an optimal control parameter set 1610 ($X_{opt}$) that minimizes the cost function $f_c(X)$, according to one embodiment of the disclosure. In the embodiment of FIG. 16, the optimization algorithm 1608 utilized by the optimization subsystem 1600 may be a generalized constrained multivariable continuous optimization (or minimization) algorithm. A reference 1602 to the cost function $f_c(X)$ is provided to the optimization subsystem 1600.

The optimization algorithm 1608 can be implemented in software, hardware, firmware, or any combination of these. The optimization algorithm 1608 may be implemented based on any approach from descriptions in literature, pre-written code, or developed from first principles. The optimization algorithm implementation can also be tailored to the specific problem of electrical system economic optimization, as appropriate in some embodiments.

Some algorithms for generalized constrained multivariable continuous optimization include:
   Trust-region reflective
   Active set
   SQP
   Interior Point
   Covariance Matrix Adaption Evolution Strategy (CMAES)
   Bound optimization by Quadratic Approximation (BOBYQA)
   Constrained optimization by Linear Approximation (COBYLA)

The optimization algorithm 1608 may also be a hybrid of more than one optimization algorithm. For example, the optimization algorithm 1608 may use CMAES to find a rough solution, then Interior Point to converge tightly to a minimum cost. Such hybrid methods may produce robust convergence to an optimum solution in less time than single-algorithm methods.

Regardless of the algorithm chosen, it may be useful to make an initial guess 1604 of the control parameter set X. This initial guess 1604 enables an iterative algorithm such as those listed above to more quickly find a minimum. In one embodiment, the initial guess is derived from the previous EO execution results.

Any constraints 1606 on X can also be defined or otherwise provided. Examples of the constraints 1606 include any minimum or maximum control parameters for the electrical system.

An Example EO Result

Figure 17:
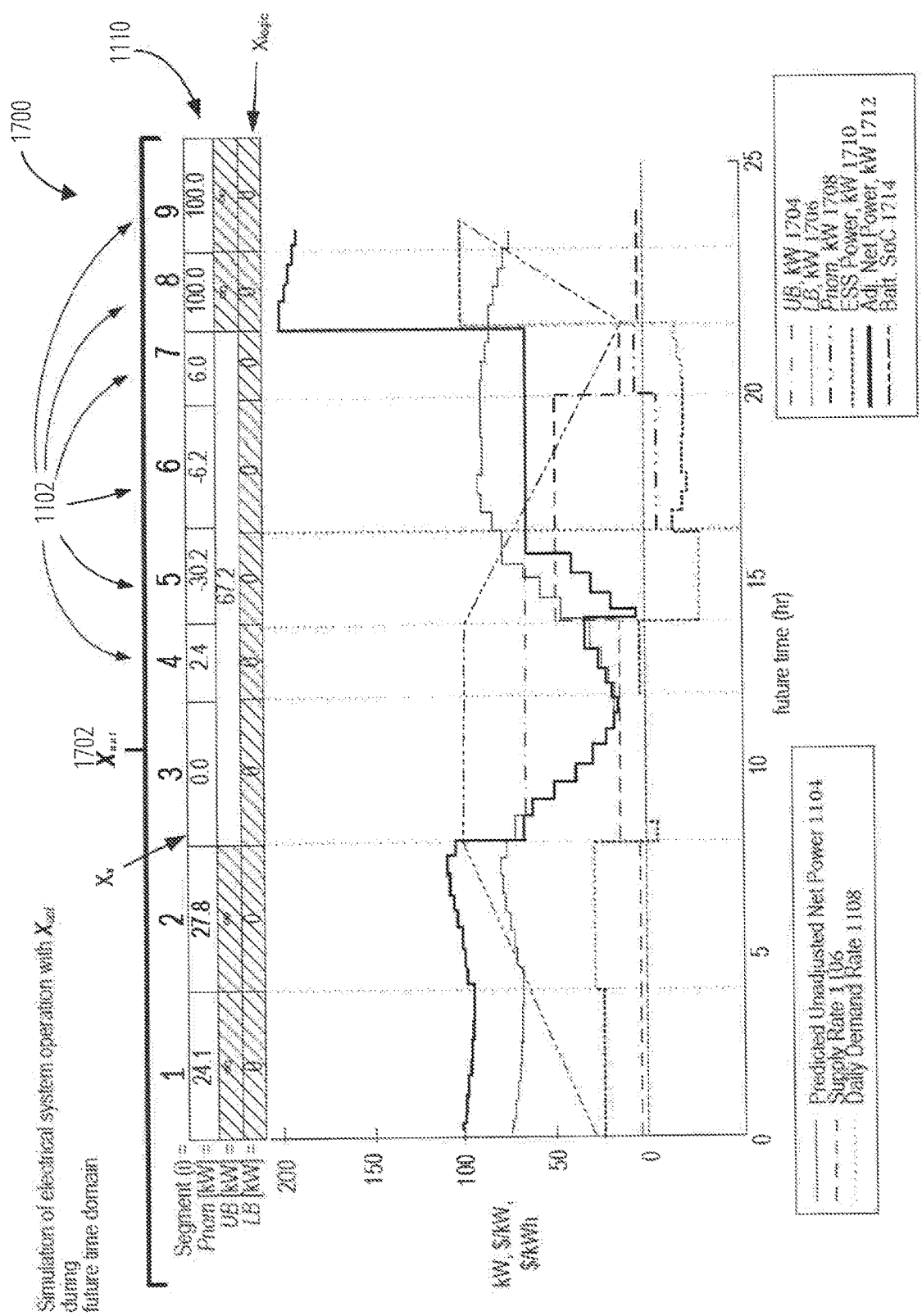
FIG. 17 is a graph illustrating an example result from an economic optimizer for a battery energy storage system (ESS).

FIG. 17 is a graph 1700 illustrating an example result from an EO for a small battery energy storage system, using the same example upcoming time domain, segmentation of the upcoming time domain into a plurality of time segments 1102, predicted unadjusted net power plot 1104, supply rate plot 1106, daily demand rate plot 1108, and representation 1110 of the control parameter set X as in FIG. 11.

The graph 1700 also includes plots for UB (kW) 1704, LB (kW) 1706, Pnom (kW) 1708, ESS power (kW) 1710, adjusted net power (kW) 1712, and battery SoC 1714.

In FIG. 17, as in FIG. 11, the future time domain is split into nine segments 1102, and nine optimal sets of parameters 1702 were determined (e.g., a control parameter set $X_{opt}$ that includes values for nine optimal sets of parameters, one optimal set of parameters for each segment 1102). Daily demand charges are applicable and a net export of energy (e.g., to the grid) is not allowed in the illustrated example. An objective of the controller is to find an optimal sequence of electrical system control parameters.

The control parameter set X in this case is defined to include three parameters: $P_{nom}$ 1708, UB 1704, and LB 1706 as described above. In this example, during execution of the optimization algorithm, the optimal values in the unshaded boxes ($X_x$) of the representation 1110 of X are determined, $P_{nom}$ 1708 which is the battery inverter power (where charge values are positive and generation/discharge values are negative) during each time segment 1102, and UB 1704 which is the upper limit on demand during each time segment 1102. The date and time to apply each specific control parameter is part of the definition of X. The shaded values ($X_{logic}$, which includes LB and some UB values) in the representation 1110 of X are determined by logic. For example, when no demand charge is applicable, the UB can be set to infinity. And since net export of power is not permitted in this example, LB can be set to zero. There is no need to determine optimal values for these shaded parameters when executing the optimization because their values are dictated by constraints and logic.

Applying the optimal values of X, the expected cost per day of operating the electrical system in the example of FIG. 17 is $209.42 per day. This total cost is the sum of the ToU supply cost ($248.52), the daily demand cost ($61.52), the cost of battery energy change ($-115.93), and the cost of battery degradation ($15.32).

As can be appreciated, in other embodiments, the EO may determine a set of control values for a set of control variables, instead of a control parameter set X. The EO may determine the set of control values to effectuate a change to the electrical system toward meeting a controller objective for economical optimization of the electrical system. The EO may then output the control values or the set of control variables for delivery directly to the electrical system. In such embodiment, the EO may be a primary component of the controller and the controller may not include a dynamic manager (e.g., a high speed controller).

Dynamic Manager or High Speed Controller (HSC)

Greater detail will now be provided about some elements of a dynamic manager, or an HSC, according to some embodiments of the present disclosure. Because the control parameter set X is passed to the high speed controller, the definition of the control parameter set X may be tightly linked to the HSC's control law. The interaction between an example HSC and control parameter set X is described below.

Storing a Control Plan

As already mentioned, the control parameter set X can contain multiple sets of parameters and dates and times that those sets of parameters are to be applied by the HSC. One embodiment of the present disclosure takes this approach. Multiple sets of parameters are included in X, each set of parameters with a date and time the set is intended to be applied to the electrical system being controlled. Furthermore, each controllable system within the electrical system can have a separate set of controls and date and time on which the set of controls is intended to be applied. The HSC commits the full control parameter set X to memory and applies each set of parameters therein to generate control variables to deliver to, and potentially effectuate a change to, the electrical system at the specified times. Stated differently, the HSC stores and schedules a sequence of optimal sets of parameters, each to be applied at an appropriate time. In other words, the HSC stores a control plan. This first task of storing and scheduling a sequence of optimal control parameter sets (e.g., a control plan) by the high speed controller provides distinct advantages over other control architectures.

For example, storing of a control plan by the HSC reduces the frequency that the computationally intensive (EO) portion of the controller is executed. This is because even if the first sequential time interval expires before the EO executes again, the HSC will switch to the next sequential control set at the appropriate time. In other words, the EO does not have to execute again before the first sequential time interval expires since multiple optimal control sets can be queued up in sequence.

As another example, storing of a control plan by the HSC enables operation (e.g., control of the electrical system) for significant periods of time without additional EO output. This may be important for example if the EO is executing in a remote processor such as a cloud computing environment and the HSC is running on a processor local to a building. If communication is lost for a period of time less than the future time domain, the HSC can continue to use the already-calculated optimal control parameter sets at the appropriate times. Although operation in such a manner during outage may not be optimal (because fresh EO executions are desirable as they take into account the latest data), this approach may be favored compared with use of a single invariant control set or shutting down.

Application of Presently Applicable Control Parameters

A second task of the HSC, according to one embodiment, is to control some or all of the electrical system components within the electrical system based on the presently applicable control parameter set. In other words, the HSC applies each set of parameters of a control parameter set X in conjunction with a control law to generate control variables to deliver to, and potentially effectuate a change to, the electrical system at appropriate times.

For an electrical system with a controllable battery ESS, this second task of the HSC may utilize four parameters for each time segment. Each of the four parameters may be defined as in Table 4 above. In one embodiment, these parameters are used by the HSC to control the battery inverter to charge or discharge the energy storage device. For a battery ESS, the typical rate at which the process variables are read and used by the HSC and new control variables are generated may be from 10 times per second to once per 15 minutes. The control variables (or the set of values for the set of control variables) for a given corresponding time segment may be provided to the electrical system at (e.g., before or during) the given corresponding time segment of the upcoming time domain.

As can be appreciated, in other embodiments, an entire control plan (e.g., a control parameter set X comprising a set of sets) may be processed by the HSC to determine a plurality of sets of control variables, each set of control variables for a corresponding time segment. The plurality of sets of control variables may be provided at once (e.g., before the upcoming time domain or no later than during a first time segment of the upcoming time domain). Or, each set of the plurality of sets may be provided individually to the electrical system at (e.g., before or during) the given corresponding time segment.

Another aspect of the HSC, according to one embodiment, is that the HSC can also be used to curtail a generator (such as a photovoltaic generator) if necessary to maintain the lower bound on electrical system power consumption specified by LB.

Figure 18:
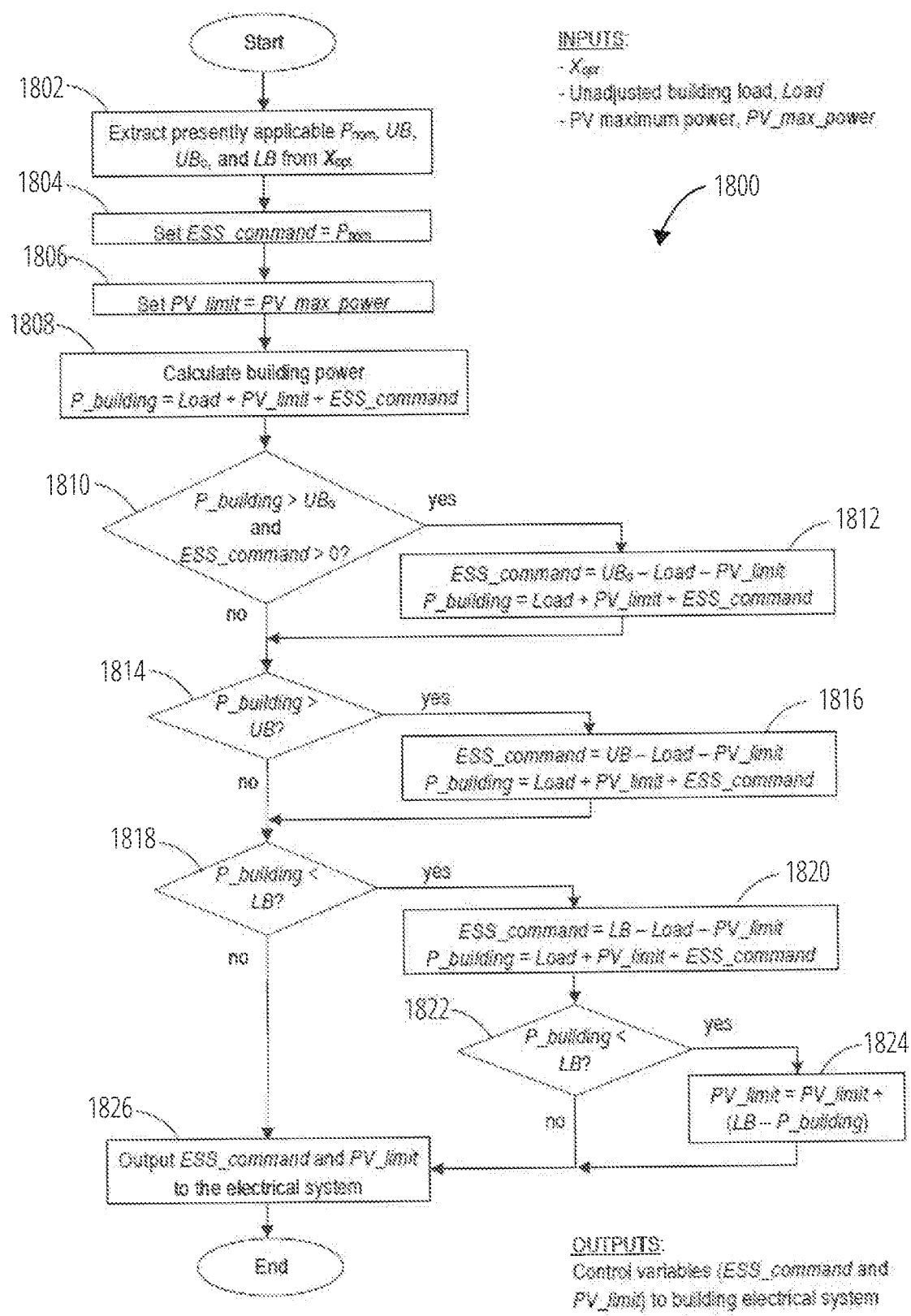
FIG. 18 is a method of a dynamic manager, according to one embodiment of the present disclosure.

FIG. 18 is a method 1800 of a dynamic manager, or HSC, according to one embodiment of the present disclosure, to use a set of optimal control parameters $X_{opt}$ in conjunction with a control law to determine values of a set of control variables to command the electrical system. A set of optimal control parameters ($X_{opt}$), a measurement of unadjusted building load (Load), and PV maximum power (PV_max_power) are received or otherwise available as inputs to the method 1800. The dynamic manager processes $X_{opt}$ to determine a set of control values to effectuate a change to the electrical system toward meeting an objective for economical optimization of the electrical system during an upcoming time domain. The output control variables are the ESS power command (ESS_command) and the photovoltaic limit (PV_limit), which are output to the building electrical system to command an ESS and a photovoltaic subsystem.

The method 1800 includes extracting 1802 the presently applicable $P_{nom}$, UB, $UB_0$, and LB from $X_{opt}$ and setting 1804 the ESS power command, ESS_command equal to $P_{nom}$. The method 1800 also includes setting 1806 the photovoltaic limit, PV_limit, equal to PV maximum power, PV_max_power and calculating 1808 the building power, P_building, as a summation of the unadjusted building load, the photovoltaic limit, and the ESS power command (P_building=Load+PV_limit+ESS_command).

The method 1800 further comprises determining 1810 whether the building power is greater than $UB_0$ (P_building>$UB_0$) and whether the ESS command is greater than zero (ESS_command >0). If yes, then the method includes setting 1812 variables as:

ESS_command=$UB_0$-Load-PV_limit

P_building=Load+PV_limit+ESS_command.

The method 1800 includes determining 1814 whether building power is greater than UB(P_building>UB). If yes, then the method 1800 includes setting 1816 variables as:

ESS_command=UB—Load-PV_limit

P_building=Load+PV_limit+ESS_command.

The method 1800 includes determining 1818 whether building power is less than LB (P_building<LB). If yes, then the method 1800 includes setting 1820 variables as:

ESS_command=LB-Load-PV_limit

P_building=Load+PV_limit+ESS_command, and the method 1800 includes determining 1822 whether building power remains less than LB (P_building<LB). If yes, then the method 1800 includes setting 1824 the photovoltaic limit PV_limit as:

PV_limit+(LB-P_building).

The method 1800 then includes outputting 1826 the control variables ESS_command and PV_limit to the electrical system.

An Example HSC Result

Figure 19:
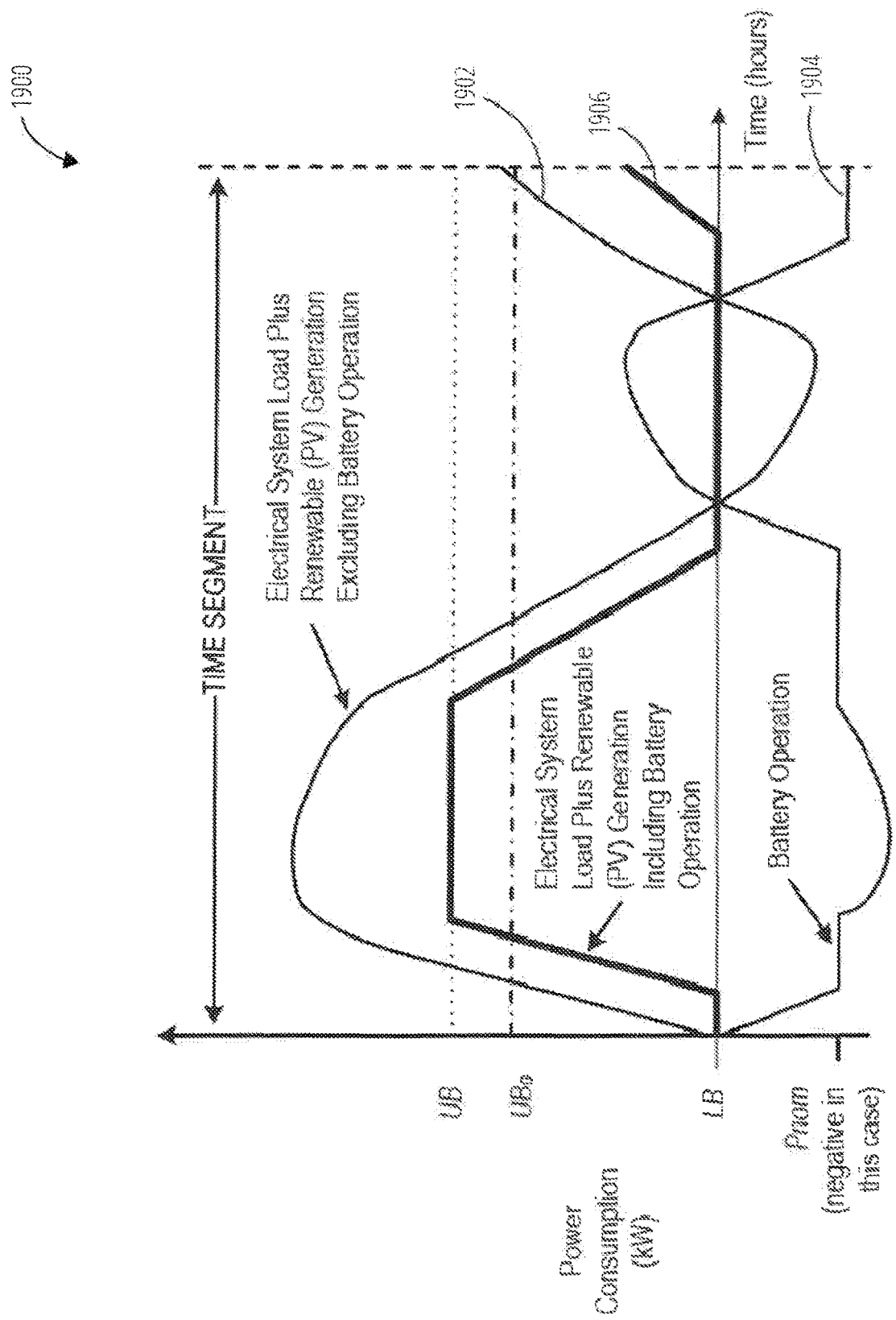
FIG. 19 is a graph showing plots for an example application of a particular four-parameter control set during a time segment.

FIG. 19 is a graph 1900 showing plots for an example application of a particular four-parameter control set during a time segment. The graph 1900 shows a value for each of UB, $UB_0$, LB, and $P_{nom}$, which are defined above in Table 4. A vertical axis is the power consumption (or rate of energy consumed), with negative values being generative. A first first plot 1902 provides unadjusted values of power consumption (kW) for the electrical system load plus renewable (photovoltaic) generation and excluding battery operation, over the time segment. In other words, the first plot 1902 shows operation of the electrical system without benefit of a controllable ESS (battery) that is controlled by a controller, according to the present disclosure. A second plot 1904 provides values of power consumption (kW) for battery operation over the time segment. The second plot 1904 may reflect operation of an ESS as commanded by the site controller. In other words, the second plot 1904 is the control variable for the ESS. The battery operation value may be the value of the control variable to be provided by the HSC to command operation of the ESS. A third plot 1906 provides values of power consumption (kW) for the electrical system load plus renewable (photovoltaic) generation and including battery operation, over the time segment. The third plot 1906 illustrates how the controlled ESS (or battery) affects the power consumption of the electrical system from the grid. Specifically, the battery in this example is controlled (e.g., by the battery operation value) to discharge to reduce the load of the electrical system on the grid and limit peak demand to the UB value when desired. Furthermore, this example shows LB being enforced by commanding the ESS to charge by an amount that limits the adjusted net power to be no less than LB when necessary. Furthermore, this example shows that the nominal ESS power ($P_{nom}$) is commanded to the extent possible while still meeting the requirements of UB, $UB_0$, and LB.

In other embodiments, the control parameter set X may have fewer or more parameters than the four described for the example embodiment above. For example, the control parameter set X may be comprised of only three parameters: $P_{nom}$, UB, and LB. Alternately, the control parameter set X may be comprised of only two parameters: $P_{nom}$ and UB.

Alternately, the control parameter set X may include only UB or only $P_{nom}$. Or, the control parameter set X may include any other combination of four or fewer parameters from the above list.

Battery Models

In a battery ESS, battery cost can be a significant fraction of the overall system cost of a site and in many instances can be greater than 60% of the cost of the system (site). The cost of the battery per year is roughly proportional to the initial cost of the battery and inversely proportional to the lifetime of the battery. Also, any estimated costs of system downtime during replacement of a spent battery may be taken into account. A battery's condition, lifetime, and/or state of health (SoH) may be modeled and/or determined by its degradation rate (or rate of reduction of capacity and its capacity at end of life). A battery's degradation rate can be dependent upon many factors, including time, SoC, discharge or charge rate, energy throughput, and temperature of the battery. The degradation rate may consider capacity of the battery (or loss thereof). Other ways that a battery's condition, lifetime, and/or SoH may be evaluated may be based on a maximum discharge current of the battery or the series resistance of the battery.

Described herein are battery models based on battery degradation as a function of battery capacity as compared to initial capacity or capacity at the beginning of life of the battery. Stated otherwise, the disclosed battery models consider battery condition or state of health according to the battery capacity lost from the capacity at the beginning of life of the battery. As can be appreciated, other battery models may model battery condition according to another way, such as maximum discharge current of the battery, the series resistance of the battery, or the like.

In one embodiment, the battery degradation and its associated cost is included as a cost element in the cost function. By including battery degradation cost in the cost function, as the EO executes to find the minimum cost, the EO can effectively consider the contribution of battery degradation cost for each possible control parameter set X. In other words, the EO can take into account a battery degradation cost when determining (e.g., from a continuum of infinite control possibilities) an optimal control parameter set $X_{opt}$. To accomplish this, a parameterized model of battery performance, especially its degradation rate, can be developed and used in the cost function during the simulation of potential control solutions (e.g., sets of control parameters X). The battery parameters (or constants) for any battery type can be determined that provide a closest fit (or sufficiently close fit within a prescribed tolerance) between the model and the actual battery performance or degradation. Once the parameters are determined, the cost function can be initialized with configuration information containing those parameters so that it is able to use the model in its control simulation in some implementations.

In one embodiment, battery degradation is written in the form of a time or SoC derivative that can be integrated numerically as part of the cost function control simulation to yield battery degradation during the future time domain. In one embodiment, this degradation derivative can be comprised of two components: a wear component (or throughput component) and an aging component. The components can be numerically integrated vs. time using an estimate of the battery SoC at each time step in one embodiment.

Apparatus Architectures

Figure 20:
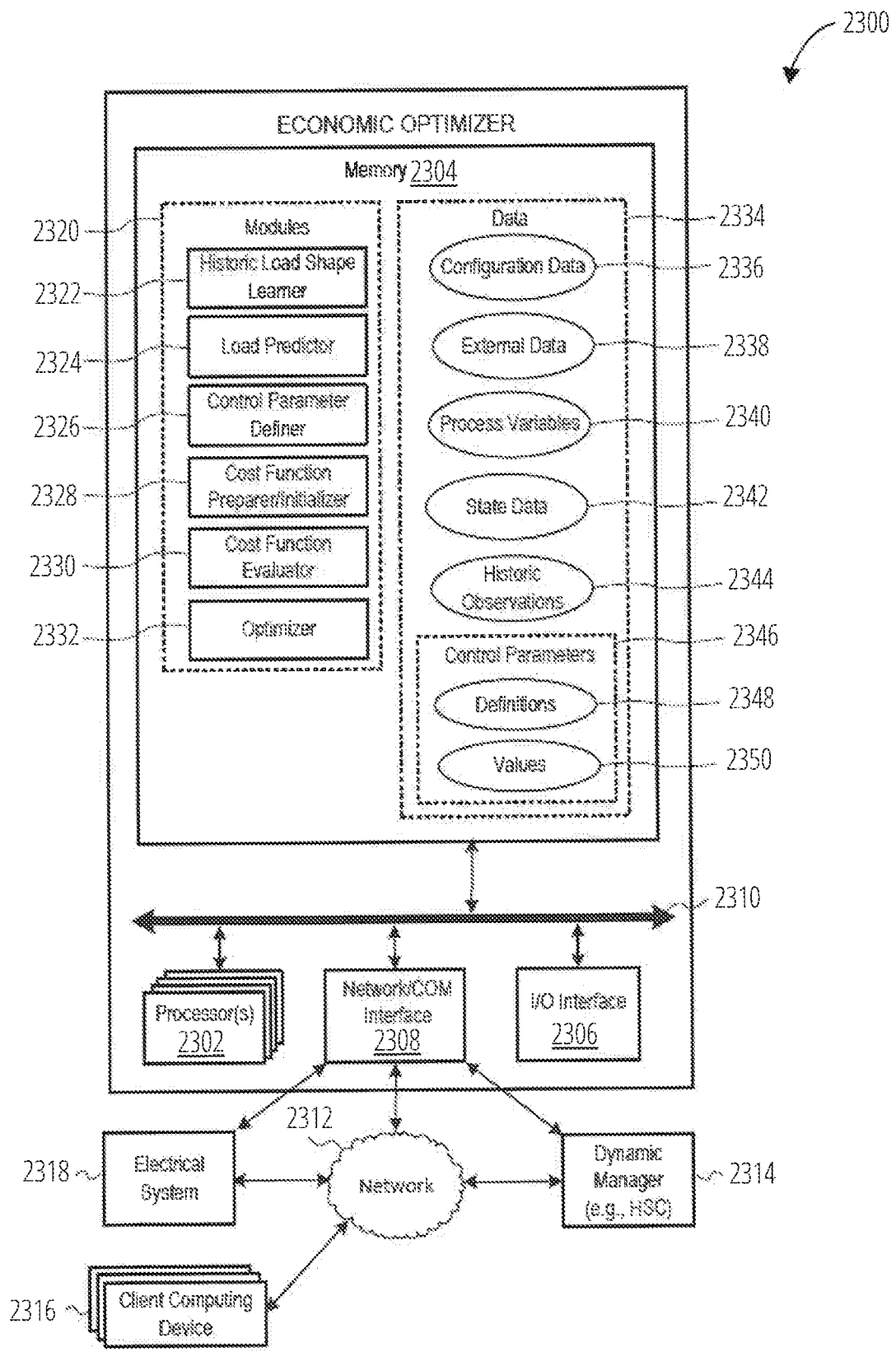
FIG. 20 is a diagram of an economic optimizer, according to one embodiment of the present disclosure.

FIG. 20 is a diagram of an EO 2300 according to one embodiment of the present disclosure. The EO 2300 may determine a control plan for managing control of an electrical system 2318 of a site during an upcoming time domain and provide the control plan as output. The determined control plan may include a plurality of sets of parameters each to be applied for a different time segment within an upcoming time domain. The EO 2300 may determine the control plan based on a set of configuration elements specifying one or more constraints of the electrical system 2318 and defining one or more cost elements associated with operation of the electrical system 2318. The EO 2300 may also determine the control plan based on a set of process variables that provide one or more measurements of a state of the electrical system 2318. The EO 2300 may include one or more processors 2302, memory 2304, an input/output interface 2306, a network/COM interface 2308, and a system bus 2310.

The one or more processors 2302 may include one or more general purpose devices, such as an Intel®, AMD®, or other standard microprocessor. The one or more processors 2302 may include a special purpose processing device, such as ASIC, SoC, SiP, FPGA, PAL, PLA, FPLA, PLD, or other customized or programmable device. The one or more processors 2302 perform distributed (e.g., parallel) processing to execute or otherwise implement functionalities of the present embodiments. The one or more processors 2302 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 2304 may include static RAM, dynamic RAM, flash memory, one or more flip-flops, ROM, CD-ROM, DVD, disk, tape, or magnetic, optical, or other computer storage medium. The memory 2304 may include a plurality of program modules 2320 and data 2334.

The program modules 2320 may include all or portions of other elements of the EO 2300. The program modules 2320 may run multiple operations concurrently or in parallel by or on the one or more processors 2302. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 2304 may also include the data 2334. Data generated by the EO 2300, such as by the program modules 2320 or other modules, may be stored on the system memory 2304, for example, as stored program data 2334. The data 2334 may be organized as one or more databases.

The input/output interface 2306 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2308 may facilitate communication or other interaction with other computing devices (e.g., a dynamic manager 2314) and/or networks 2312, such as the Internet and/or other computing and/or communications networks. The network/COM interface 2308 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2308 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 2308 may be any appropriate communication interface for communicating with other systems and/or devices.

The system bus 2310 may facilitate communication and/or interaction between the other components of the system, including the one or more processors 2302, the memory 2304, the input/output interface 2306, and the network/COM interface 2308.

The modules 2320 may include a historic load shape learner 2322, a load predictor 2324, a control parameter definer 2326, a cost function preparer/initializer 2328, a cost function evaluator 2330, and an optimizer 2332.

The historic load shape learner 2322 may compile or otherwise gather historic trends to determine a historic profile or an average load shape that may be used for load prediction. The historic load shape learner 2322 may determine and update and an *avg_load_shape* array and an *avg_load_shape_time_of_day* array by recording load observations and using an approach to determine a suitable average of the historic load observations after multiple periods of time. The historic load shape learner 2322 may utilize a process or an approach to determining the historic average profile such as described above with reference to FIG. 10.

The load predictor 2324 may predict a load on the electrical system 2318 during an upcoming time domain. The load predictor 2324 may utilize a historic profile or historic load observations provided by the historic load shape learner 2322. The load predictor 2324 may utilize a load prediction method such as described above with reference to FIGS. 10 and 11.

The control parameter definer 2326 may generate, create, or otherwise define a control parameter set X, in accordance with a control law. The created control parameters 2346 may include a definition 2348 and a value 2350 and may be stored as data 2334.

The cost function preparer/initializer 2328 prepares or otherwise obtains a cost function to operate on the control parameter set X. The cost function may include the one or more constraints and the one or more cost elements associated with operation of the electrical system 2318. The cost cost function preparer/initializer 2328 pre-calculates certain values that may be used during iterative evaluation of the cost function involved with optimization.

The cost function evaluator 2330 evaluates the cost function based on the control parameter set X. Evaluating the cost function simulates operation of the electrical system for a given time period under a given set of circumstances set forth in the control parameter set X and returns a cost of operating the electrical system during the given time period.

The optimizer 2332 may execute a minimization of the cost function by utilizing an optimization algorithm to find the set of values for the set of control variables. Optimization (e.g., minimization) of the cost function may include iteratively utilizing the cost function evaluator 2330 to evaluate the cost function with different sets of values for a control parameter set X until a minimum cost is determined. In other words, the algorithm may iteratively change values for the control parameter set X to identify an optimal set of values in accordance with one or more constraints and one or more cost elements associated with operation of the electrical system.

The data 2334 may include configuration data 2336, external data 2338, process variables 2340, state data 2342, historic observations 2344, and control parameters 2346 (including definitions 2348 and values 2350).

The configuration data 2336 may be provided to, and received by, the EO 2300 to communicate constraints and characteristics of the electrical system 2318.

The external data 2338 may be received as external input (e.g., weather reports, changing tariffs, fuel costs, event data), which may inform the determination of the optimal set of values.

The process variables 2340 may be received as feedback from the electrical system 2318. The process variables 2340 are typically measurements of the electrical system 2318 state and are used to, among other things, determine how well objectives of controlling the electrical system 2318 are being met.

The state data 2342 would be any EO state information that may be helpful to be retained between one EO iteration and the next. An example is *avg_load_shape*.

The historic observations 2344 are the record of process variables that have been received. A good example is the set of historic load observations that may be useful in a load predictor algorithm.

As noted earlier, the control parameter definer 2326 may create control parameters 2346, which may include a definition 2348 and a value 2350 and may be stored as data 2334. The cost cost function evaluator 2330 and/or the optimizer 2332 can determine values 2350 for the control parameters 2346.

The EO 2300 may provide one or more control parameters 2346 as a control parameter set X to the dynamic manager 2314 via the network/COM interface 2308 and/or via the networks 2312. The dynamic manager 2314 may then utilize the control parameter set X to determine values for a set of control variables to deliver to the electrical system 2318 to effectuate a change to the electrical system 2318 toward meeting one or more objectives (e.g., economic optimization) for controlling the electrical system 2318.

In other embodiments, the EO 2300 may communicate the control parameter set X directly to the electrical system 2318 via the network/COM interface 2308 and/or via the networks 2312. In such embodiments, the electrical system 2318 may process the control parameter set X directly to determine control commands, and the dynamic manager 2314 may not be included.

In still other embodiments, the EO 2300 may determine values for a set of control variables (rather than for a control parameter set X) and may communicate the set of values for the control variables directly to the electrical system 2318 via the network/COM interface 2308 and/or via the networks 2312.

One or more client computing devices 2316 may be coupled via the networks 2312 and may be used to configure, provide inputs, or the like to the EO 2300, the dynamic manager 2314, and/or the electrical system 2318.

Figure 21:
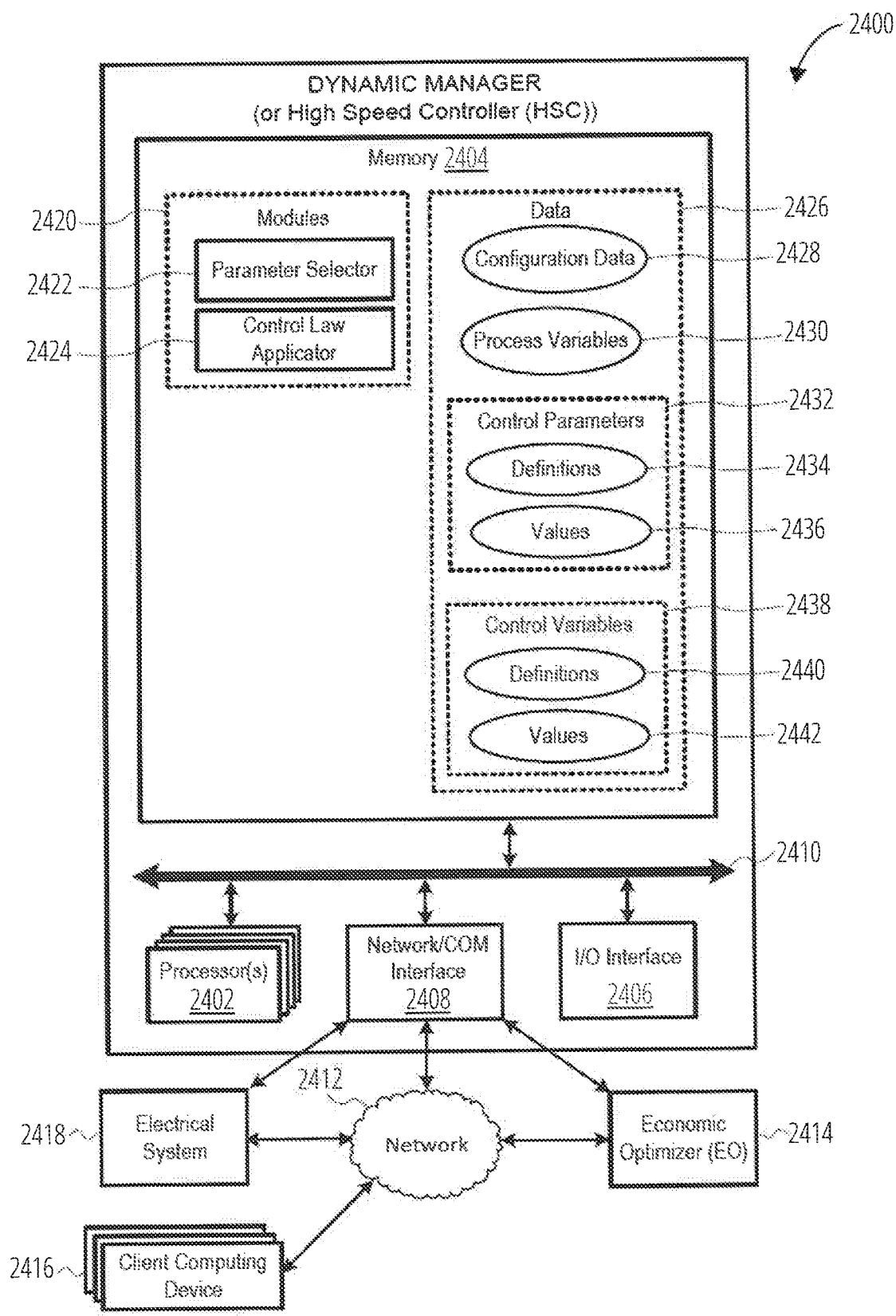

FIG. 21 is a diagram of a dynamic manager 2400, according to one embodiment of the present disclosure. The dynamic manager 2400, according to one embodiment of the present disclosure, is a second computing device that is separate from an EO 2414, which may be similar to the EO 2300 of FIG. 20. The dynamic manager 2400 may operate based on input (e.g., a control parameter set X) received from the EO 2414. The dynamic manager 2400 may determine a set of control values for a set of control variables for a given time segment of the upcoming time domain and provide the set of control values to an electrical system 2418 of a site to effectuate a change to the electrical system 2418 toward meeting an objective (e.g., economical optimization, participation in an aggregation opportunity event) of the electrical system 2418 during an upcoming time domain. The dynamic manager 2400 determines the set of control values based on a control law and a set of values for a given control parameter set X. The dynamic manager 2400 may include one or more processors 2402, memory 2404, an input/output interface 2406, a network/COM interface 2408, and a system bus 2410.

The one or more processors 2402 may include one or more general purpose devices, such as an Intel®, AMD®, or other standard microprocessor. The one or more processors 2402 may include a special purpose processing device, such as ASIC, SoC, SiP, FPGA, PAL, PLA, FPLA, PLD, or other customized or programmable device. The one or more processors 2402 may perform distributed (e.g., parallel) processing to execute or otherwise implement functionalities of the present embodiments. The one or more processors 2402 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, fliM® OS/2® operating systems, and so forth.

The memory 2404 may include static RAM, dynamic RAM, flash memory, one or more flip-flops, ROM, CD-ROM, DVD, disk, tape, or magnetic, optical, or other computer storage medium. The memory 2404 may include a plurality of program modules 2420 and program data 2426.

The program modules 2420 may include all or portions of other elements of the dynamic manager 2400. The program modules 2420 may run multiple operations concurrently or in parallel by or on the one or more processors 2402. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein.

The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 2404 may also include data 2426. Data generated by the dynamic manager 2400, such as by the program modules 2420 or other modules, may be stored on the system memory 2404, for example, as stored program data 2426. The stored program data 2426 may be organized as one or more databases.

The input/output interface 2406 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2408 may facilitate communication with other computing devices and/or networks 2412, such as the Internet and/or other computing and/or communications networks. The network/COM interface 2408 may couple (e.g., electrically couple) to a communication path (e.g., direct or via the networks 2412) to the electrical system 2418. The network/COM interface 2408 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2408 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 2410 may facilitate communication and/or interaction between the other components of the system, including the one or more processors 2402, the memory 2404, the input/output interface 2406, and the network/COM interface 2408.

The modules 2420 may include a parameter selector 2422 and a control law applicator 2424.

The parameter selector may pick which set of parameters to be used from the control parameter set X, according to a given time segment.

The control law applicator 2424 may process the selected set of parameters from the control parameter set X and convert or translate the individual set of parameters into control variables (or values thereof). The control law applicator 2424 may apply logic and/or a translation process to determine a set of values for a set of control variables based on a given set of parameters (from a control parameter set X)

for a corresponding time segment. For example, the control law applicator 2424 may apply a method and/or logic as shown in FIG. 18.

The data 2426 may include configuration data 2428, process variables 2430, control parameters 2432 (including definitions 2434 and values 2436), and/or control variables 2438 (including definitions 2440 and values 2442).

The configuration data 2428 may be provided to, and received by, the dynamic manager 2400 to communicate constraints and characteristics of the electrical system 2418.

The process variables 2430 may be received as feedback from the electrical system 2418. The process variables 2430 are typically measurements of the electrical system 2418 state and are used to, among other things, determine how well objectives of controlling the electrical system 2418 are being met. Historic process variables 2430 may be utilized by the HSC for example to calculate demand, which may be calculated as average building power over the previous 15 or 30 minutes. The dynamic manager 2400 can determine the set of control values for the set of control variables based on the process variables 2430.

The control parameters 2432 may comprise a control parameter set X that includes one or more sets of parameters each for a corresponding time segment of an upcoming time domain. The control parameters 2432 may additionally, or alternately, provide a control plan for the upcoming time domain. The control parameters 2432 may be received from an EO 2414 as an optimal control parameter set $X_{opt}$.

The control variables 2438 may be generated by the parameter selector 2422 based on an optimal control parameter set $X_{opt}$.

The dynamic manager 2400 may receive the optimal control parameter set $X_{opt}$ from the EO 2414 via the network/COM interface 2408 and/or via the networks 2412. The dynamic manager 2400 may also receive the process variables from the electrical system 2418 via the network/COM interface 2408 and/or via the networks 2412.

The dynamic manager 2400 may provide the values for the set of control variables to the electrical system 2418 via the network/COM interface 2408 and/or via the networks 2412.

One or more client computing devices 2416 may be coupled via the networks 2412 and may be used to configure, provide inputs, or the like to the EO 2414, the dynamic manager 2400, and/or the electrical system 2418.

Site Controller Examples

Figure 22:
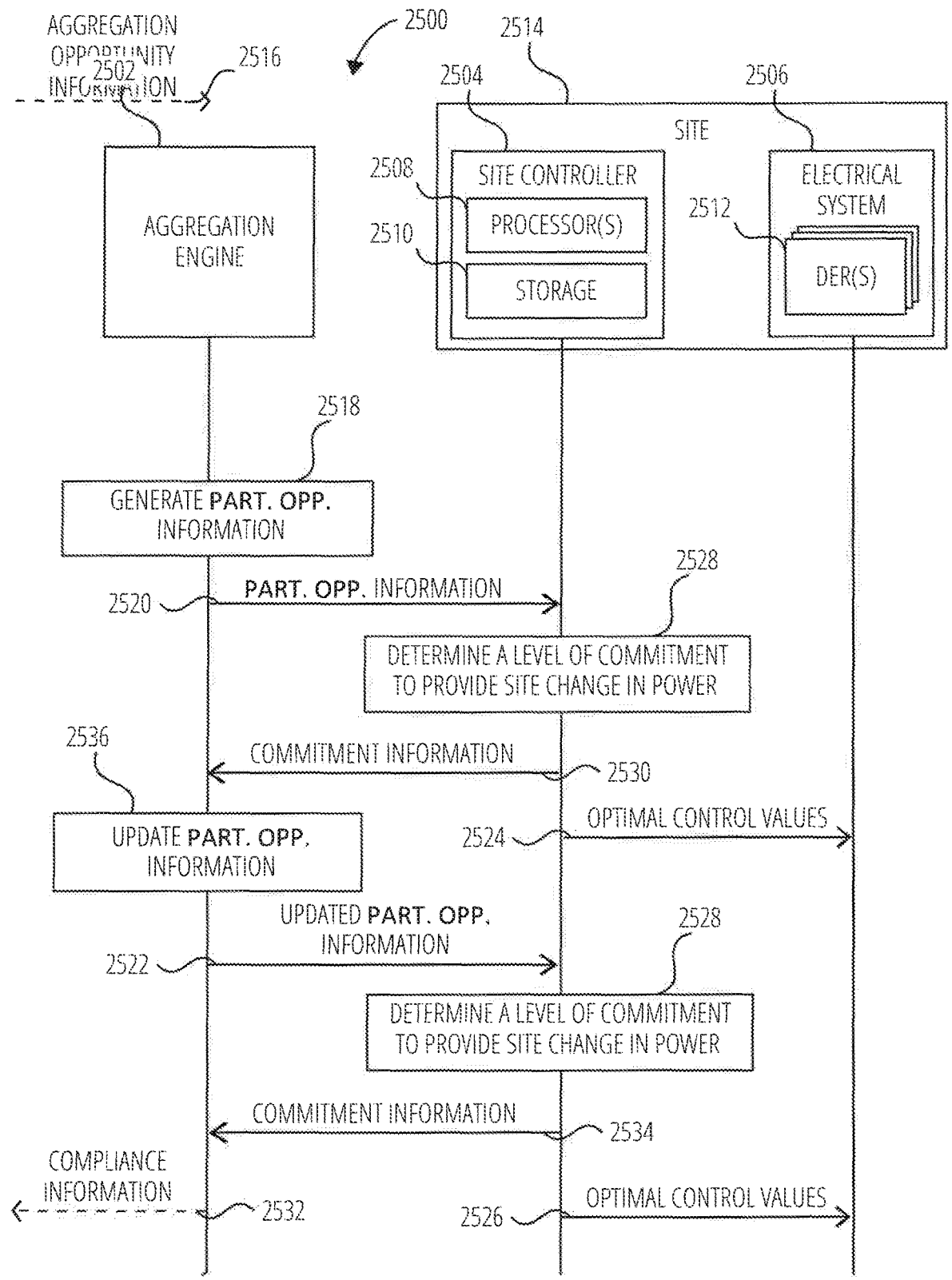
FIG. 22 is signal flow diagram of an electrical power control system, according to some embodiments.

FIG. 22 is a signal flow diagram of an electrical power control system 2500, according to some embodiments. The electrical power control system 2500 includes an aggregation engine 2502, a site controller 2504, and one or more DERs 2512 of an electrical system 2506 located at a site 2514. The site controller 2504 includes one or more processors 2508 operably coupled to storage 2510. The one or more processors 2508 are configured to perform functions of the site controller 2504 as will be discussed in more detail below, and as discussed above. In some embodiments the site controller 2504 is similar to the site controllers 104, 106, 108 (FIG. 1), 216 (FIG. 2), 504 (FIG. 5), and 704 (FIG. 7) discussed above. The site controller 2504 may include a control interface configured to communicate with the one or more DERs 2512. The one or more DERs 2512 may be electrically controllable by one or more control values of one or more control variables delivered to the one or more DERs 2512 through the control interface. The one or more DERs 2512 may include one or more ESSs, one or more electrical power generators, one more loads, or combinations thereof.

The site controller 2504 is configured to optimally control operation of the one or more DERs 2512, and in some embodiments, other electrical equipment (not shown) of the electrical system 2506 in an optimal manner, as discussed above with reference to FIGS. 7-24. Accordingly, at any given moment in time during operation, the site controller 2504 is controlling the electrical equipment of the electrical system 2506 in a way that the site controller 2504 has determined to be optimal (e.g., economically optimal).

In some embodiments the aggregation engine 2502 is configured to receive aggregation opportunity information 2516 (e.g., from a device of a utility or other authority). The aggregation opportunity information 2516 may include a minimum net change in power to comply with an aggregation opportunity, an aggregate benefit to be provided for compliance and/or a penalty for non-compliance, and one or more periods of time of the aggregation opportunity during which the minimum net change in power is to be provided. In some embodiments, the aggregation engine 2502 may itself generate the aggregation opportunity information 2516.

The aggregation engine 2502 is configured to facilitate the site controller 2504 in determining whether and how much to commit the site 2514 to providing site change in power towards the minimum net change in power of the aggregate maneuver. Since the site controller 2504 already controls the electrical system 2506 in a manner that the site controller 2504 has determined to be optimal, deviation from this optimal operation to participate in the aggregate maneuver presumably has a negative or undesirable impact (e.g., an increase in an economic cost, equipment wear and tear, etc.) on the operation of the electrical system 2506. Accordingly, the aggregation engine 2502 provides the site controller 2504 information to enable the site controller 2504 to determine whether an upshot of contributing site change in power toward compliance with the minimum net change in power of the aggregation maneuver is sufficient to offset any negative impact associated with deviating from the optimized operation to participate in the aggregate maneuver. For example, the aggregation engine 2502 generates 2518 participation opportunity information 2520 indicating one or more sets (e.g., corresponding to one or more periods of time within a time period of the aggregation opportunity) of proposed site benefit for providing a proposed site change in power. In this way, the site controller 2504 is informed as to an amount of site benefit to expect in return for committing to provide a site change in power towards compliance with the aggregate maneuver.

The site controller 2504 uses the participation opportunity information 2520 to determine an optimal level of commitment to provide site change in power during the time period of the aggregation opportunity. Accordingly, the site controller 2504 determines 2528 a level of commitment to provide site change in power, and transmits commitment information 2530 indicating one or more committed levels (e.g., corresponding to the one or more periods of time within the time period of the aggregation opportunity) of site change in power that the site controller 2504 has committed the site 2514 to provide.

To the extent that control of the electrical system 2506 will change because of the commitments the site controller 2504 makes to provide site change in power, the site controller 2504 may transmit a new set of optimal control values 2524, taking into consideration the committed site change in power, to the electrical system 2506.

In operation, the central controller generates 2518 participation opportunity information 2520 indicating a proposed site benefit for providing a proposed site change in power toward compliance with a minimum net change in power of an aggregate maneuver. In some embodiments the participation opportunity information 2520 corresponds to an incentive maneuver that the site 2514 is to participate in on its own. In some embodiments the participation opportunity information 2520 corresponds to an incentive maneuver that the site 2514 is to participate in with at least one other site (not shown). In some embodiments, aggregation opportunity information 2516 regarding the aggregate maneuver may have been received by the aggregation engine 2502 from a utility entity (e.g., a power company, etc.). In some embodiments, the aggregation engine 2502 may itself be the utility entity.

The aggregation engine 2502 transmits the participation opportunity information 2520 to the site controller 2504. The site controller 2504 is configured to store the participation opportunity information 2520 on the storage 2510. The site controller 2504 determines 2528 a level of commitment to provide site change in power based on the participation opportunity information 2520 received from the aggregation engine 2502. The site controller 2504 generates commitment information 2530 including the determined level of commitment In some embodiments the site controller 2504 determines 2528 the level of commitment to provide site change in power by optimizing control of the electrical system 2506 of the site 2514 taking into consideration the proposed site benefit for providing the proposed site change in power as indicated by the participation opportunity information 2520.

In some embodiments the determined level of commitment to provide site change in power is an optimal level of commitment to provide site change in power. An optimal level of commitment, in one embodiment, is a predicted economically optimal level of commitment to provide site change in power. In other words, determining 2528 a level of commitment to provide site change in power may include evaluating (e.g., using a cost or objective function) the predicted cost of implementing various levels of commitment to provide site change in power along with the corresponding benefits (e.g., as indicated by the proposed site benefit of the participation opportunity information 2520) and selecting a most cost-efficient level of commitment. In some embodiments the site controller 2504 constructs a cost function in determining the optimal level of commitment. The cost function may include a sum of predicted economic costs of operating the electrical system 2506. By way of non-limiting example, the cost function may include a sum of predicted ToU supply charges and predicted demand charges. Also by way of non-limiting example, the cost function may include summing the predicted ToU supply charges and the predicted demand charges with equipment degradation costs associated with degradation of at least one of the one or more DERs 2512 (e.g., degradation of an ESS, a generator, etc.). The site controller 2504 may optimize the cost function. The site controller 2504 transmits commitment information 2530 indicating the determined level of commitment to provide site change in power to the aggregation engine 2502. The site controller 2504 also provides optimal control values 2524 selected to implement the committed level of site change in power indicated by the commitment information 2530 to the electrical system 2506. The optimal control values 2524 control the electrical system 2506 to utilize the one or more DERs 2512 to provide the committed level of site change in power indicated by the commitment information 2530.

The aggregation engine 2502 receives the commitment information 2530 and evaluates the commitment information 2530 to determine whether the indicated level of commitment to provide site change in power is at an appropriate level. In embodiments where the aggregation engine 2502 is aggregating multiple sites, the aggregation engine 2502 may determine an aggregate level of commitment (e.g., a sum of each of the indicated levels of commitment) to provide site change in power based on commitment information 2530 received from the site controller 2504 and other commitment information received from other site controllers. This aggregate level of commitment may be compared to a minimum net change in power (e.g., as indicated by the aggregation opportunity information 2516) to comply with an aggregate maneuver. As a specific, non-limiting example, it may be determined whether the aggregate level of commitment falls within a range around the minimum net change in power. In some embodiments, a lowest net change in power of the range may be greater than the minimum net change in power to assure compliance with the aggregate maneuver. In embodiments where the aggregation engine 2502 is working with only the site controller 2504 and not with other site controllers, the aggregation engine 2502 may compare the level of commitment indicated by the commitment information 2530 with the minimum net change in power of the aggregate maneuver, or with a range around the minimum net change in power.

If the aggregation engine 2502 determines that the aggregate level of commitment is either too high or too low (e.g., does not fall within the range around the minimum net change in power), the aggregation engine 2502 is configured to update 2536 the participation opportunity information to generate updated participation opportunity information 2522. For example, the aggregation engine 2502 may adjust the proposed site benefit, the proposed site change in power, or both the proposed site benefit and the proposed site change in power. If the aggregate level of commitment is less than the range around the minimum net change in power, updating 2536 the participation opportunity information may include increasing the ratio between proposed site benefit and proposed site change in power (e.g., by increasing the proposed site benefit, decreasing the proposed site change in power, or both). If the aggregate level of commitment is greater than the range around the minimum net change in power, updating 2536 the participation opportunity information may include decreasing the ratio between proposed site benefit and proposed site change in power (e.g., by decreasing the proposed site benefit, increasing the proposed site change in power, or both). If the aggregation engine 2502 updates 2536 the participation opportunity information, the aggregation engine 2502 transmits the updated participation opportunity information 2522 to the site controller 2504 (and any other site controllers).

The site controller 2504 stores the updated participation opportunity information 2522 in the storage 2510 and, as previously discussed, determines 2528 a level of commitment to provide site change in power. The site controller 2504 transmits commitment information 2534 indicating this determined level of commitment to the aggregation engine 2502, and provides optimal control values 2526 to the electrical system 2506 to control the one or more DERs 2512 to provide the committed level of site change in power.

The aggregation engine 2502 evaluates the commitment information 2534 similarly as discussed above with respect to the evaluation of the commitment information 2530. As needed, the aggregation engine 2502 repeats the updating 2536, the transmission of the updated participation opportunity information 2522, and the reception of corresponding commitment information 2534 from the site controller 2504 until the aggregate commitment falls within the range around the minimum net change in power of the aggregate maneuver.

In some embodiments, at any point at which the aggregation engine 2502 determines that the minimum net change in power will or will not be provided and the aggregate maneuver will or will not be complied with the aggregation engine 2502 may provide compliance information 2532 back to the utility or other authority (if a utility or other authority is involved). The compliance information 2532 may indicate whether or not the aggregate maneuver will be complied with.

It should be noted that although FIG. 22 illustrates the site controller 2504 as being at the site 2514, in some embodiments the site 2514 may be located remotely from the site 2514 and may communicate with the electrical system 2506 through one or more networks to provide the optimal control values 2524, 2526 to the electrical system 2506.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1: An aggregation engine to apportion an aggregate maneuver of an aggregation opportunity, the aggregation engine comprising: one or more data storage devices configured to store aggregation opportunity information, the aggregation opportunity information indicating a minimum net change in power to comply with the aggregate maneuver and an aggregate benefit to be received for complying with the aggregate maneuver; a site communication interface configured to communicate with a plurality of site controllers, each of the plurality of site controllers configured to control one or more distributed energy resources (DERs) of an electrical system at a site to economically optimize operation of the electrical system; and one or more processors operably coupled to the one or more data storage devices and the site communication interface, the one or more processors configured to: control the site communication interface to transmit apportionment information to the plurality of site controllers via the site communication interface, the apportionment information indicating a proposed site benefit for providing a proposed site change in power toward compliance with the minimum net change in power of the aggregate maneuver; process commitment information received from the plurality of site controllers, the commitment information indicating levels of commitment of the plurality of site controllers to contribute site change in power to the minimum net change in power; and control the site communication interface to transmit updated apportionment information including an adjusted proposed site benefit, an adjusted proposed site change in power, or both to the plurality of site controllers if the commitment information indicates that an aggregate commitment of the plurality of site controllers is outside of a predetermined range around the minimum net change in power.

Example 2: The aggregation engine of Example 1, wherein the adjusted proposed site benefit for providing the site change in power is: greater than the site benefit if the aggregate commitment of the plurality of site controllers is less than the predetermined range, or less than the site benefit if the aggregate commitment of the plurality of site controllers is greater than the predetermined range.

Example 3: The aggregation engine according to any one of Examples 1 and 2, wherein the adjusted proposed site change in power to receive the proposed site benefit is: less than the proposed site change in power if aggregate commitment of the plurality of site controllers is less than the predetermined range, or greater than the site benefit if the aggregate commitment of the plurality of site controllers is greater than the predetermined range.

Example 4: The aggregation engine according to any one of Examples 1-3, wherein the one or more processors are further configured to process updated commitment information received from the plurality of site controllers responsive to the updated apportionment information, the updated commitment information indicating updated levels of commitment of the plurality of site controllers to contribute to the minimum net change in power.

Example 5: The aggregation engine of Example 1, wherein the proposed site benefit indicated by the apportionment information includes, for time points of a future period of time, proposed site benefits that vary over the future period of time.

Example 6: The aggregation engine of Example 5, wherein the proposed site benefits vary over the future period of time based on expected fluctuations in demand for electrical power over the future period of time.

Example 7: The aggregation engine of Example 6, wherein the proposed site benefits increase during periods of time having increasing expected demand for electrical power and decrease during periods of time having decreasing expected demand for electrical power.

Example 8: The aggregation engine according to any one of Examples 5-6, wherein the one or more processors are configured to dynamically update the proposed site benefits based on feedback provided by the plurality of site controllers during the future period of time.

Example 9: The aggregation engine according to any one of Examples 1-5 and 8, wherein the proposed site benefit indicated by the apportionment information includes a constant proposed site benefit to be applied for a future period of time.

Example 10: The aggregation engine of Example 9, wherein the one or more processors are configured to dynamically update the constant proposed site benefit based on feedback provided by the plurality of site controllers during the future period of time.

Example 11: The aggregation engine according to any one of Examples 1-10, further comprising an authority interface configured to communicate with an authority device of an authority that provides aggregation opportunities, wherein the authority interface is configured to receive the aggregation opportunity information from the authority device.

Example 12: The aggregation engine of Example 11, wherein the one or more processors are configured to control the authority interface to transmit compliance information to the authority device, the compliance information indicating whether the aggregate maneuver will be complied with.

Example 13: The aggregation engine according to any one of Examples 1-12, wherein the one or more processors are further configured to determine a cost of complying with the aggregate maneuver based on the commitment information and the apportionment information.

Example 14: The aggregation engine of Example 13, wherein the one or more processors are configured to determine to not comply with the aggregate maneuver if the determined cost of complying with the aggregate maneuver minus any penalty associated with non-compliance is greater than the aggregate benefit.

Example 15: The aggregation engine of Example 13, wherein the one or more processors are configured to determine to not comply with the aggregate maneuver if the determined cost of complying with the aggregate maneuver is greater than the aggregate benefit.

Example 16: The aggregation engine according to any one of Examples 1-15, wherein a minimum value of the predetermined range from the minimum net change in power includes an excess of the minimum net change in power to compensate for a failure of one or more of the site controllers to deliver on their levels of commitment to contribute site change in power to the minimum net change in power.

Example 17: An electrical system controller, comprising: an electrical system interface configured to communicate with one or more distributed energy resources (DERS) of an electrical system at a site, the one or more DERs electrically controllable via the electrical system interface; an aggregate interface configured to communicate with an aggregation engine, the aggregation engine in communication with one or more other electrical system controllers at one or more other sites to facilitate apportionment of burdens and benefits of aggregate maneuvers among the site and the one or more other sites; one or more data storage devices configured to store apportionment information received from the aggregation engine through the aggregate interface, the apportionment information indicating a proposed site benefit for providing a proposed site change in power toward compliance with a minimum net change in power of an aggregate maneuver; and one or more processors configured to: generate commitment information indicating a level of commitment of the electrical system controller to contribute site change in power, the level of commitment determined based on an economic optimization of a cost of operating the electrical system, the economic optimization of the cost taking into consideration a cost of the level of commitment and a corresponding site benefit; control the aggregate interface to transmit the commitment information to the aggregate engine;

and control the one or more DERs, via the electrical system interface, to provide the committed level of site change in power.

Example 18: The electrical system controller of Example 17, wherein the one or more processors are configured to control the one or more DERs to provide the committed level of site change in power by operating one or more electrical power generators.

Example 19: The electrical system controller according to any one of Examples 17 and 18, wherein the one or more processors are configured to control the one or more DERs to provide the committed level of site change in power by discharging electrical power from one or more energy storage systems.

Example 20: The electrical system controller according to any one of Examples 17-19, wherein the one or more processors are configured to control the one or more DERs to provide the committed level of site change in power by operating one or more electrical power generators.

Example 21: The electrical system controller according to any one of Examples 17-20, wherein the one or more processors are further configured to: generate updated commitment information responsive to updated apportionment information received through the aggregate interface; control the aggregate interface to transmit the updated commitment information to the aggregate engine; and control the one or more DERs, via the electrical system interface, to provide an updated committed level of site change in power according to the updated commitment information.

Example 22: A distributed electrical power system, comprising: a plurality of site controllers, each configured to control one or more distributed energy resources (DERs) of an electrical system located at a site; and an aggregation engine configured to: transmit apportionment information to the plurality of site controllers, the apportionment information indicating a proposed site benefit for providing a proposed site change in power toward compliance with a minimum net change in power of an aggregate maneuver; receive commitment information from the plurality of site controllers, the commitment information indicating levels of commitment of the plurality of site controllers to contribute site change in power towards the minimum net change in power; and transmit updated apportionment information to the plurality of site controllers if the commitment information indicates that an aggregate commitment of the plurality of site controllers is outside of a predetermined range from around the minimum net change in power.

Example 23: The distributed electrical power system of Example 22, wherein the updated apportionment information includes an updated proposed site benefit for providing the proposed site change in power, and wherein the updated proposed site benefit is: greater than the proposed site benefit if the aggregate commitment of the plurality of site controllers is less than the predetermined range, and less than the proposed site benefit if the aggregate commitment of the plurality of site controllers is greater than the predetermined range.

Example 24: The distributed electrical power system according to any one of Examples 22 and 23, wherein the updated apportionment information includes an updated proposed site change in power that is: greater than the proposed site change in power if the aggregate commitment of the plurality of site controllers is greater than the predetermined range, or less than the proposed site benefit if the aggregate commitment of the plurality of site controllers is less than the predetermined range.

Example 25: The distributed electrical power system according to any one of Examples 22-24, wherein each site controller of the plurality of site controllers is configured to generate the commitment information based on an optimization of a cost of operating the one or more DERs, the optimization taking into consideration a cost of implementing the level of commitment to provide site change in power, the proposed site benefit, and costs and benefits corresponding to nonparticipation in the aggregate maneuver.

Example 26: A method of operating an aggregation engine to apportion an aggregate maneuver of an aggregation opportunity, the method comprising: storing, on one or more data storage devices, aggregation opportunity information indicating a minimum net change in power to comply with the aggregate maneuver and an aggregate benefit to be received for complying with the aggregate maneuver; communicating with a plurality of site controllers via a site communication interface, each of the plurality of site controllers configured to control one or more distributed energy resources (DERs) of an electrical system at a site to economically optimize operation of the electrical system; controlling the site communication interface to transmit apportionment information to the plurality of site controllers via the site communication interface, the apportionment information indicating a proposed site benefit for providing a proposed site change in power toward compliance with the minimum net change in power of the aggregate maneuver; processing commitment information received from the plurality of site controllers, the commitment information indicating levels of commitment of the plurality of site controllers to contribute site change in power to the minimum net change in power; and controlling the site communication interface to transmit updated apportionment information including an adjusted proposed site benefit, an adjusted proposed site change in power, or both to the plurality of site controllers if the commitment information indicates that an aggregate commitment of the plurality of site controllers is outside of a predetermined range around the minimum net change in power.

Example 27: The method of Example 26, wherein the adjusted proposed site benefit for providing the site change in power is: greater than the site benefit if the aggregate commitment of the plurality of site controllers is less than the predetermined range, or less than the site benefit if the aggregate commitment of the plurality of site controllers is greater than the predetermined range.

Example 28: The method of Example 26, wherein the adjusted proposed site change in power to receive the proposed site benefit is: less than the proposed site change in power if aggregate commitment of the plurality of site controllers is less than the predetermined range, or greater than the site benefit if the aggregate commitment of the plurality of site controllers is greater than the predetermined range.

Example 29: The method of Example 26, further comprising processing updated commitment information received from the plurality of site controllers responsive to the updated apportionment information, the updated commitment information indicating updated levels of commitment of the plurality of site controllers to contribute to the minimum net change in power.

Example 30: The method of Example 26, wherein the proposed site benefit indicated by the apportionment information includes, for time points of a future period of time, proposed site benefits that vary over the future period of time.

Example 31: The method of Example 30, wherein the proposed site benefits vary over the future period of time based on expected fluctuations in demand for electrical power over the future period of time.

Example 32: The method of Example 31, wherein the proposed site benefits increase during periods of time having increasing expected demand for electrical power and decrease during periods of time having decreasing expected demand for electrical power.

Example 33: The method of Example 30, further comprising dynamically updating the proposed site benefits based on feedback provided by the plurality of site controllers during the future period of time.

Example 34: The method of Example 26, wherein the proposed site benefit indicated by the apportionment information includes a constant proposed site benefit to be applied for a future period of time.

Example 35: The method of Example 34, further comprising dynamically updating the constant proposed site benefit based on feedback provided by the plurality of site controllers during the future period of time.

Example 36: The method of Example 26, further comprising receiving the aggregation opportunity information from an authority device of an authority that provides aggregation opportunities.

Example 37: The method of Example 36, further comprising transmitting compliance information to the authority device, the compliance information indicating whether the aggregate maneuver will be complied with.

Example 38: The method of Example 26, further comprising determining a cost of complying with the aggregate maneuver based on the commitment information and the apportionment information.

Example 39: The method of Example 38, further comprising determining to not comply with the aggregate maneuver if the determined cost of complying with the aggregate maneuver minus any penalty associated with non-compliance is greater than the aggregate benefit.

Example 40: The method of Example 38, further comprising determining to not comply with the aggregate maneuver if the determined cost of complying with the aggregate maneuver is greater than the aggregate benefit.

Example 41: The method of Example 26, wherein a minimum value of the predetermined range from the minimum net change in power includes an excess of the minimum net change in power to compensate for a failure of one or more of the site controllers to deliver on their levels of commitment to contribute site change in power to the minimum net change in power.

Example 42: A method of controlling an electrical system controller, the method comprising: communicating with one or more distributed energy resources (DERS) of an electrical system at a site, the one or more DERs electrically controllable via an electrical system interface; communicating with an aggregation engine via an aggregate interface, the aggregation engine in communication with one or more other electrical system controllers at one or more other sites to facilitate apportionment of burdens and benefits of aggregate maneuvers among the site and the one or more other sites; storing, on one or more data storage devices, apportionment information received from the aggregation engine through the aggregate interface, the apportionment information indicating a proposed site benefit for providing a proposed site change in power toward compliance with a minimum net change in power of an aggregate maneuver; generating commitment information indicating a level of commitment of the electrical system controller to contribute site change in power, the level of commitment determined based on an economic optimization of a cost of operating the electrical system, the economic optimization of the cost taking into consideration a cost of the level of commitment and a corresponding site benefit; controlling the aggregate interface to transmit the commitment information to the aggregate engine; and controlling the one or more DERs, via the electrical system interface, to provide the committed level of site change in power.

Example 43: The method of Example 42, further comprising controlling the one or more DERs to provide the committed level of site change in power by operating one or more electrical power generators.

Example 44: The method of Example 42, further comprising controlling the one or more DERs to provide the committed level of site change in power by discharging electrical power from one or more energy storage systems.

Example 45: The method of Example 42, further comprising controlling the one or more DERs to provide the committed level of site change in power by operating one or more electrical power generators.

Example 46: The method of Example 42, further comprising: generating updated commitment information responsive to updated apportionment information received through the aggregate interface; controlling the aggregate interface to transmit the updated commitment information to the aggregate engine; and controlling the one or more DERs, via the electrical system interface, to provide an updated committed level of site change in power according to the updated commitment information.

Example 47: A method of controlling a distributed electrical power system, the method comprising: a plurality of site controllers, each configured to control one or more distributed energy resources (DERs) of an electrical system located at a site; and an aggregation engine configured to: transmit apportionment information to the plurality of site controllers, the apportionment information indicating a proposed site benefit for providing a proposed site change in power toward compliance with a minimum net change in power of an aggregate maneuver; receive commitment information from the plurality of site controllers, the commitment information indicating levels of commitment of the plurality of site controllers to contribute site change in power towards the minimum net change in power; and transmit updated apportionment information to the plurality of site controllers if the commitment information indicates that an aggregate commitment of the plurality of site controllers is outside of a predetermined range from around the minimum net change in power.

Example 48: The method of Example 47, wherein the updated apportionment information includes an updated proposed site benefit for providing the proposed site change in power, and wherein the updated proposed site benefit is: greater than the proposed site benefit if the aggregate commitment of the plurality of site controllers is less than the predetermined range, and less than the proposed site benefit if the aggregate commitment of the plurality of site controllers is greater than the predetermined range.

Example 49: The method of Example 47, wherein the updated apportionment information includes an updated proposed site change in power that is: greater than the proposed site change in power if the aggregate commitment of the plurality of site controllers is greater than the predetermined range, or less than the proposed site benefit if the aggregate commitment of the plurality of site controllers is less than the predetermined range.

Example 50: The method of Example 47, further comprising each site controller of the plurality of site controllers is generating the commitment information based on an optimization of a cost of operating the one or more DERs, the optimization taking into consideration a cost of implementing the level of commitment to provide site change in power, the proposed site benefit, and costs and benefits corresponding to nonparticipation in the aggregate maneuver.

Example 51: A means for performing at least a portion of the method according to any one of Examples 26-50.

Example 52: One or more computer-readable media including computer-readable instructions stored thereon, the computer-readable instructions configured to instruct one or more processors to perform at least a portion of the method according to any one of Examples 26-50.

Example 53: The one or more computer-readable media of Example 52, wherein the computer-readable media includes one or more non-transitory computer-readable media.

Example 54: An aggregation engine to coordinate an aggregate response to a request to change power, the aggregation engine comprising: a memory to store parameters describing a request to change power (consumption or generation) of one or more sites, the parameters including a target change in power to comply with the request; and one or more processors operably coupled to the memory, the one or more processors to iteratively, until an aggregate change in power is within a threshold of the target change in power: transmit participation opportunity information to a plurality of site controllers each controlling one or more distributed energy resources (DERs) of an electrical system at a site of the one or more sites to optimize operation (e.g., economically) of the electrical system based on the participation opportunity information, wherein the participation opportunity information indicates one or more parameters for a site change in power to contribute to bringing the aggregate change in power toward the target change in power and indicates an associated benefit for the site change in power; and receive commitment information from each of the plurality of site controllers indicating a level of site change in power contributing to bringing the aggregate change in power toward the target change in power; determine the aggregate change in power from the commitment information; and modify the participating opportunity information, as appropriate (toward achieving the target change in power with a minimum sum of benefits to the sites to comply with the request), based on the commitment information.

Example 55: The aggregation engine of Example 54, wherein the parameters describing a request to change power comprise a start date and time.

Example 56: The aggregation engine of any of Examples 54-55, wherein the parameters describing a request to change power comprise an end date and time.

Example 57: The aggregation engine of any of Examples 54-56, wherein the parameters describing a request to change power comprise a request period.

Example 58: The aggregation engine of any of Examples 54-57, wherein the one or more processors modify the participating opportunity information by changing the associated benefit for the site change in power.

Example 59: The aggregation engine of Example 58, wherein the one or more processors modify the opportunity information as appropriate toward achieving the target change in power with a minimum aggregate benefit to the one or more sites.

Example 60: The aggregation engine of any of Examples 58-59, wherein the one or more processors modify the opportunity information to optimize attaining the target change by seeking to increase the aggregate change in power and seeking to reduce an aggregate benefit to the one or more sites.

Example 61: The aggregation engine of any of Examples 54-60, wherein the one or more processors modify the opportunity information to optimize attaining the target change by seeking to maximizing the aggregate change in power and minimize the aggregate benefit to the one or more sites.

Example 62: The aggregation engine of any of Examples 54-61, wherein the one or more processors modify the opportunity information to optimize attaining the target change by seeking to maximizing the site change in power and minimize the associated benefit.

Example 63: The aggregation engine of any of Examples 58-62, wherein the participation opportunity information indicates how the associated benefit for the site change in power is to vary for time points of a future period of time.

Example 64: The aggregation engine of Example 63, wherein the associated benefit varies over the future period of time based on expected fluctuations in demand for electrical power over the future period of time.

Example 65: The aggregation engine of any of Examples 58-64, wherein the parameters describing the request to change power include an aggregate benefit to be received for complying with the request to change power by bringing the aggregate change in power to the target change in power.

Example 66: The aggregation engine of Example 65, wherein a sum of associated benefit to the one or more sites is smaller than the aggregate benefit.

Example 67: The aggregation engine of Example 65, wherein the associated benefit to the one or more sites is monetary.

Example 68: A computer implemented method to coordinate an aggregate response to a request to change power, the method comprising: receiving parameters describing a request to change power of one or more sites, the parameters including a target change in power to comply with the request; iteratively, until an aggregate change in power is within a threshold of the target change in power: transmitting participation opportunity information to a plurality of site controllers each controlling one or more distributed energy resources (DERs) of an electrical system at a site of the one or more sites to optimize operation of the electrical system based on the participation opportunity information, wherein the participation opportunity information indicates one or more parameters for a site change in power to contribute to bringing the aggregate change in power toward the target change in power and indicates an associated benefit for the site change in power; receiving commitment information from each of the plurality of site controllers indicating a level of site change in power contributing to bringing the aggregate change in power toward the target change in power; determining the aggregate committed change in power from the commitment information; and modifying the participating opportunity information, as appropriate toward achieving the target change in power with a minimum sum of benefits to the sites to comply with the request, based on the commitment information.

Example 69. The method of Example 68, wherein modifying the participating opportunity information comprises changing the associated benefit for the site change in power.

Example 70. The method of Example 69, wherein modifying the participating opportunity information comprises modifying the opportunity information as appropriate toward achieving the target change in power with a minimum aggregate benefit to the one or more sites.

Example 71: The method of Example 69, wherein modifying the participating opportunity information comprises modifying the opportunity information to optimize attaining the target change by seeking to increase the aggregate change in power and seeking to reduce an aggregate benefit to the one or more sites.

Example 72: The method of Example 69, wherein modifying the participating opportunity information comprises modifying the opportunity information to optimize attaining the target change by seeking to maximizing the aggregate change in power and minimize the aggregate benefit to the one or more sites.

Example 73: The method of any of Examples 69-72, wherein modifying the participating opportunity information comprises modifying the opportunity information to optimize attaining the target change by seeking to maximizing the site change in power and minimize the associated benefit.

Example 74: The method of any of Examples 68-73, wherein the participation opportunity information indicates how the associated benefit for the site change in power is to vary for time points of a future period of time.

Example 75: The method of Example 74, wherein the associated benefit varies over the future period of time based on expected fluctuations in demand for electrical power over the future period of time.

Example 76: The method of any of Examples 68-75, wherein the parameters describing the request to change power include an aggregate benefit to be received for complying with the request to change power by bringing the aggregate change in power to the target change in power.

Example 77: The method of Example 76, wherein a sum of associated benefit to the one or more sites is smaller than the aggregate benefit.

Example 78. An electrical system controller, comprising: an electrical system interface configured to communicate with one or more distributed energy resources (DERS) of an electrical system at a site, the one or more DERs electrically controllable via the electrical system interface; an aggregate interface configured to communicate with an aggregation engine, the aggregation engine in communication with a plurality of electrical system controllers at a plurality of sites, including the site, to coordinate an aggregate response to an aggregate opportunity, wherein the aggregate opportunity comprises parameters describing a request to change power of one or more sites of the plurality of sites, the parameters including a target change in power to comply with the request; and one or more processors configured to: determine an extended control plan to control operation of the electrical system over an upcoming time domain based on participation opportunity information received from the aggregation engine (e.g., through the aggregate interface), wherein the participation opportunity information indicates one or more parameters for a site change in power to contribute to bringing an aggregate change in power toward the target change in power and indicates an associated benefit for the site change in power, wherein the one or more processors determine the extended control plan based on both the cost of a level of commitment to the site change in power and the associated benefit; control the one or more DERs, via the electrical system interface, according to the extended control plan to contribute a level (e.g., an amount or magnitude) of the site change toward the aggregate change in power; and communicate, to the aggregation engine, commitment information indicating the level of the site change in power being contributed to enable the aggregation engine to adjust the participation opportunity information, as appropriate toward achieving the target change in power with a minimum sum of benefits to the sites to comply with the request, based on the commitment information.

Example 79: The electrical system controller of Example 78, wherein the one or more processors determine the extended control plan by determining an optimal extended control plan that optimizes both the cost of the level of commitment to the site change in power and the associated benefit.

Example 80: The electrical system controller of Example 79, wherein the one or more processors determine the optimal extended control plan by constructing a cost function including a sum of cost elements of operating the electrical system and performing an optimization algorithm on the cost function, wherein the cost elements include a cost element for both the cost of the level of commitment to the site change in power and the associated benefit.

Example 81: A computer implemented method of controlling a site including an electrical system with one or more distributed energy resources (DERs), the method comprising: receiving participation opportunity information from an aggregation engine (e.g., through an aggregate interface), the aggregation engine in communication with a plurality of electrical system controllers at a plurality of sites, including the site, to coordinate an aggregate response to an aggregate opportunity, wherein the aggregate opportunity provides a request to change power of one or more sites of the plurality of sites and a target change in power to comply with the request, wherein the participation opportunity information indicates one or more parameters for a site change in power to contribute to bringing an aggregate change in power toward a target change in power and indicates an associated benefit for the site change in power; determining an extended control plan to control operation of the electrical system over an upcoming time domain based on both the cost of a level of commitment to the site change in power and the associated benefit provided by the participation opportunity information; controlling the one or more DERs of the electrical system, via an electrical system interface, according to the extended control plan to contribute a level of the site change toward the aggregate change in power; and communicating, to the aggregation engine, commitment information indicating the level of the site change in power being contributed to enable the aggregation engine to adjust the participation opportunity information, as appropriate toward achieving the target change in power with a minimum sum of benefits to the sites to comply with the request, based on the commitment information.

Example 82: The method of Example 81, wherein determining the extended control plan comprises determining an optimal extended control plan that optimizes both the cost of the level of commitment to the site change in power and the associated benefit.

Example 83: The method of Example 82, wherein determining the optimal extended control plan comprises constructing a cost function including a sum of cost elements of operating the electrical system and performing an optimization algorithm on the cost function, wherein the cost elements include a cost element for both the cost of the level of commitment to the site change in power and the associated benefit.

Example 84: An aggregation engine to coordinate an aggregate maneuver to respond to an aggregation opportunity, the aggregation engine comprising: a memory to store aggregation opportunity information that indicates a target change in power to achieve in order to accomplish the aggregate maneuver; and one or more processors operably coupled to the memory, the one or more processors to iteratively, while an aggregate change in power is not within a threshold of the target change in power: transmit opportunity information to a plurality of site controllers each controlling one or more distributed energy resources (DERs) of an electrical system at a site to optimize operation of the electrical system based on the opportunity information, wherein the opportunity information indicates one or more parameters for a site change in power to contribute to bringing the aggregate change in power toward the target change in power and indicates an associated benefit for the site change in power; receive commitment information from each of the plurality of site controllers indicating an amount of site change in power contributing to bringing the aggregate change in power toward the target change in power; determine the aggregate change in power from the commitment information; and modify the opportunity information, as appropriate toward achieving the target change in power and thereby accomplishing the aggregate maneuver, based on the commitment information.

Example 85: The aggregation engine of Example 84, wherein the aggregation opportunity further indicates an aggregate benefit to be received for complying with the aggregate maneuver.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. An aggregation engine to coordinate a change in power of one or more sites, the aggregation engine comprising:
   a memory to store one or more parameters, the one or more parameters including a target change in power; and
   one or more processors operably coupled to the memory, the one or more processors to iteratively, until an aggregate change in power is within a first threshold of the target change in power:
      transmit participation opportunity information to each of a plurality of site controllers each controlling one or more distributed energy resources (DERs) of an electrical system at a site of the one or more sites to optimize operation of the electrical system based on the participation opportunity information, the participation opportunity information indicating an associated benefit for a site change in power;

receive commitment information from each of the plurality of site controllers indicating a level of the site change in power to contribute to bringing the aggregate change in power toward the target change in power, the aggregate change in power indicating a sum of the levels of the site changes in power of the commitment information;

determine a combined site benefit based on the commitment information and the associated benefit of the participation opportunity information; and responsive to determining the combined site benefit is below a second threshold, modify the participation opportunity information, wherein the one or more DERs are to be controlled by the plurality of site controllers at the one or more sites to change power based on the commitment information.

2. The aggregation engine of claim 1, wherein the one or more processors modify the participation opportunity information by changing the associated benefit for the site change in power.

3. The aggregation engine of claim 2, wherein the one or more processors modify the participation opportunity information toward achieving the target change in power with a minimum aggregate benefit to the one or more sites.

4. The aggregation engine of claim 2, wherein the one or more processors modify the participation opportunity information to optimize attaining the target change in power by seeking to increase the aggregate change in power and seeking to reduce an aggregate benefit to the one or more sites.

5. The aggregation engine of claim 2, wherein the one or more processors modify the participation opportunity information to optimize attaining the target change in power by seeking to maximize the aggregate change in power and minimize an aggregate benefit to the one or more sites.

6. The aggregation engine of claim 2, wherein the one or more processors modify the participation opportunity information to optimize attaining the target change in power by seeking to maximize the site change in power and minimize the associated benefit.

7. The aggregation engine of claim 1, wherein the participation opportunity information indicates how the associated benefit for the site change in power is to vary for time points of a future period of time.

8. The aggregation engine of claim 7, wherein the associated benefit varies over the future period of time based on expected fluctuations in a demand for electrical power over the future period of time.

9. The aggregation engine of claim 1, wherein the one or more parameters include an aggregate benefit to be received by bringing the aggregate change in power to the target change in power.

10. The aggregation engine of claim 9, wherein a sum of the associated benefits to the one or more sites is smaller than the aggregate benefit.

11. The aggregation engine of claim 9, wherein the associated benefit to the one or more sites is monetary.

12. The aggregation engine of claim 1, wherein the one or more processors, in response to determining the aggregate change in power is within the first threshold of the target change in power, transmit a message to each of the plurality of site controllers, the message comprising instructions to operate according to the commitment information each of the plurality of site controllers provided, wherein the plurality of site controllers each control the one or more DERs of the electrical system controlled by the site controller according to the message.

13. The aggregation engine of claim 1, wherein the participation opportunity information comprises an offered price per unit of energy delivered over a defined timeframe, and the commitment information comprises a quantity of energy committed at the offered price per unit.

14. The aggregation engine of claim 1, wherein the participation opportunity information comprises a price per quantity of average power delivered over a defined timeframe, and the commitment information comprises a quantity of average power to be delivered at the price per quantity.

15. A computer implemented method to coordinate a change in power of one or more sites, the method comprising:

obtaining one or more parameters, the one or more parameters including a target change in power; and iteratively, until an aggregate change in power is within a threshold of the target change in power:

transmitting participation opportunity information to each of a plurality of site controllers each controlling one or more distributed energy resources (DERs) of an electrical system at a site of the one or more sites to optimize operation of the electrical system based on the participation opportunity information, the participation opportunity information indicating an associated benefit for a site change in power;

receiving commitment information from each of the plurality of site controllers indicating a level of the site change in power to contribute to bringing the aggregate change in power toward the target change in power, the aggregate change in power indicating a sum of the levels of the site changes in power of the commitment information;

determining a combined site benefit based on the commitment information and the associated benefit of the participation opportunity information; and responsive to determining the combined site benefit is below a benefit threshold, modifying the participation opportunity information;

wherein the one or more DERs are to be controlled by the plurality of site controllers at the one or more sites to change power based on the commitment information.

16. The method of claim 15, wherein the modifying the participation opportunity information comprises changing the associated benefit for the site change in power.

17. The method of claim 16, wherein the modifying the participation opportunity information comprises modifying the participation opportunity information toward achieving the target change in power with a minimum aggregate benefit to the one or more sites.

18. The method of claim 16, wherein the modifying the participation opportunity information comprises modifying the participation opportunity information to optimize attaining the target change in power by seeking to increase the aggregate change in power and seeking to reduce an aggregate benefit to the one or more sites.

19. The method of claim 16, wherein the modifying the participation opportunity information comprises modifying the participation opportunity information to optimize attaining the target change in power by seeking to maximize the aggregate change in power and minimize an aggregate benefit to the one or more sites.

20. The method of claim 16, wherein modifying the participation opportunity information comprises modifying the participation opportunity information to optimize attaining the target change by seeking to maximizing the site change in power and minimize the associated benefit.

21. An electrical system controller, comprising one or more processors configured to:
communicate with one or more distributed energy resources (DERS) of an electrical system at a site;
communicate with an aggregation engine, the aggregation engine in communication with a plurality of electrical system controllers at a plurality of sites, including the site, to:
transmit participation opportunity information to each of the plurality of electrical system controllers, the participation opportunity information indicating an associated benefit for a site change in power;
receive commitment information from the plurality of electrical system controllers indicating levels of site change in power to contribute to bringing an aggregate change in power toward a target change in power, the aggregate change in power indicating a sum of the levels of site change in power of the commitment information;
determine a combined site benefit based on the commitment information and the associated benefit of the participation opportunity information;
responsive to determining the combined site benefit is below a threshold, modify the participation opportunity information; and
transmit the modified participation opportunity information to each of the plurality of electrical system controllers;
determine an extended control plan to control operation of the electrical system over an upcoming time domain based on the modified participation opportunity information received from the aggregation engine; and
control the one or more DERs according to the extended control plan to contribute a level of the site change in power toward the aggregate change in power.

22. The electrical system controller of claim 21, wherein the one or more processors determine the extended control plan by determining an optimal extended control plan that optimizes both a cost of the level of the site change in power and the associated benefit.

23. The electrical system controller of claim 22, wherein the one or more processors determine the optimal extended control plan by constructing a cost function including a sum of cost elements of operating the electrical system and performing an optimization algorithm on the cost function, wherein the cost elements include a cost element for both the cost of the level of the site change in power and the associated benefit.

* * * * *